US012430935B2

(12) United States Patent
Shah

(10) Patent No.: US 12,430,935 B2
(45) Date of Patent: Sep. 30, 2025

(54) SYSTEM AND METHODS FOR INTEGRATED VIDEO RECORDING AND VIDEO FILE MANAGEMENT

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 18/903,435

(22) Filed: Oct. 1, 2024

(65) Prior Publication Data
US 2025/0246012 A1 Jul. 31, 2025

Related U.S. Application Data

(60) Provisional application No. 63/626,096, filed on Jan. 29, 2024.

(51) Int. Cl.
| | |
|---|---|
| *G06V 20/00* | (2022.01) |
| *G06T 1/60* | (2006.01) |
| *G06T 5/50* | (2006.01) |
| *G06T 11/20* | (2006.01) |
| *G06V 20/70* | (2022.01) |

(52) U.S. Cl.
CPC ............... *G06V 20/70* (2022.01); *G06T 1/60* (2013.01); *G06T 5/50* (2013.01); *G06T 11/203* (2013.01); *G06T 2207/20221* (2013.01)

(58) Field of Classification Search
CPC ....... H04N 21/47205; H04N 21/23418; H04N 21/4316; H04N 21/84; G06V 10/00; G06V 20/00; G06T 7/00
See application file for complete search history.

(56) References Cited

U.S. PATENT DOCUMENTS

| | | | | |
|---|---|---|---|---|
| 9,472,239 | B1* | 10/2016 | Martin .................. | G11B 27/105 |
| 10,061,482 | B1* | 8/2018 | Bingham ............... | G11B 27/00 |
| 11,050,976 | B2* | 6/2021 | Hegde .................... | H04N 21/47 |
| 2009/0148124 | A1* | 6/2009 | Athsani ............. | H04N 21/6582 386/241 |
| 2009/0300475 | A1* | 12/2009 | Fink .................... | H04N 21/4781 726/4 |
| 2012/0089905 | A1* | 4/2012 | Chafy ................... | G06F 40/169 715/254 |
| 2019/0076741 | A1* | 3/2019 | Thompson .............. | A63F 13/35 |

(Continued)

OTHER PUBLICATIONS

Harrison, Beverly L., and Ronald M. Baecker. "Designing video annotation and analysis systems." Graphics Interface. vol. 92. 1992.*

(Continued)

*Primary Examiner* — Li Liu
(74) *Attorney, Agent, or Firm* — The Law Offices of Konrad Sherinian, LLC; Jeffrey S. Dixon

(57) ABSTRACT

A mobile-app based video recording system that allows a user to apply live annotations to video footage by either drawing or typing on top of the footage in an image frame area of a display. A user can choose from a variety of options for the appearance of drawn and typed annotations, including the color, opacity, and stroke width of drawing marks and font, text size, and text and background/textbox colors for typed text, as well as positioning the marks and text as desired. The annotations are recorded and merged with the footage in real time to create an annotated video file. The annotations can also be stored in a separate editable file or in an editable layer of the annotate video file.

11 Claims, 30 Drawing Sheets

(56) References Cited

U.S. PATENT DOCUMENTS

| | | | | |
|---|---|---|---|---|
| 2020/0106965 | A1* | 4/2020 | Malia | G11B 27/34 |
| 2020/0168119 | A1* | 5/2020 | Ramani | G09B 7/00 |
| 2021/0056251 | A1* | 2/2021 | Parmar | G06F 3/04847 |
| 2021/0281906 | A1* | 9/2021 | Kiryanov | H04N 21/8456 |
| 2022/0319082 | A1* | 10/2022 | Boyd | G06T 11/00 |
| 2022/0374585 | A1* | 11/2022 | Wang | G11B 27/031 |

OTHER PUBLICATIONS

Bianco, Simone, et al. "An interactive tool for manual, semi-automatic and automatic video annotation." Computer Vision and Image Understanding 131 (2015): 88-99.*

* cited by examiner

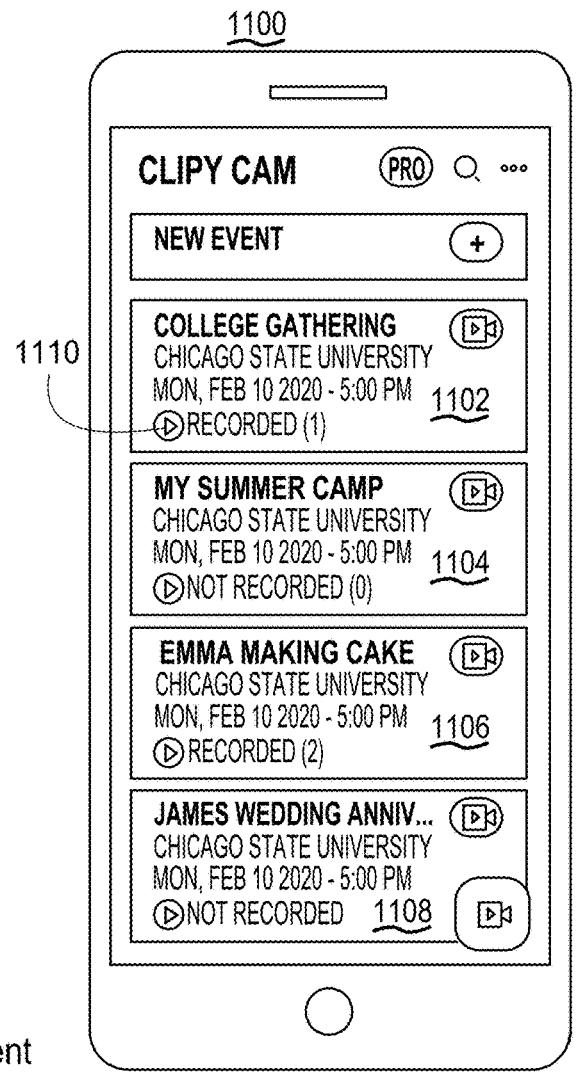
*Fig. 11*
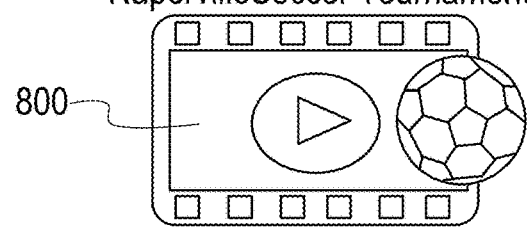
*Fig. 8*
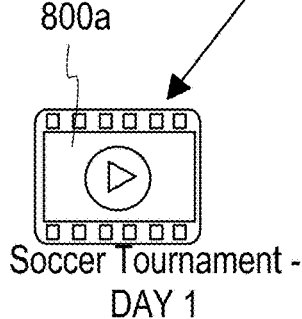
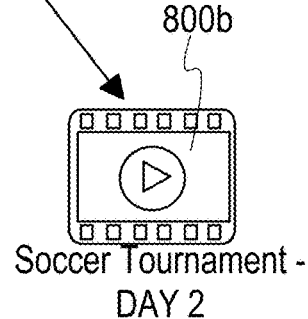

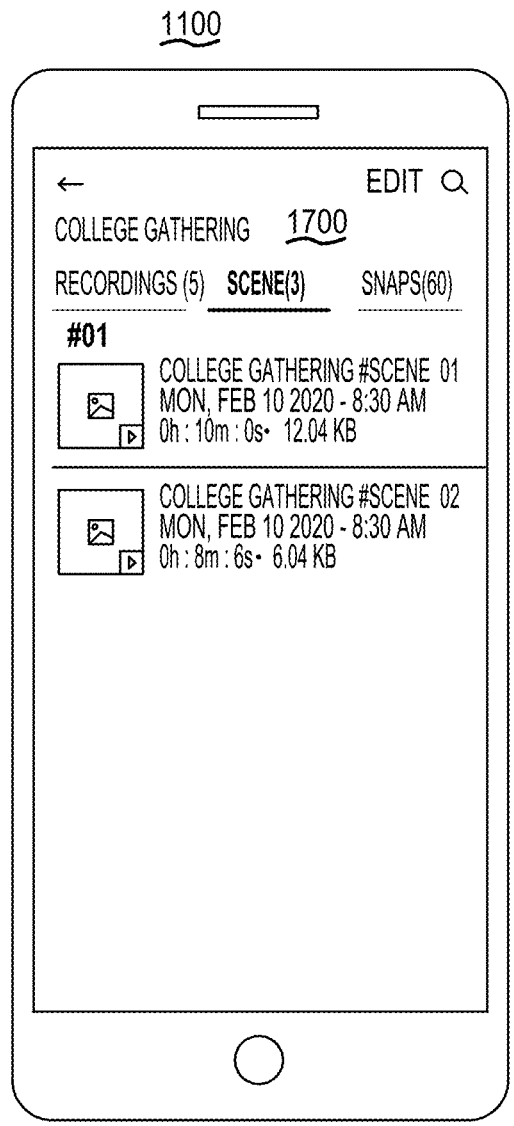
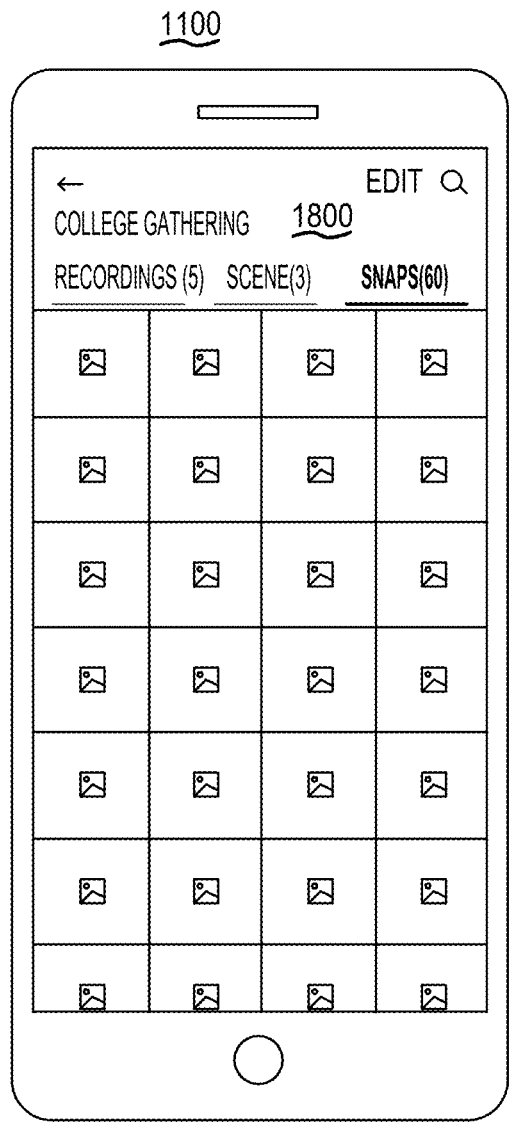
Fig. 17
Fig. 18

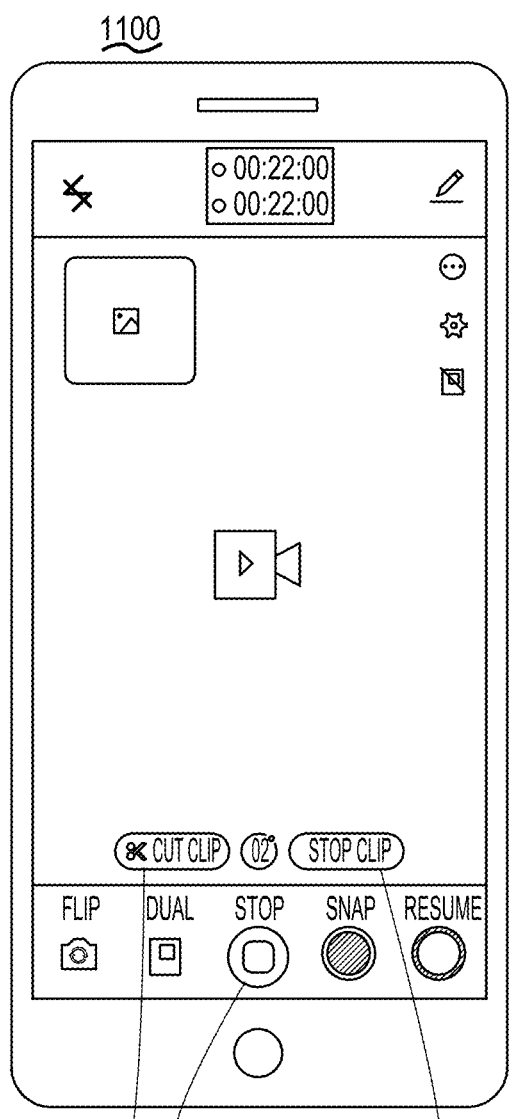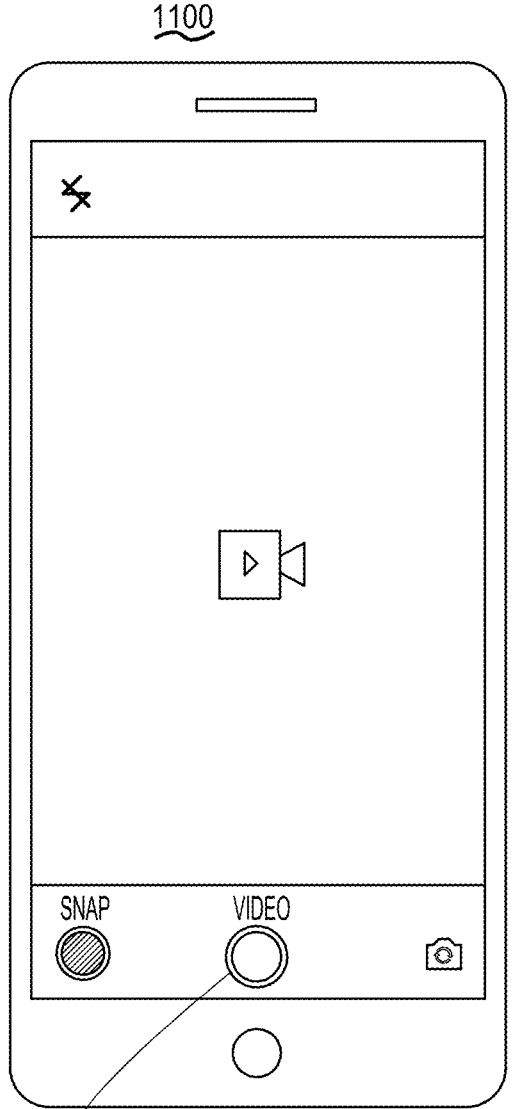
Fig. 19
Fig. 20

2950
Settings
Camera Settings
▷ Auto Start Clip 
✂ Cut Clip & Start next Clip immediately 
 Dont S
after Re
Automatically append new video footage to the last saved (or a selected) file
( Watch Video )
▭ Auto-media-Tagging  2952
2954 —  For preset time: 03 Days -- Hr -- Min
2956 —  Until toggled off
*Fig. 29*

3050
Settings
Camera Settings
▷ Auto Start Clip 
✂ Cut Clip & Start next Clip immediately 
 Dont S  Automatically tag new media to
after Re  last tagged (ora a selected) event
Watch Video
🔲 Auto-media-Tagging  3052
3054 —  For preset time: 03 Days -- Hr -- Min
3056 —  Until toggled off
*Fig. 30*

3100
Settings
3102
Camera Settings
▷ Auto Start Clip 
✂ Cut Clip & Start next Clip immediately 
Dont S
after Re
Pause the recording when receiving call or app goes background
( Watch Video )
❙❙ Pause the Recording whenApp goes background 
3104
3106 — Auto-resume after up to -- mins 30 secs
*Fig. 31*

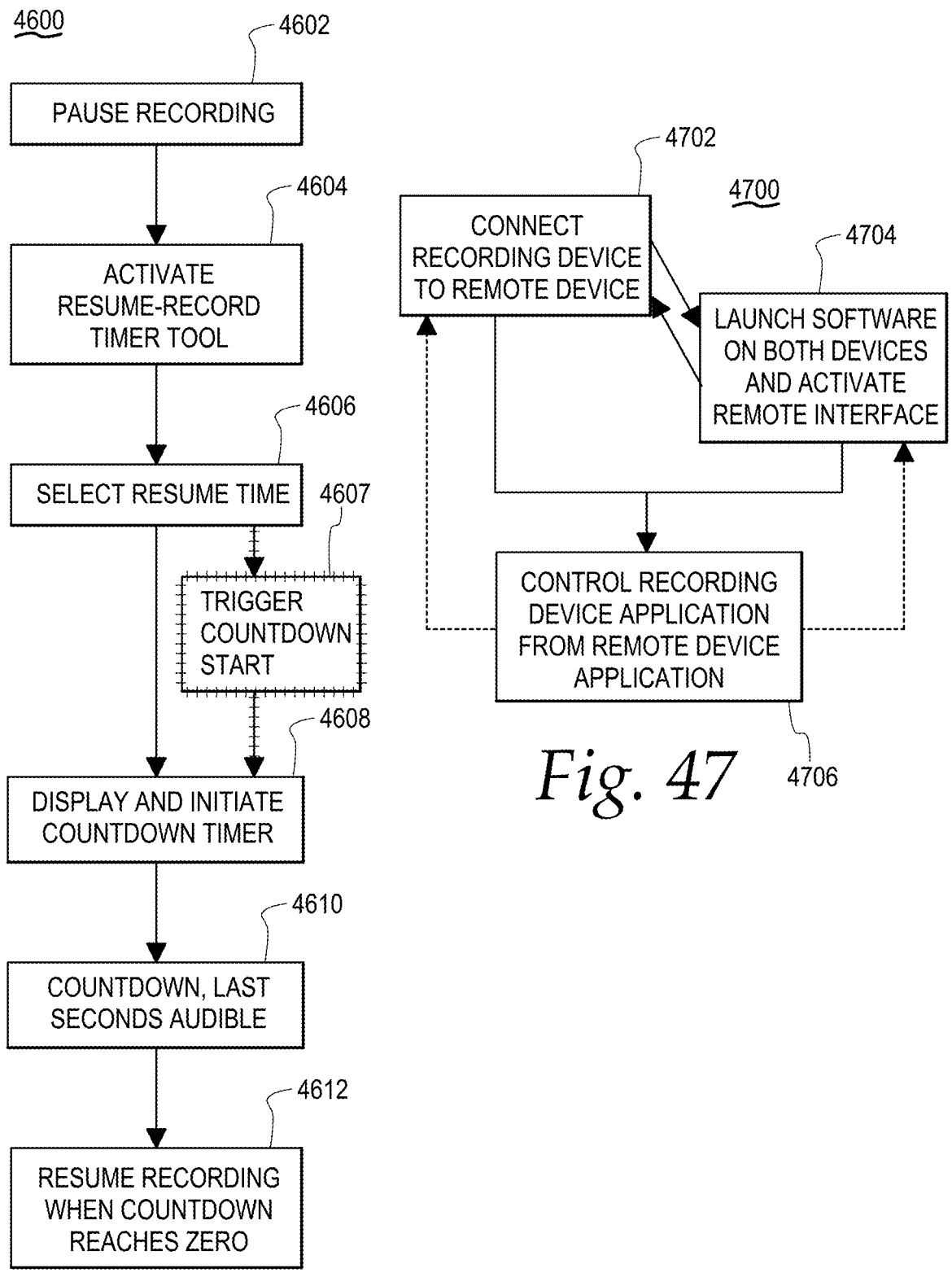

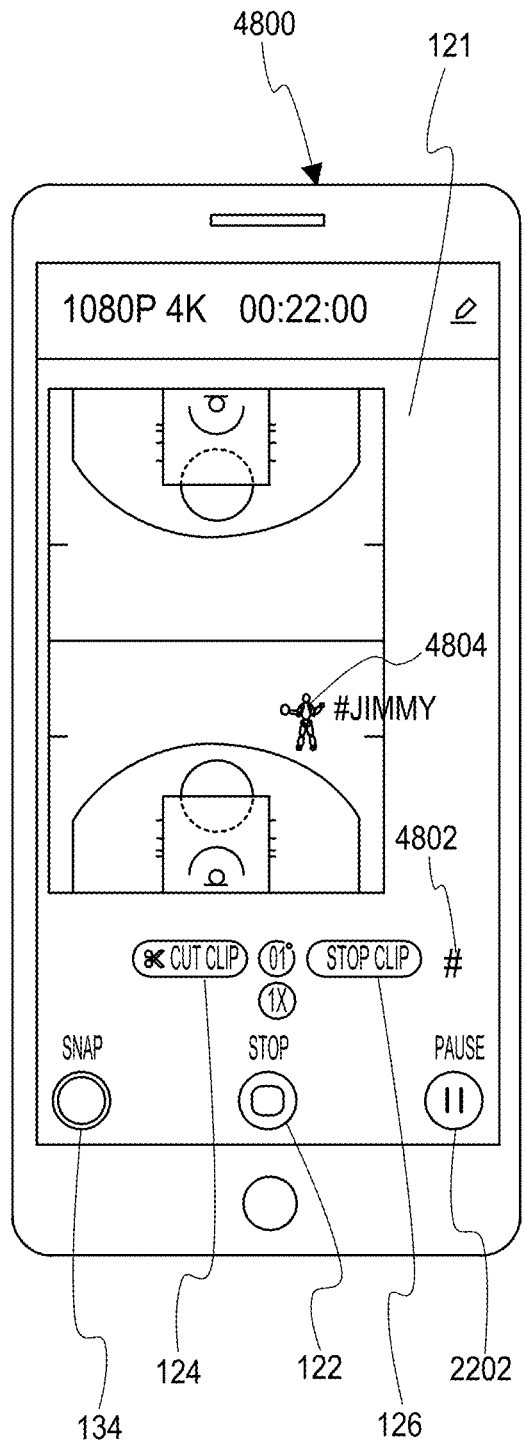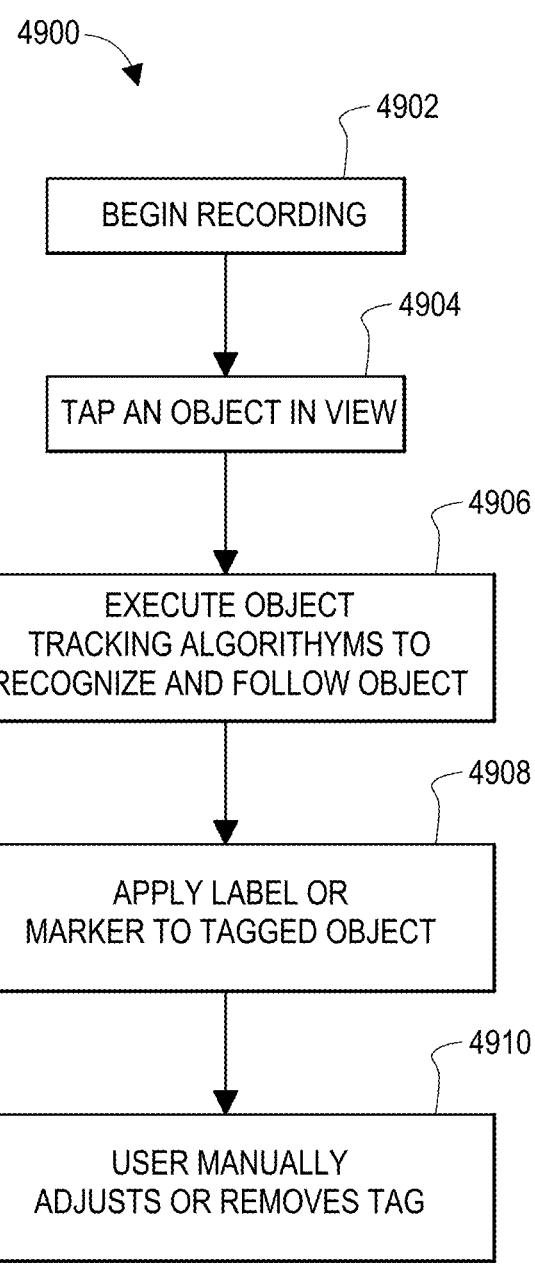
Fig. 48
Fig. 49

SYSTEM AND METHODS FOR INTEGRATED VIDEO RECORDING AND VIDEO FILE MANAGEMENT

CROSS-REFERENCE

This application claims the priority benefit of U.S. Provisional Patent Application No. 63/626,096, filed Jan. 29, 2024, entitled SYSTEMS AND METHODS FOR INTEGRATED VIDEO RECORDING AND VIDEO FILE MANAGEMENT, which is hereby incorporated herein for all purposes in its entirety.

FIELD OF THE DISCLOSURE

The present disclosure relates to video recording systems, and more particularly, to systems and methods for recording, organizing, customizing, and editing video content.

BACKGROUND

Electronic video camera systems are ubiquitous, and particularly those incorporated into personal handheld, pocket-sized electronic devices, most notably smartphones, as well as networked video communications platforms, which may use smartphones or computers equipped with integrated or peripheral webcams. Video cameras are frequently used to preserve memories of personal events such as scholastic sporting events, concerts, school plays, weddings, graduations, and vacations, and many others. Use of video cameras for various other purposes has also become increasingly widespread, such as for security, safety, and policing, as well as for overseeing the performance of high-stakes and/or complex procedures or tasks.

Electronically stored video recordings can be kept as long as sufficient storage is available, which is to say, essentially forever. Given that large volumes of cloud storage are now available at nominal costs, it can be assumed that sufficient digital storage is available to store any video that is taken. However, the time to download and/or view a long video recording can still be onerous, particularly when the person downloading and viewing is only interested in a small portion of the recording. For example, in the case of a school talent competition, a parent downloading a recording is likely only interested in their child's performance, which may be contained in just a few minutes of a two-hour recording.

On the flip side, a person may be interested in organizing or viewing footage recorded at various different times during an overarching event, such as multiple sessions of a seminar, selected tables or booths at a trade show or convention, selected rounds of a tournament, one or more sets at a music festival, selected attractions or activities enjoyed during a vacation, selected acts of a play, changes of a traffic signal from green to yellow to red, or different phases of operation for an operating room camera. The viewer may find that the footage of interest is stored only in multiple arbitrarily named video files that are catalogued only chronologically and not by subject matter, content, or contextual relevance, making them difficult and time consuming to locate. Digital media file folders allow a user to sort video files into a folder associated with a category. However, in many conventional file systems, a physical memory address can be mapped only to one unique file name and path. Therefore, if a user wanted to store the same video files recorded at a concert attended with a friend in one folder called "Concerts" and another folder called "Memories with Jimmy," duplicate copies of the files would be created, occupying twice the storage space of single copies.

Moreover, a user may be interested in organizing or viewing video content that is related in subject matter or theme but was created at widely varying times, such as from multiple events separated by months or years, rather than from one event lasting only hours or days. Whereas video files recorded at one event occurring over a short time period will appear near each other in a chronological file listing, finding video files from events separated by months or years will likely require the user to browse through large numbers of unrelated video files created in the intervening time period.

Accordingly, a need exists for the simplified creation of video clip files from segments of a main, continuous video recording. More particularly, a need exists for the integration of such simplified clip creation into existing applications and software platforms on which video content can be recorded. Further, a need exists for the simplified combination or association of multiple video recordings captured at discontinuous time intervals.

In addition, interruptions from other functions of a personal smartphone can disrupt the flow of a video recording, such as when a user must take a call or read or reply to a text message. If the camera is allowed to continue recording in the background while the user is using another smartphone feature, and therefore not monitoring what is in the digital viewfinder, the video recording is likely to contain segments that are unwanted due to the camera moving unsteadily, the viewing frame being out of alignment with the intended subject matter, and/or the user capturing subject matter that they did not intend to capture. As a result, the user may end up having to "clean up" the video recording later by using editing software to find and delete these segments. On the other hand, if a video recording is automatically stopped when a user engages another smartphone app or function, valuable seconds can be lost when, after the interruption, the user attempts to navigate back to a video camera user interface and then locate and activate a record control in order to resume recording. As a result, an important moment may pass by unrecorded, which would not necessarily have been missed had the recording resumed automatically, or required fewer user actions to resume, at the end of the interruption.

Accordingly, a need exists for a video recording application that simplifies the process of pausing a video recording to handle an interruption from another application and then resuming recording after the interruption.

In addition, a video or still image can be made more engaging or informative when combined with overlaid markings or indicia, such as superimposed drawn or typed annotations. However, adding such content is time consuming when it requires searching within a stored video file to find the frame(s) or image(s) to be modified.

Accordingly, a need exists to simplify the process of combining a video frame recorded by a camera with markings to be displayed together in the same video frame.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

FIG. 8 is a block diagram showing the relationship between an event and multiple subevents.

FIG. 11 is a screenshot of a mobile communication device displaying multiple events.

FIG. 17 is a screenshot of a mobile communication device displaying scenes of the recording for the College Gathering event.

FIG. 18 is a screenshot of a mobile communication device displaying snapshot images of the College Gathering event.

FIG. 19 is a screenshot of a mobile communication device displaying a Record button for recording the event, and also displaying a Cut Clip button that functions to end an old clip, and start a new clip of the recording.

FIG. 20 is a screenshot of a mobile communication device displaying a recording, and offering the option to Stop Clip.

FIG. 29 is a screenshot of a video recording system application interface with a toggle switch for an auto-append video function.

FIG. 30 is a screenshot of a video recording system application interface with a toggle switch for an auto-media-tagging function.

FIG. 31 is a screenshot of a video recording system application interface with a toggle switch for an auto-pause and resume function.

FIG. 46 is a simplified flowchart illustrating a method of using a resume-record timer feature of a video recording system.

FIG. 47 is a simplified flowchart illustrating a method of using a remote-interface feature of a video recording system.

FIG. 48 is a screenshot of a video recording system application interface that includes a smart-tagging feature.

FIG. 49 is a simplified flowchart illustrating a method of using a smart-tagging feature of a video recording system.

A person of ordinary skill in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skill in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of exemplary systems and methods embodying aspects of the disclosure, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Disclosed herein are systems and methods for integrated video recording and video file management. The systems and methods are typically implemented by a software application or "app" executed on an electronic computing device operatively connected to a video camera (or "camera"). The computing device includes a processor, a memory, a user output device (which is shown as a display in the illustrated embodiments but may be or also include a speaker) and a user input device (shown as a touchscreen, but may be or also include a microphone and/or hard buttons). The camera includes a lens, an image sensor, and a video processor. The computing device and the camera can be integrated into a single housing or enclosure, such as that of a smartphone or other small, handheld electronic device. However, it should be understood that the principles of the interface can easily be used on other types of devices as well, such as digital camcorders, digital cameras, or remote-control software operating on a computer or other device to control a remotely located camera, which comprises at least lens and a sensor located in a separate enclosure from the computer.

Physical System Components

Figure 1:
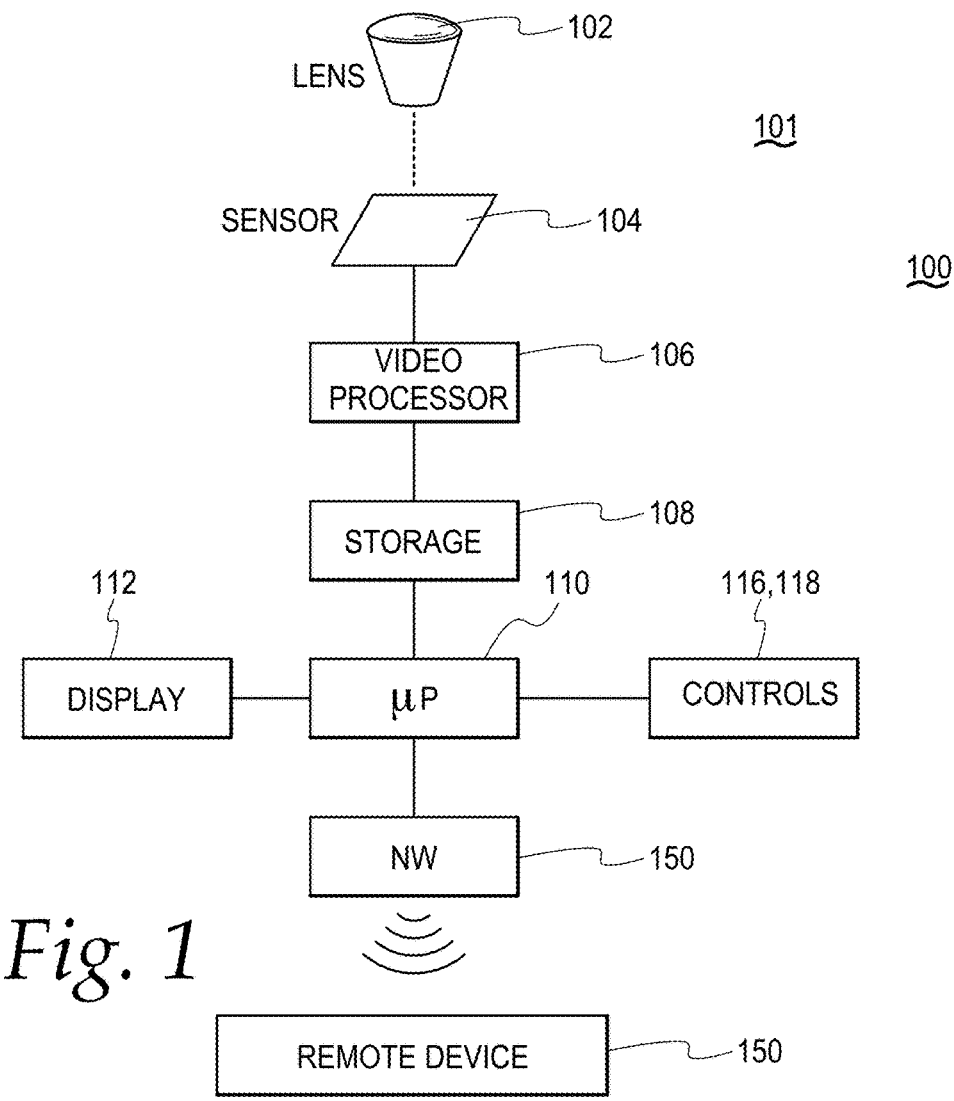
FIG. 1 is a simplified block diagram of a video recording system constructed per this disclosure.

Shown in FIG. 1 is a simplified block diagram illustrating the general construction of a video camera system 100 according to embodiments of the disclosure. The video camera system 100 includes a lens 102. The lens 102 focuses incoming light onto an image sensor 104. Typically, the output of an image sensor 104 will be processed by a video processor 106, which will process the video from the image sensor 104 and write or commit full frames of video to storage 108. The video processor 106 may process data from the image sensor 104 at a frame rate. The video processor 106 may write frame data directly to storage 108 via a DMA channel. However, the processor 110 can also read data from the video processor 106 (or directly from the image sensor 104) and write the frame data to storage 108. Accordingly, in certain embodiments of the disclosed video camera system 100, the video processor 106 is entirely extraneous and is not a limitation of this disclosure.

The storage 108 used by the video camera system 100 will typically be FLASH memory, although the primary limitation is that the write speed of the storage 108 is sufficient for the frame rate at which the video camera system 100 is operated. The amount of storage can vary, but 1 GB of storage can hold nearly 20 minutes of 1080 P video at 60 FPS (frames per second). The FLASH memory modules may, for example, be UFS 4.0 FLASH memory or a similar type of FLASH memory that offers sufficient read/write performance.

The microprocessor 110 reads frame data from storage 108 and displays it in real time on the display 112. The microprocessor 110 also performs housekeeping activities, such as configuring the video processor 106, interfacing with external devices (not shown), accepting manual controls 116 and automatic controls 118, and interfacing with external devices or networks via a network interface 114.

The display 112 can be, for example, a Liquid Crystal Display (LCD), an LED or an OLED display, or another type of display as long as the display is of sufficient resolution and refresh rate for the video camera operator to obtain a reasonable view of the scene that is being recorded. In certain implementations, the display 112 can be a touchscreen.

As mentioned above, controls of the video camera system 100 can include both manual controls 116 and automatic controls 118. Manual controls 116 are components that receive and transmit manual user inputs to the microprocessor 110, while automatic controls 118 are components that automatically generate and transmit inputs to the microprocessor 110.

Manual user inputs to the microprocessor 110 allow the camera operator to control the operation of the video camera system 100. The manual controls 116 can include, for example, a touch screen system, or a collection of buttons, sliders, joysticks, gesture controls, voice controls, and other input control components, as are typical in video camera systems.

The automatic controls 118 transmit inputs automatically to the microprocessor 110, such as geolocation and user activity, as described below. The automatic controls 118 can include, for example, a geolocation component operative to determine the geolocation of a camera device 101, such as a GPS component retained by the camera device 101, a clock, and/or one or more sensors such as a light sensor and/or a motion sensor retained by the camera device 101. For purposes of this disclosure, where not stated otherwise, a "camera device" includes at least such components that are commonly understood as required to be present at or near the location of the subject(s) of the image frames captured in a video recording. More particularly, a camera device includes at least a lens and an image sensor optically coupled to the lens. In the illustrated embodiment, in addition to the lens 102 and image sensor 104, the camera device 101 further includes the video processor 106, the storage device 108, the microprocessor 110, the display 112, the manual controls 116 and the automatic controls 118. In other embodiments, any of the latter group of components can be remotely coupled to a camera device.

Figure 2:
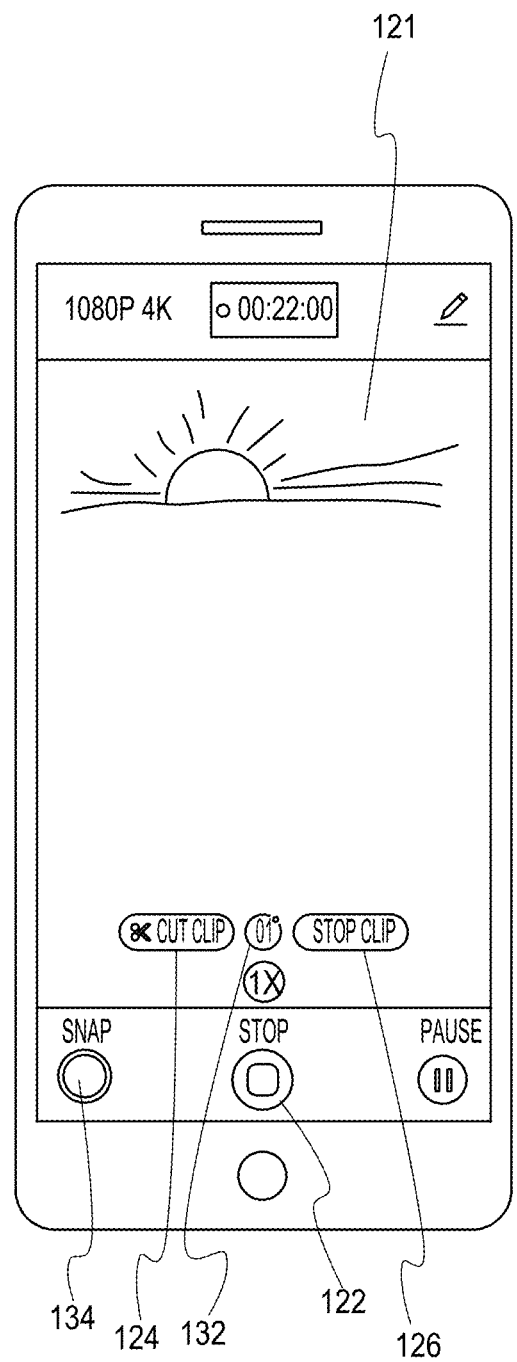
FIGS. 2-3 are screenshot views of an exemplary touch-screen user interface for a video recording system constructed per this disclosure.
Figure 24:
FIG. 24 is a screenshot of a viewfinder before appending footage to a selected video file by activating a record control.

Turning to FIG. 2, an exemplary interface for the camera operator is disclosed. The exemplary interface includes a digital viewfinder window 121, displaying a live scene captured by the camera 102-106. The exemplary interface also includes a record/stop control 122 (also interchangeably referred to herein as the record control 122 or the stop control 122 in applicable contexts), which may, for example, comprise a "button" image in an actuatable area of a touchscreen, which can toggle between displaying a standard circle symbol commonly associated with recording, when no recording is in progress, and a standard square symbol commonly associated with stopping a recording, when a recording is in progress. When the "record" circle is displayed (as shown for example in FIG. 24) a user activating the record control 122 initiates a recording, and when the "stop" square is displayed (e.g., FIGS. 2-3), a user activating the stop control 122 stops a recording and commits to storage a physical main stream of video data that was captured between the previous two activations of the record/stop control 122. It should be understood that other embodiments within the scope of the disclosed system and method can represent a record/stop control and its states in many different ways, and still others can use a dedicated record control and a separate stop control.

It should be noted that systems illustrated herein can be utilized with camera systems (or smartphone, tablet, and other systems) that utilize multiple cameras or multiple lenses. For example, it is known in the art to record from multiple cameras or lenses simultaneously; for example, a wide-angle camera or lens can be used to record an entire scene (such as an entire stage), while a zoom camera or lens can be used to record the center of a scene (such as a part of the stage where the action is).

It should be noted that certain embodiments may not include all of the components illustrated in FIG. 1 and described above. For example, a "screen recorder" implementation of the disclosed video recording system 100 (which could be used for teleconferencing, for example) would not require a lens 102, an image sensor 104, or a video processor 106. In such embodiments, the microprocessor 110 or other suitable processor can be instructed to read each of a series of digital image data frames from a digital video data stream as the corresponding digital image frame is displayed on, or just before it is sent to, a system display (such as a computer monitor or the integrated display screen of a laptop, smartphone, or other electronic device), write the series of digital image data frames to storage as a digital video data stream, and use the digital video data stream in the same ways as described for any embodiment of the disclosure. For example, instead of reading digital image data frames from the image sensor 104 or video processor 106 of a camera, or from locations in the storage 108 where the video processor 106 has written them, the microprocessor 110 can read each digital image data frame from a graphics card (not shown) just before the frame is sent to a display. More particularly, the software of the system 100 may request the digital image data frames from a device operating system (OS), which can grant the request by allowing the microprocessor 110 to read each digital image data frame and pass it to the system software, just before it is sent to the display. This can allow the OS to refuse to permit an app to record a screen where content with digital rights management (DRM) protections is playing. In addition, some embodiments may not require a network interface 114. Other embodiments may similarly not require other components. For example, the network interface 114 can interface directly with the video processor 106 and even the image sensor 104, so that video can be directly streamed to a remote device 120 via the network interface 114. In addition, certain other components, such as a microphone, may be present in the video recording system 100, but have been omitted for brevity and clarity.

Live Clip Control(s)

Figure 42:
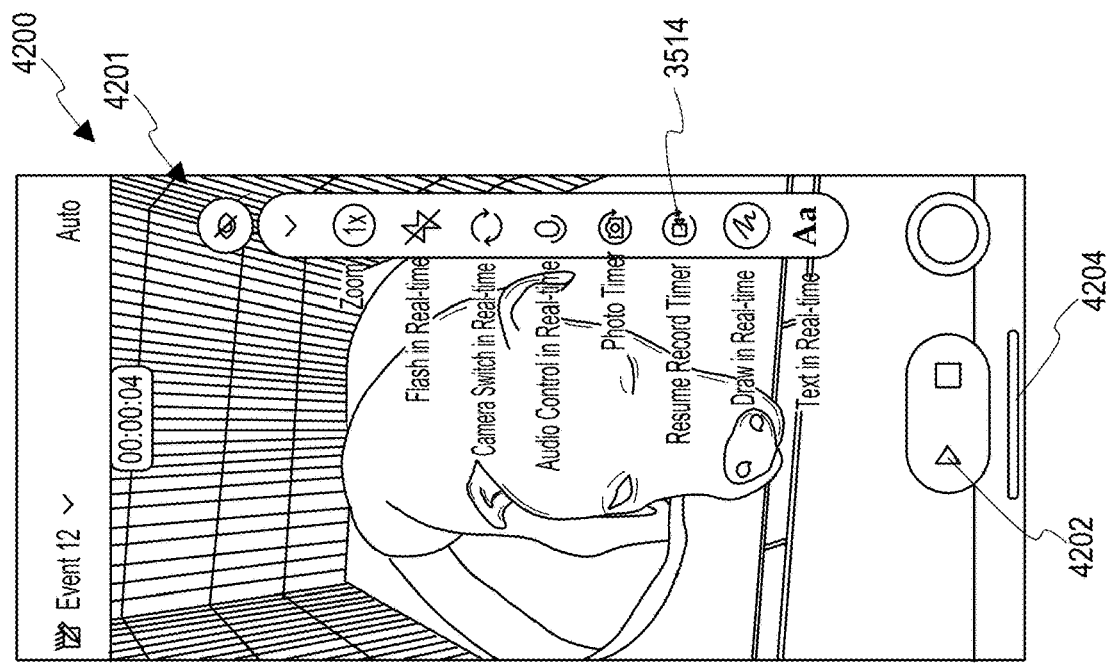
FIG. 42 is a screenshot of a video recording system application interface showing a video recording in progress before a pause control and resume-record timer are activated.

The exemplary interface also includes a number of new controls, including at least one live clip control for setting in real time the start and end points (in time), respectively, of a clip or segment comprised within a main video recording in progress, while the main video recording continues to be recorded, that is, while a stream of still image frames that will collectively form the video content of the main video recording, hereinafter referred to as a "main stream" or a "physical main stream" of video, continue to be captured by the camera (102, 104, 106) and read from the camera by the processor 110. As illustrated, a cut (start) clip control 124 and stop clip control 126 are separate controls for setting the start and end of a clip, respectively, while in other embodiments, such as that shown in FIG. 42, a single clip control 4224 can be used to set the start pointer of a clip when no clip is currently being recorded and the end pointer of a clip that is currently being recorded. The appearance of the clip control 4224 can change somewhat when a clip is being actively recorded, such as by blinking or changing color or shape (not shown). Functionally, the clip control 4224 is analogous to the start clip control 124 when no clip recording is in progress and to the stop clip control 126 when a clip recording is in progress.

Figure 3:
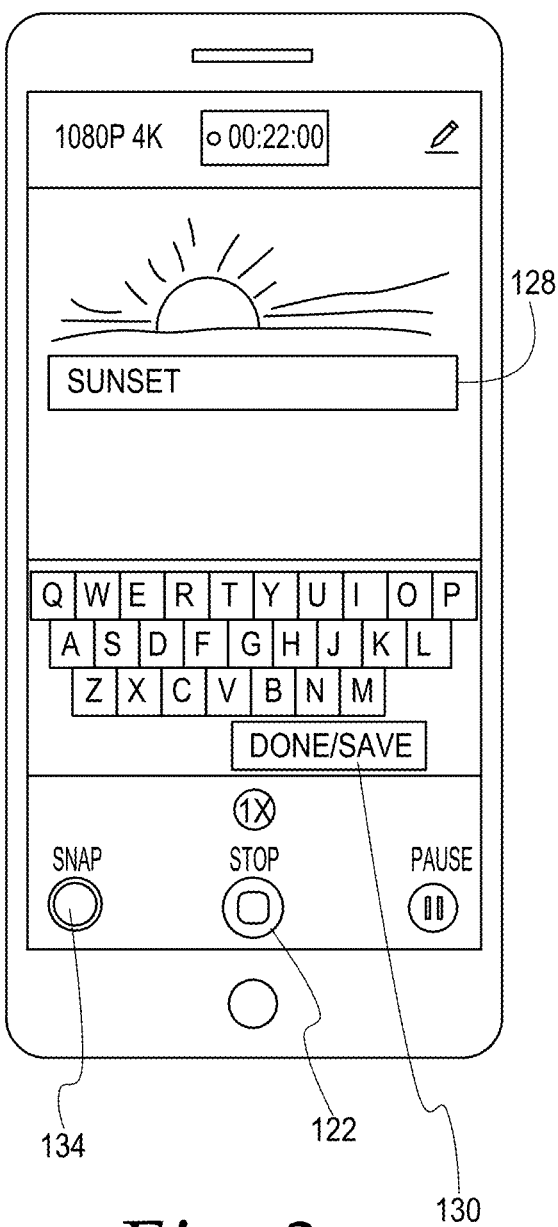

When the cut clip control 124 is activated, a keyboard, such as a smartphone system keyboard, can appear to allow a clip name to be entered and displayed, for example, in a text box 128, as shown in FIG. 3. Once the name is entered, the done/save button 130 can be pressed to save the name for the newly created and labeled clip. In addition, when the cut clip control 124 is pressed, and as explained further herein, the video recording system 100 creates a new clip stream while continuing to record the physical main video stream, the clip stream starting at the time index that the cut clip control 124 is activated and ending at the time index when the stop clip control 126 is activated. The clip stream created by the cut clip control 124 is a subset of the main stream; i.e., it contains the same video and audio content as the portion of the main stream beginning at the starting time index of the clip stream and ending at the ending time index of the clip stream.

When the stop clip control 126 is pressed, the new clip stream is assigned an end time index, and the new clip stream is closed. When a clip stream is being actively recorded a visual indication can be displayed; for example, a counter 132 can be displayed showing a number of the particular clip stream among those of the main stream recording in progress; for example, if it is the first clip stream to be extracted from the current main stream, a "1" will appear as shown in FIG. 2.

The exemplary interface also includes a snap control 134. The snap control 134, when activated, will commit a still image of the present screen to storage; i.e., it will take a screenshot of the instant video image. In embodiments, capturing a screenshot can cause the app to display a keyboard and textbox to prompt the user to label the single frame captured, in like manner to the prompt illustrated in FIG. 3 for the user to label a clip stream.

Figure 4:
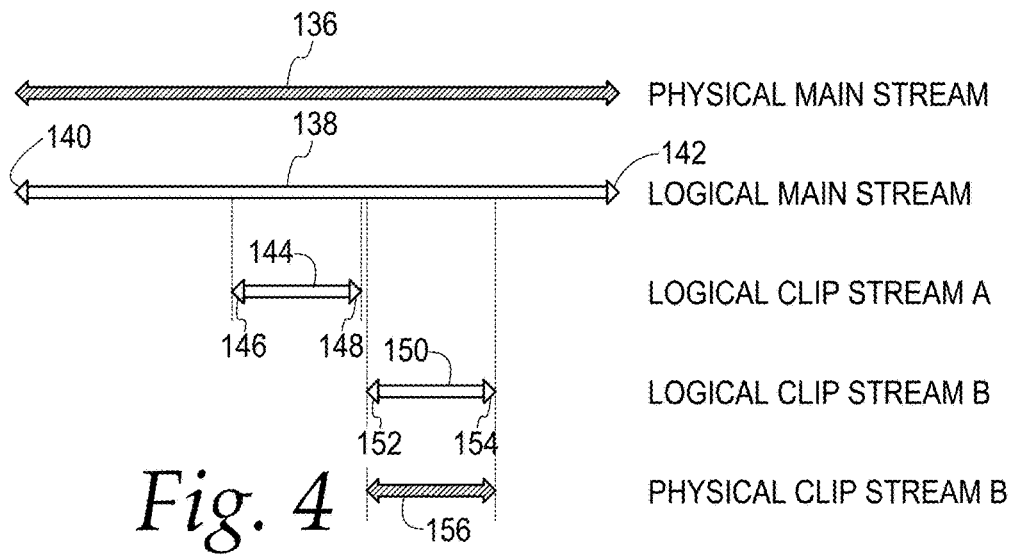
FIG. 4 is a structure diagram illustrating the different types of streams discussed herein and the relationship between those different types of streams.

FIG. 4 conceptually illustrates different stream types. While the terms "video stream" or "stream" are used herein, it should be understood that a stream can include both video and audio. In addition, it will be noted that the terms "master" (appearing as text in some drawing figures) and "main" are used interchangeably in this disclosure. Likewise, "stream" is interchangeable with "bitstream," and "label stream" (in some drawing figures) is interchangeable with "clip stream." At the top is shown the physical main stream 136. The physical main stream 136 is shown as filled in to represent that this stream occupies physical memory locations in the storage 108; i.e., it has been written to a physical medium. Generally, a given video recording system 100 will only have one active physical main stream 136 at a time. The physical main stream 136 is instantiated when, for example, the user activates the record control 122. Below the physical main stream 136 is depicted a logical main stream 138, which is shown as an outline to indicate that it is strictly a logical construction, i.e., it exists as a pair of pointers to physical memory locations. In particular, a logical stream consists of a start pointer 140—in the case of the logical main stream, the start pointer will point to the start of the physical main stream. The logical stream also includes an end pointer 142—in the case of the logical main stream, the end pointer will point to the memory locations in storage 108 holding the most recent frame of video that has been recorded. The end pointer 142 of the logical main stream will be updated after every frame. It should be noted that the creation of a logical main stream 138 is a matter of programming convenience, and the disclosed video recording system 100 can be implemented without creating a logical main stream 138.

When a clip stream is created, it can be created as a logical stream, and its start pointer is assigned the present value of the end pointer 142 of the logical main stream 138. This operation corresponds to, for example, a user activating a cut clip control 124. As the video is recorded and stored in the physical main stream 136 and tracked by the logical main stream 138, the end pointer of the clip stream is continuously updated to match the end pointer of the logical main stream; i.e., it will point to the latest frame of video that has been recorded. When the clip stream is ended, its end pointer is fixed to the value of the end pointer 142 at the time that the clip stream is ended. The fixing of the end pointer of the clip stream can correspond to a press of the stop clip control 126 shown in FIG. 2. For example, logical clip stream A 144 has its start pointer 146 pointing to a first-time index of the logical main stream 138, and its end pointer 148 pointing to a second-time index of the logical main stream 138 that is later than the first-time index. Logical clip stream B 150 was created a short time after the end of logical clip stream A; accordingly, the start pointer 152 of logical clip stream B 150 has a somewhat later time index than the end pointer 148 of logical clip stream A. Similarly, the end pointer 154 of logical clip stream B 150 has a later time index than the start pointer 152 of logical clip stream B 150. While clip streams can be utilized in a strictly logical format, in certain cases, it may be desirable to write the clip streams to actual physical storage. In such a case, a physical stream can be created. For example, in the case of logical clip stream B 150, a corresponding physical stream 156 is also shown. Similarly, the creation of logical clip streams can be done away with entirely, and physical streams can be created instead, which will result in duplication of memory storage used for the clip streams.

Method of Creating Live Clips from a Recording in Progress

Figure 5:
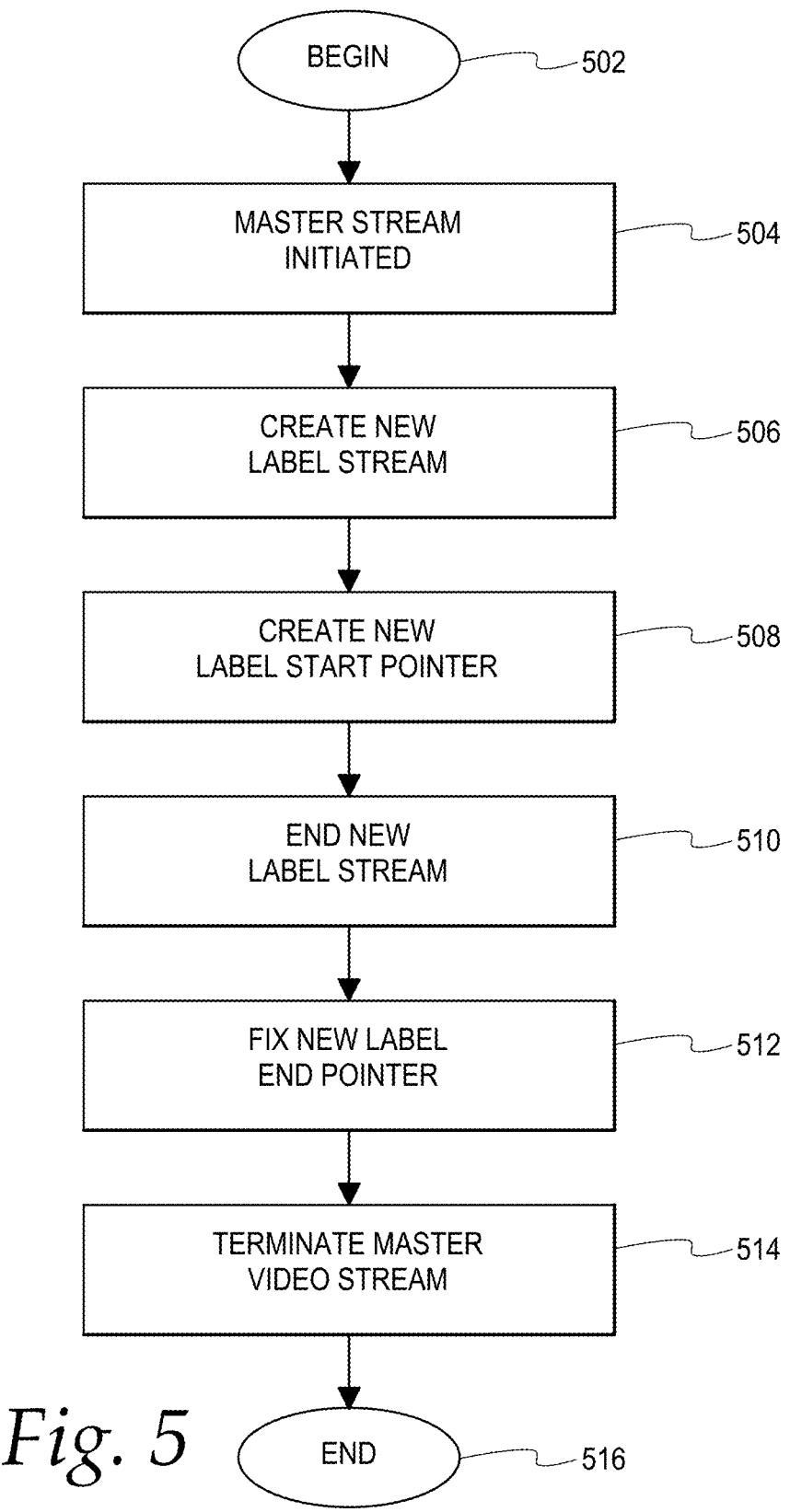
FIG. 5 is a simplified flow chart illustrating the software operation of a video recording system constructed per this disclosure.

Turning to FIG. 5, a simplified flowchart depicting the operation of a video recording system 100 constructed in accordance with this disclosure is shown. In particular, in step 502, the video recording system 100 is initiated, i.e., it is turned on; startup tasks are performed, etc. In step 504, the record control 122 is activated, and a main stream initiated. As explained above, this would create both a physical main stream and a logical main stream. This step corresponds to, for example, the activation of the record control 122, as depicted in FIGS. 2 and 3. In step 506, a new clip stream is created, and in step 508, the new clip stream start pointer is created. As explained above, the new clip stream's start point is set to the present end pointer of the logical clip stream. This operation corresponds to, for example, the activation of the cut clip control 124, as depicted in FIGS. 2 and 3. In step 510, the clip stream is ended by the activation of the stop clip control 126 (as shown in FIGS. 2 and 3), and its end pointer is fixed to the most recent value of the logical main stream in step 512. In step 514, the main stream is terminated, which is usually accomplished by the user pressing the record control 122 again to cease recording, as depicted in, for example, FIGS. 2 and 3. In step 516, the video recording system 100 is turned off, ending the operation of the system.

Example Uses of Live Clip Creation

The structure and operation of the disclosed video recording system 100 have thus been set forth herein. With regard to its application, this system can have several advantageous uses. The first application would be for the recording of a live performance that will consist of numerous subparts, such as, for example, a school talent show. At such a performance, the video camera operator could create a separate clip stream for each performance, and name the streams appropriately; i.e., a first clip stream could be named John Smith (assuming that John Smith was the student performing), while a second clip stream could be named Ann Jones. Then, the individual clip streams could be exported to a website, and parents could then download only the video applicable for their child.

The disclosed video recording system 100 could also be integrated into a security camera system deployed at, for example, a workplace. The disclosed video recording system 100 could be adapted to create separate clip streams for each event, such as a particular location within the workplace (like the kitchen or shop floor) over a particular time frame, such as 10 AM to 10:30 AM.

The disclosed video recording system 100 could also be integrated into a traffic camera system deployed at a stoplight. Separate clip streams could be created every time that a traffic light changed states, such as from green to red or vice versa. Such a system would allow the system operators to easily identify applicable video when, for example, a person that received a violation notice due to the traffic camera system chose to challenge that violation.

Similarly, the disclosed video recording system 100 could be integrated into an operating room black box system. As an operation proceeded, the video camera operator could create different clip streams for each phase of the operation; i.e., preparation, initial incision and cut down, tumor resection, closure, and clean up (assuming the procedure involved the removal of a tumor). Such a system would allow a subsequent viewer to easily access only the part of the operation that was of concern.

Events: Creation and Labeling/Tagging

Figure 6:
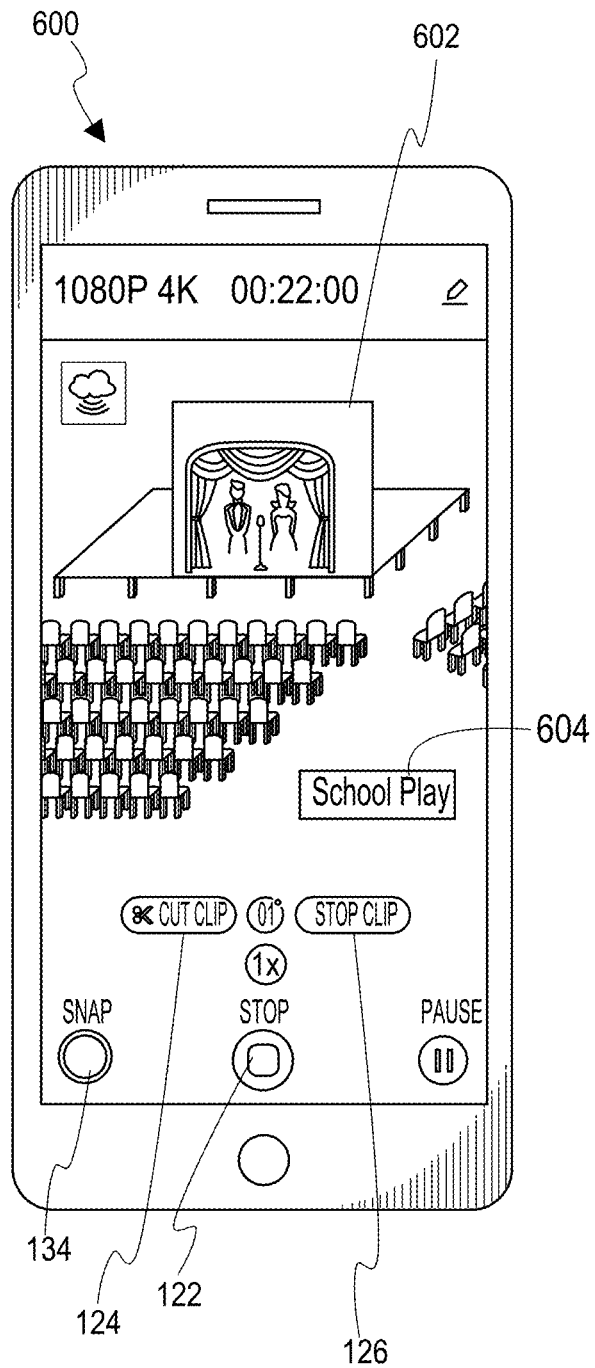
FIG. 6 is a screen shot view of an event being recorded by a video recording system.

According to another aspect of the disclosure, video recording systems are provided with controls for creating "events" and tagging media files with an event label (e.g., a descriptive name), to assist with organizing the files together with other files tagged with the same event label, for ease of identification/location and access. Turning now to FIG. 6, a video recording system 600 associates video streams with an event 602 by tagging the streams with an event name 604.

In some embodiments, the event 602 can be a calendar event, a user-generated event, a social media event, or a holiday event. As referenced, the event 602 is a school play that is being recorded with the video recording system.

Continuing with FIG. 6, a cut clip control 124 allows the system user to create additional clips as discussed earlier herein, and then label the video clips with a name, separate from the event name 604. A stop clip control 126 terminates the recording of the video clip (clip stream), after a desired length of video has been recorded. (It should be noted that the terms "clip" and "clip stream" are used interchangeably herein.) When the cut clip control 124 is activated, a keyboard and text box can appear for entering a clip name, just as illustrated in FIG. 3 and described above for clip creation outside the context of an event-labeled main stream. Once the name is selected, a done/save button can be pressed to save the name for the newly created clip stream.

Figure 7:
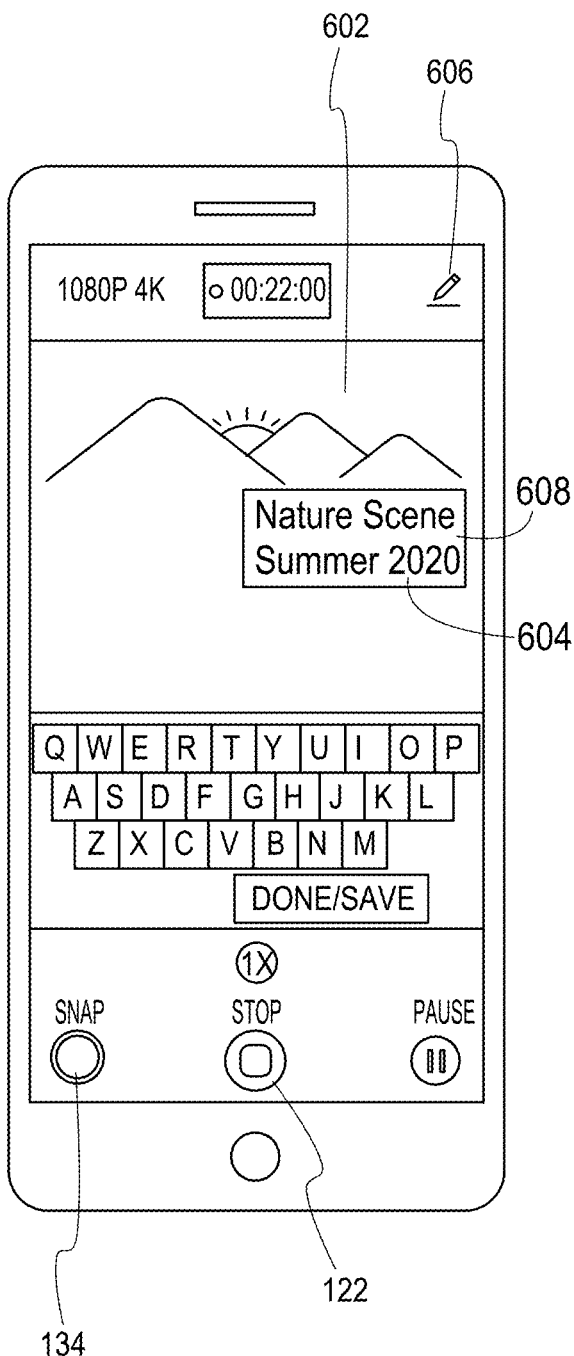
FIG. 7 is a screen shot view of another event being recorded by a video recording system.

As FIG. 7 shows, the video recording system 600 is configured with a unique event control 606 for labeling the event 602 with an event name 604, before recording the video or images that associate with the event 602. In a non-limiting embodiment, the video recording system 600 prompts a user to create a new event, such as by typing the event name 604 using a keyboard interface, or to select an existing event from a list of names 604 of previously created events.

For example, FIG. 7 references a nature scene at the lake labeled with an event name of "Nature Scene-Summer 2020", entered by a user into the text box 608. The user may review the video clip of the nature scene in the future by looking up and playing the file "Nature Scene-Summer 2020". In another example, a warehouse inventory job is filmed and labeled as "Warehouse #10-Inventory Jan. 7, 2020". In yet another example, a security camera in front of a gas station records the interior of the gas station 24/7. The event can be rush hour, which is defined as a busy time of the day. The event can be labeled, "Security-Friday 11 am-2 pm" or "Security-Friday-Rush Hour".

Events: Subevent Creation and Labeling/Tagging Controls

Turning to FIG. 8, in alternative embodiments of the video recording system 600, an event 800 comprises one or more subevents 800a, 800b. The subevents 800a-b are simply clipped segments of the main video stream for the event 800. Thus, the recorded event 800 can be organized into smaller sections of video streams. FIG. 8 references a block diagram, showing the relationship between a soccer tournament event 800 and two corresponding subevents 800a-b.

In this example, the event 800 is a Naperville Soccer Tournament, which occurs over a span of two days. Two subevents 800a, 800b of the soccer tournament event 800 are broken down into the individual days: "Day 1—Playoffs—A vs B" (Sub Event 1); and "Day 2—Playoffs—C vs D" (Sub Event 2). By breaking down the soccer tournament event 800, into video streams of separate days, the operator can access the desired playoff game, or more specific video timelines and locations that make up the event 800 can be selectively viewed. In yet another embodiment, the subevents 800a-b can be broken down into sub-subevents, and so on. For example, "Day 1 Playoffs—A vs B" is subdivided into a "First Half of the Game" and a "Second Half of the Game". Furthermore, the events 800 and subevents 800a-b can be stored in folders 906a-c and subfolders for organizing the video streams in a desired configuration.

Further, the video recording system 600 can record an event 602 that encompasses the entirety of a main video stream or a clip of the main video stream, with an associated logical clip stream and physical clip stream that are defined according to a previously described embodiment, which can be created using the cut-clip and stop-clip controls 124, 126 as previously described. It is significant to note that this event-organization feature is in addition to the labeling feature, described above, in which clip streams of the main video stream are labeled with a name, time stamp, or location. Thus, by associating the video streams with events, along with other names and labels, the video recording system 600 allows for selective querying of the video streams across various types of events, labels, time stamps, locations, and other categories known in the art of video.

The event labeling is also useful for organizing video streams to be more easily identified and accessed. By associating the main video stream with an event 602, the video streams can be organized for selection based on the type of event 602. Thus, used in conjunction with the name labeling described above, the video streams are adapted for event-based organization, name-based organization, time-based organization, and location-based organization.

As referenced in FIG. 7, the video recording system 600 includes an event control 606 for labeling the event 602 with a user-defined event name 604. In some embodiments, the event control 606 may include, without limitation, a hard button, a touch display on a smartphone, a voice control operated by voiced recognition software, or another type of control that is operable on the body of the video recording system. The event control 606, along with any of the other controls, may appear and disappear based on the needs of a particular scenario.

The event control 606 is activated by the operator to enable labeling of the event 602 with an event name 604 to as user-defined specification. The event 602 is generally labeled prior to commencement of recording. This pre-recording labeling feature helps the operator in managing the labeling and organization of events while recording the video.

When the event control 606 is activated, a keyboard 700, such as a smartphone system keyboard, can appear to allow an event name 604 to be entered in an event name control box 608. The event name control box 608 may include a graphical depiction of a text box into which alphanumeric digits are entered.

As shown in FIG. 7, the keyboard 700 is configured to allow the event name 604 to be entered in the event name control box 608. This can be performed by typing, speaking, or other data entry means. For example, the operator can simply type or voice the desired event name 604 into the keyboard 700. Once the event name 604 is selected, the done/save button 166 can be pressed to save the event name 604 for the newly created event-labeled video stream. After naming the event 602, the record control in the video recording system 600 is activated to video record the event 602.

Also as described above, clip streams clipped from the main stream can be labeled with a name, location, or time stamp through use of cut clip and stop clip controls 124, 126. This labeling function can be in conjunction with the event name 604 given to the video stream. That is, the video streams can be labeled solely with an event name 604, additionally labeled with a separate name, time stamp, and/or location, or solely labeled with a name, time stamp, and location label, without being associated with an event name 604.

It is also significant to note that while the labeled video streams are clip streams taken from the main video stream; the event 602 can be associated with an entire main video stream or one of the clip streams. The number of video clips, length of video clips, and duration between multiple video clips can also be labeled to assist in subsequent searches or a desired video clip. The user can enter the name of the video clip after the recording has started and all of the video clips will be named accordingly.

Figure 9:
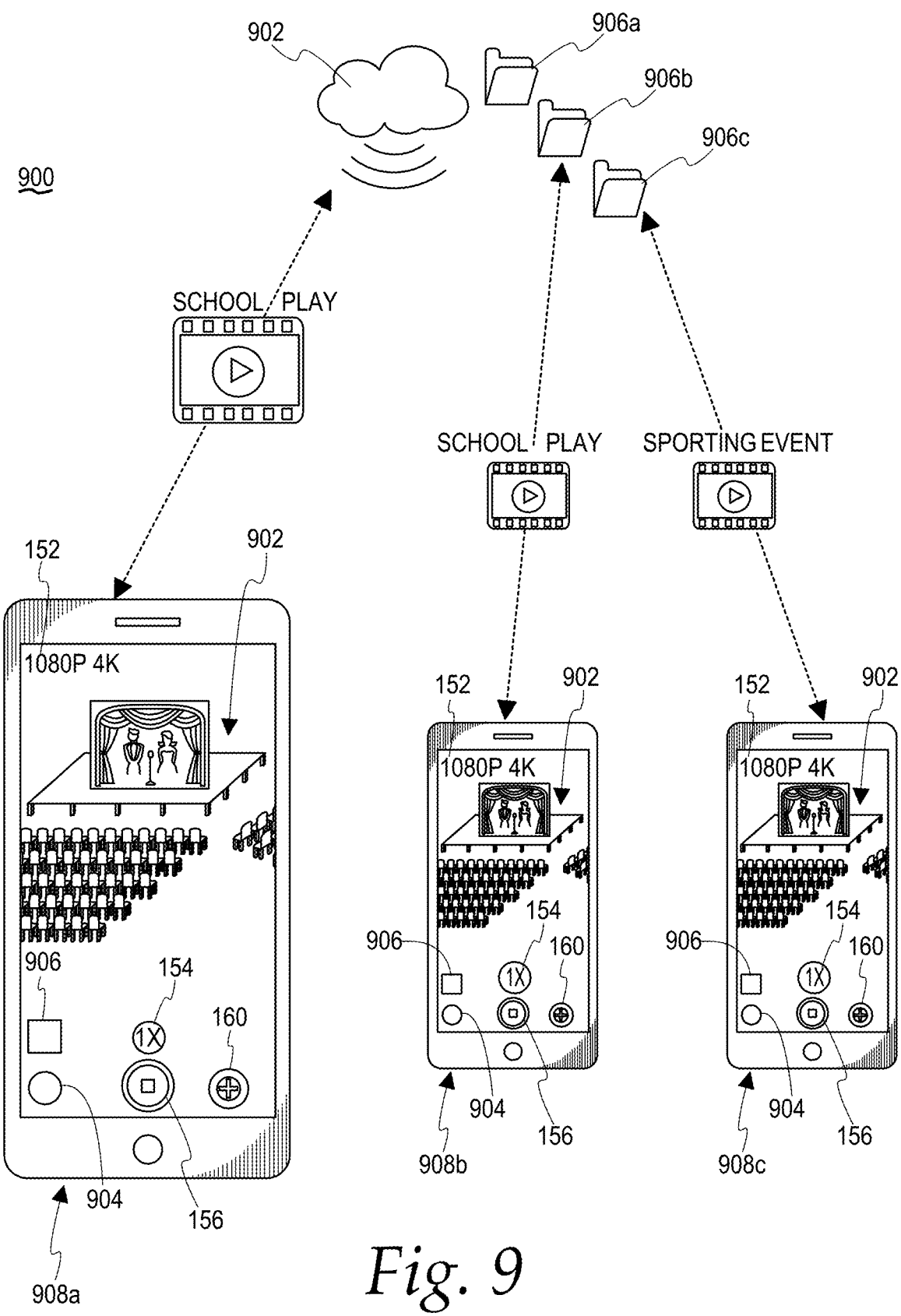
FIG. 9 is a block diagram of a network for multiple video recording systems to access an event-labeled video steam from a remote data storage unit.

With reference to FIG. 9, the video recording system 600 is also unique in that the video clip is stored as a file, which can be either automatically labeled by default; or labeled by the operator, and members of a network 900. Thus, both the file and the video clip contained therein can be labeled with a user-defined, or default name. In one possible embodiment, when the user does not enter the event name or the video clip name, the video clip, or file thereof, may be labeled by default. This helps the user organize the video clips in a less random manner. Thus, a default file naming scheme provides a logical set of rules that facilitate labeling, and subsequent searching, for a video clip.

In one possible embodiment of the default file naming scheme, the manual input of a file, or video clip, label takes precedence over any default labels. The user-named video clip labels may be organized in alphabetic order, or by date, file size, or other organization means known in the art. Furthermore, while watching a video clip on a computer, a companion app on the phone, tablet, or smartwatch enables the video clip being watched to be saved, and potentially labeled.

If the user does not wish to name an event, a default event name of the form "Event #" is used. Event #may include, for example: Event1; Event2; and Event3. Alternatively, a user can enter a name for an event, such as "NatureScene," and the names of subevents thereof can default to the form "NatureScene #;" e.g., "NatureSceneClip1" can indicate a morning video clip of a lakeside, "NatureSceneClip2" may be an afternoon video clip of a lakeside, and "NatureSceneClip3" may be a night time video clip of a lakeside. Similarly, snaps taken from a main stream recording associated with an event can be labeled by default in the form Event1Snap1, Event1Snap2, etc. In yet another embodiment, a video clip of a scene as a subevent of an event can be labeled [Event Name] [Scene Name], where [Event Name] corresponds to a user-entered event name and [Scene Name] corresponds to a user-entered subevent name.

It should be noted that a user can enter a name before or after recording of a particular event has started. For example, a user can press the record control 122 and then (after recording has started) activate the event control 606 and enter a name for the event as described above.

Alternatively, the user can assign a name for a folder, in which case the naming will be as follows: AssignName1 and AssignName2. Thus, in this example, the folder could be labeled SchoolLecture1 and SchoolLecture2. The video clips inside the folders may then be labeled: AssignName1Lecture1 and AssignName1 Lecture2. For example, SchoolLecture1MathLesson1 and SchoolLecture1MathLesson2, with both math lessons (MathLesson1 and MathLesson2) being in the same folder, SchoolLecture1. Snaps may be labeled similarly.

In an embodiment, the media is copied from an outside source into a folder; i.e., from a standard camera into this app using an SD card or similar, the folder name will be prepended to the existing name. Thus, AssignName1 Video1 and AssignName1 Video2 would be the names of video files Video1 and Video2 copied from an outside source into the folder AssignName1.

Furthermore, if a video file is copied from a first folder to a second folder, the old folder name prefix is removed and the new folder name is prepended to the file name in its place. Thus, OldfolderName1Clip1 becomes NewfolderName1Clip[X], where X is one greater than the highest numbered clip in the folder. For example, if SchoolLecture1 MathLesson1 is the highest number clip name in a folder, the next clip copied into the folder will be named SchoolLecture1MathLesson2. Such labeling schemes help the operator, or members of a network 900, to better organize the video clips.

Events: Remote/Network Accessible Storage of Event-Labeled Media

Turning to FIG. 9, the video recording system 600 is also unique in that an event-labeled video stream 904 is securely storable for organized identification and access by the operator, or members of a network 900. In one embodiment, the event-labeled video stream 904 stores directly into the storage device 108 that is coupled to the video processor (See FIG. 1).

In a second possible video storage embodiment, the event-labeled video stream 904 is manually transmitted to a remote data storage unit 902 for storage thereon. In this storage configuration, the remote data storage unit 902 is in communication with the storage device and/or the processor of the video recording system 600. In some embodiments, the remote data storage unit 902 may include, without limitation, a cloud, a server, a database, a processor, a digital library, and a records storage site.

This remote transmission, storage, and organization to the remote data storage unit 902 can be performed automatically, or through manual transmission of the video stream. For example, in automatic transmission, the event-labeled video stream 904 is automatically transmitted and stored in the remote data storage unit 902 without input from the operator. For example, integrated software in the storage device triggers the transmission of video streams to the remote data storage unit 902 when the record control 122 is activated to begin recording video. Thus, when the record control is active, the video stream associated with the event 602 automatically transmits to the remote data storage unit 902 for storage.

However, in other embodiments, it may be advantageous for the operator to manually initiate the transmission of event-labeled video stream 904 to the remote data storage unit 902. Thus, the video recording system 600 provides a remote storage control 906. The remote storage control 906 displays on the interface, adjacent to the event control 606 (See FIG. 7). The remote storage control 906 is configured for activation by the operator to manually initiate transmission of the video streams to the remote data storage unit 902. Conversely, the operator can activate the remote storage control 906 to initiate transmission of the video streams from the remote data storage unit 902 to the storage device in the video processor. In this arrangement, the event-labeled video streams 904 transmit in both directions, per request of the operator.

The remote storage control 906 may include, without limitation, a hard button, a touch display on a smartphone, a voice control operable with voice recognition software, or another type of control. Thus, the video stream associated with the event 602 can be manually transmitted to the remote data storage unit 902 through activation of the remote storage control 906.

Turning now to FIG. 9, the event-labeled video stream 904 is not only stored but segregated in the remote data storage unit 902. This helps organize the video streams for easy identification and access. Thus, the remote data storage unit 902 is adapted to both store and segregate the logical main stream of video that is labeled with the event name 604. For this purpose, the remote data storage unit 902 comprises multiple folders 906*a-c*.

In one possible embodiment, the folders 906*a*, 906*b*, 906*c* are configured to segregate multiple main video streams of video labeled with the event name 604. The folders 906*a-c* can themselves be labeled with indicia to differentiate between the different event names 1104 applied to the video streams contained therein. The folders can also be labeled with the event name 604. A date and time stamp may also be associated with the folders to indicate when the video stream was created.

As referenced in FIG. 9, the video recording systems 908*a*, 908*b*, 908*c* communicate with the remote data storage unit 902, and with each other, through a network 900. In some embodiments, the network 900 may include, without limitation, an Internet, an IEE 802.11 wireless network 900, a 4G cellular network 900, a 5G cellular network 900, and a wired network 900.

Consequently, the network 900 allows multiple members to remain in communication with regards to the event-labeled video streams. In this manner, multiple video recording systems 908*a-c* may simultaneously access the video streams associated with the event 602 from the remote data storage unit 902.

Events: Structure of a Network for Remote Storage of Event-Labeled Media

Continuing with FIG. 9, the network 900 includes multiple video recording systems 908*a-c* that are operated by different members of the network 900. Any network member can share an event name 604, so that other members can access the corresponding video stream. The network members can also access the remote data storage unit 902 to download and view the video streams associated with the event name 604. The event name 604, or other labeling, i.e., name, time stamp, location, helps network members identify and access the desired video streams.

In another possible embodiment, the network 900 is controlled by a network administrator who regulates access to the video streams that are stored and transmitted to and from the data storage unit 902. This regulation can include recording the event 602, applying an event name 604 to the event 602, and making the different event names and labeled video streams accessible to select members of the network 900. For example, the network administrator may require a password or credentials before granting access to an event name; and thereby viewing the event-labeled video stream 904. In another example, the administrator allows a sporting event to be made accessible to network members who pay a fee to watch.

In yet other embodiments, the network 900 utilizes a network interface 114. The network interface 114 allows the event control 200 and the input control to be activated by a network command. For example, the network interface 114 can interface directly with the video processor 106 and even the image sensor 104, so that video can be directly streamed to the remote data storage unit 902 via the network interface 114. In addition, certain other components, such as a microphone, may be present in the video recording system 600, but have been omitted for brevity and clarity.

Events: Methods of Tagging/Labeling, Recording, and Organizing Media by Event

Figure 10:
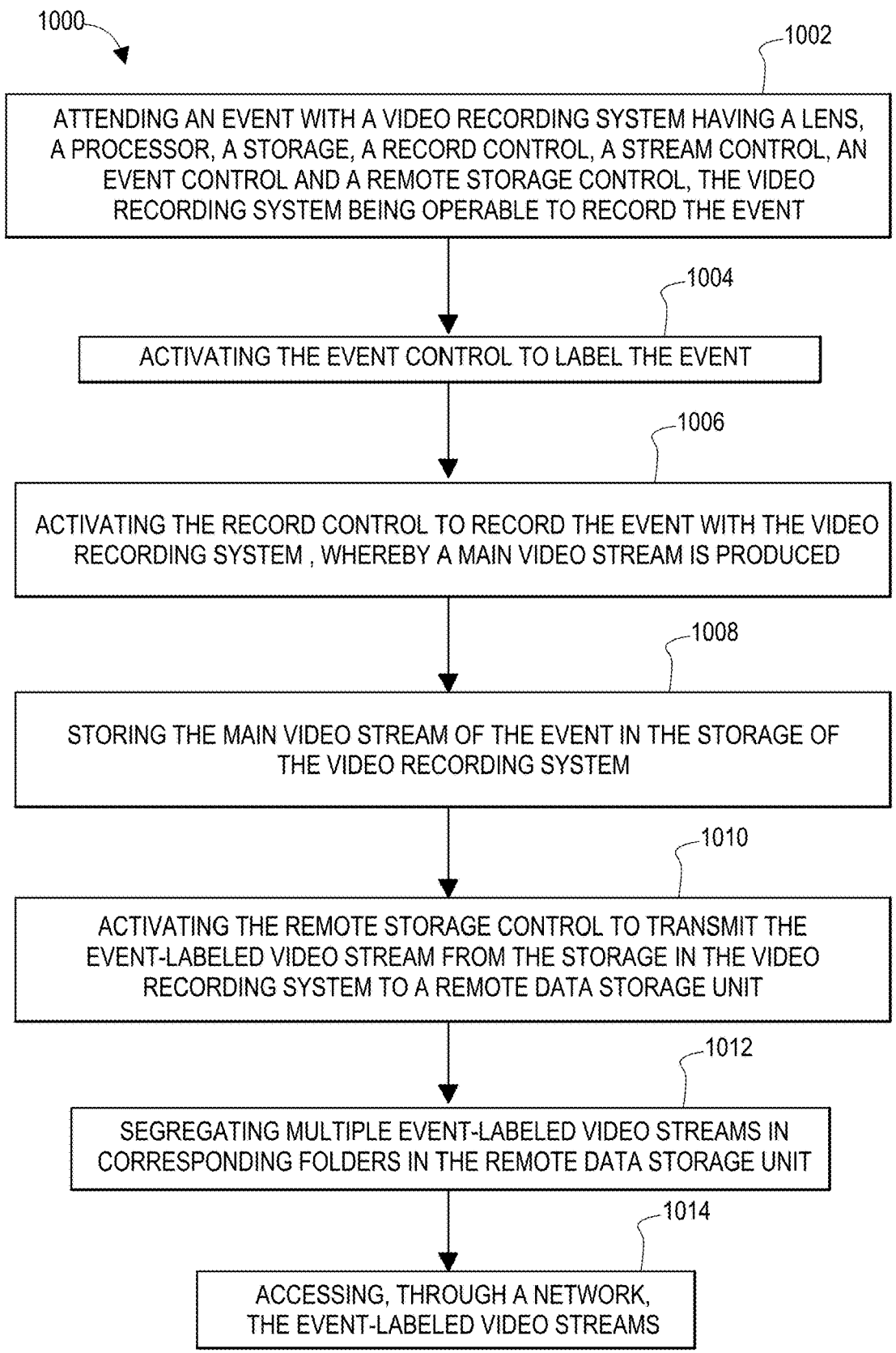
FIG. 10 is a simplified flow chart illustrating an exemplary method for associating a video recording to an event per this disclosure.

Turning to FIG. 10, a simplified flowchart depicts a method 1000 for associating a video recording to an event. The method 1000 may include an initial Step 1002 of attending an event with a video recording system having a lens, a processor, a storage, a record control, a stream or label control, an event control, and a remote storage control, the video recording system being operable to record the event. At this point, the video recording system 600 is initiated, i.e., it is turned on; startup tasks are performed, etc.

The method may further comprise a Step 1004 of activating the event control to label the event. The event control 200 is activated by the operator to enable labeling of the event 602 with an event name 604 to as user-defined specification. The event 602 is generally labeled prior to commencement of recording. This pre-recording labeling feature helps the operator in managing the labeling and organization of events while recording the video.

A Step 1006 includes activating the record control to record the event with the video recording system, whereby a main video stream is produced. The record control 122 allows the user to initiate or stop the recording of video.

In some embodiments, a Step 1008 may include storing the main video stream of the event in the storage of the video recording system. The video recording system 600 is also unique in that the event-labeled video stream 904 is securely storable for organized identification and access by the operator, or members of a network 900. In one embodiment, the event-labeled video stream 904 stores directly into the storage device 108 that is coupled to the video processor 106 (See FIG. 1).

A Step 1010 comprises activating the remote storage control to transmit the event-labeled video stream from the storage in the video recording system to a remote data storage unit. In another embodiment, the remote storage control 906 is activated to transmit the event-labeled video stream to the remote data storage unit 902 for storage. At this point, the main video stream is terminated, which is usually accomplished by the user pressing the record control 122 again to cease recording, as depicted in, for example, FIGS. 2 and 3.

The method 1000 may further comprise a Step 1012 of segregating multiple event-labeled video streams in corresponding folders in the remote data storage unit. The video recording system 600, an event 800 comprises one or more subevents 802*a*, 802*b*. The subevents 802*a-b* are simply spliced sections of the video stream for the event 800. Thus, the recorded event 800 can be organized into smaller sections of video streams. The event 800 and subevents 802*a-b* can be stored in folders 906*a-c* and subfolders for organizing the video streams in a desired configuration.

A final Step 1014 includes accessing, through a network, the event-labeled video streams. The network 900 allows multiple members to remain in communication with regards to the event-labeled video streams. In this manner, multiple video recording systems 908*a-c* may simultaneously access the video streams associated with the event 602 from the remote data storage unit 902. A network administrator may be used to regulate access and organization of the event-labeled video streams. Thereafter, the video recording system 600 is turned off, ending the operation of the system.

As discussed above, the disclosed system is an effective video recording tool for operating the system 100. The disclosed recording instrument and software applications provide a user-friendly tool to record and edit videos that are labeled as events and subevents of the larger events. The disclosed features also allows the recorded videos and video clips to be shared on a network. Thus, with the disclosed system, an operator can easily record an event, and then edit and modify the video recording, such that the video clips or sections of the recording can be saved, viewed, and shared.

Events: Illustrative Screenshots Displaying Media Organization by Event

For example, FIG. 11 is a screenshot of a mobile communication device 1100 displaying multiple events. The events listed include: A College Gathering event 1102, a My Summer Camp event 1104, an Emma Making Cake event 1106, and a James Wedding Anniversary event 1108. Further, a recorded icon 1110 indicates if the event has been recorded yet, or simply labeled in preparation for recording. As shown, the College Gathering event 1102 has been recorded and is ready for viewing.

Figure 12:
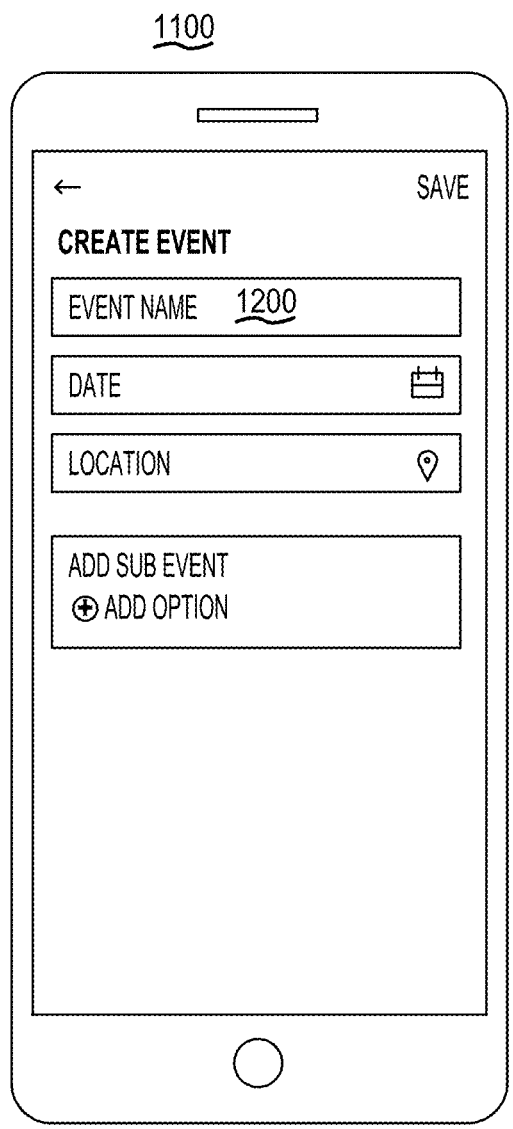
FIG. 12 is a screenshot of a mobile communication device providing an event text box to label the events.

The aforementioned events have user-defined labels. So, as FIG. 12 illustrates, a screenshot of a mobile communication device 1100 constructed in accordance with this disclosure provides an event text box 1200 to label the events. The user can simply type in the desired name for the event to be recorded. A keyboard automatically appears to enable the typing function. Though in certain embodiments, a voice recognition function can be utilized.

Figure 13:
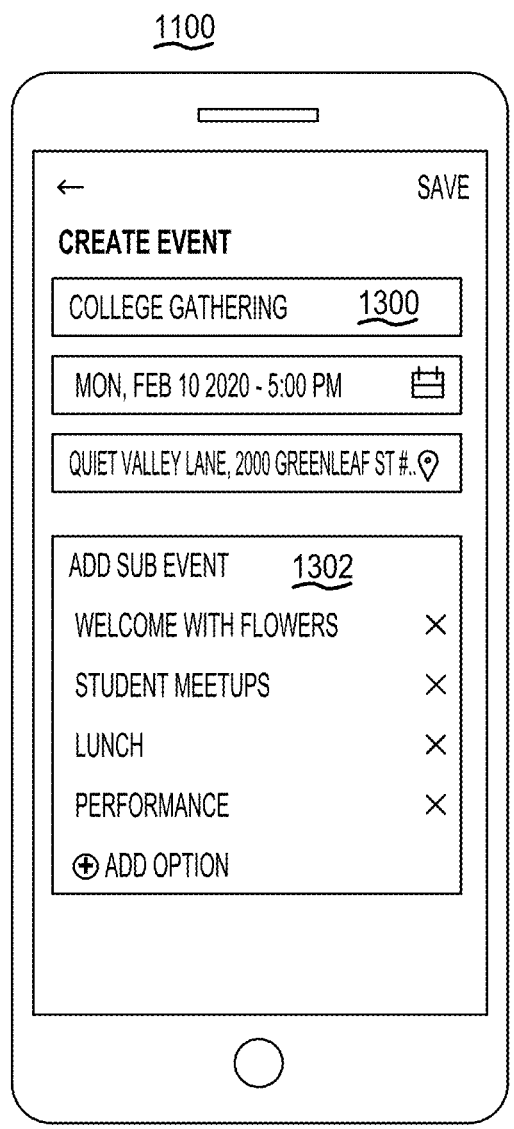
FIG. 13 is a screenshot of a mobile communication device displaying an event of a College Gathering, the location of the event, and the date and time of the event.
Figure 14:
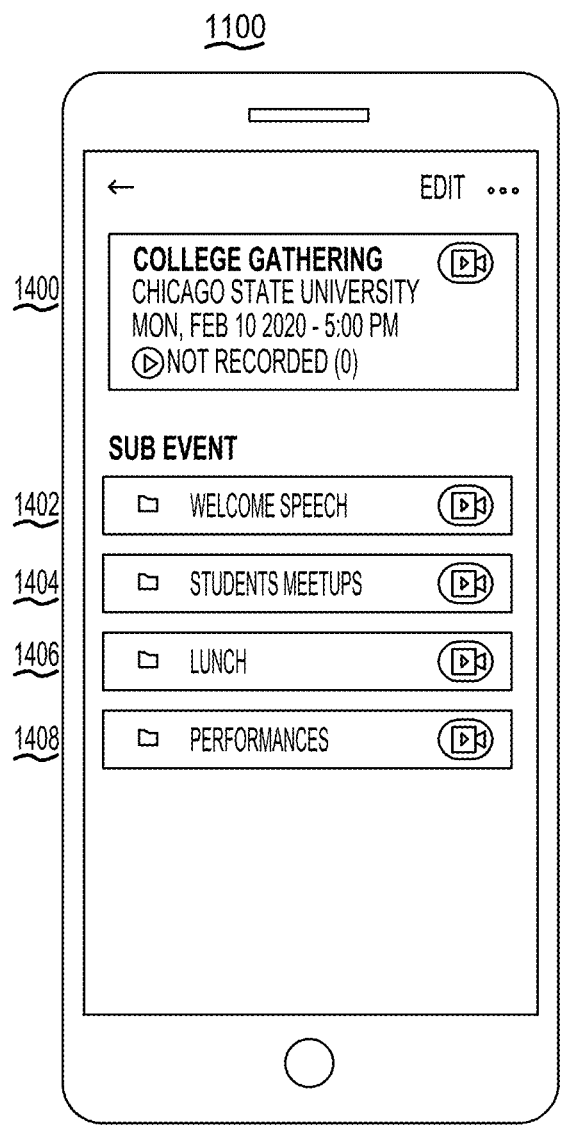
FIG. 14 is a screenshot of a mobile communication device displaying the subevents of the College Gathering event.

FIG. 13 is a screenshot of a mobile communication device 1100 with the event of a College Gathering 1300, the location of the event, and the date and time of the event, which are displayed in the event text box. A subevent text box 1302 is also available to label the subevents, if any are used. FIG. 14 is a screenshot of a mobile communication device 1100 displaying the subevents of the College Gathering event. The event 1400 displays in detail, including location and time. The subevents for the College Presentation event are labeled: Welcome Speech 1402; Student Meetups 1404; Lunch 1406; and Performances 1408. Both the events and subevents are ready for viewing.

Events: Event-Specific Record Controls and Clip Controls

Figure 14A:
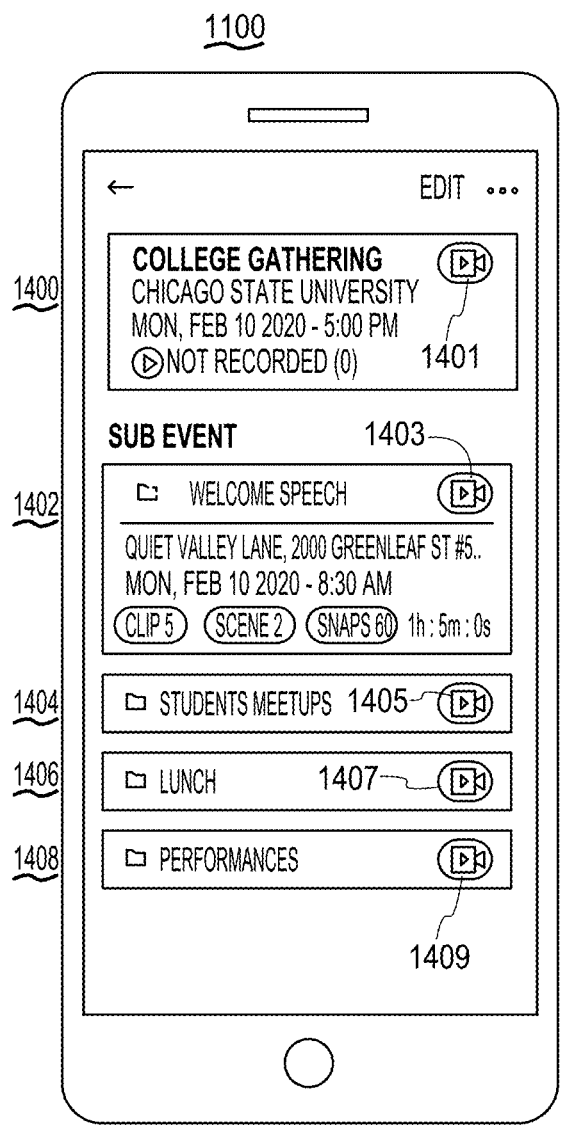
FIG. 14A is a screenshot of a mobile communication device displaying an expanded subevent of the College Gathering event.

FIG. 14A illustrates one manner in which events and subevents can be assigned to specific clips. In particular, if a user presses the camera icon 1401 associated with the College Gathering event control 1400, the software application will immediately begin to record a clip associated with the College Gathering event. Similarly, if a user should press the camera icon 1403 associated with the Welcome speech sub event, the software application will immediately begin to record a clip associated with the College Gathering event and Welcome speech sub event. Similarly, if the user presses one of the camera icons 1405, 1407, 1409 associated with the student meetups subevent, lunch sub event, or performances sub event, the software application will begin to record the appropriate clip which will be associated with the appropriate sub event and the College Gathering event.

Similarly, if a user should start recording the College Gathering event by, for example, pressing on the camera icon 1401 next to the College Gathering event control, a main stream associated with the College Gathering event will begin recording. If the user should then press the cut clip control 124 (referring to FIG. 6), the main stream associated with the College Gathering event will continue to record while a clip stream associated with the welcome speech subevent will begin to record. If the user should press the cut clip control 124 again the main stream associated with the College Gathering event will continue to record, the clip stream associated with the welcome speech sub event will terminate, and a clip stream associated with the student meetups sub event will begin to record. This can continue with the lunch sub event and the performances sub event, all of which were set up prior to the commencement of recording.

Similarly, referring to FIG. 20, if the record button 2000 is pressed (without pressing the camera icon 1401 associated with the College Gathering event control) the software application will record a main stream that can be associated with an event based on the time and location of the event.

For example, if a location function places the recording device at or near Chicago State University and the record button is placed between 2 PM and 5 PM on Monday Feb. 10, 2020, the main stream can be associated with the College Gathering event. If the user should then press the cut clip control 124 (referring to FIG. 6), the main stream associated with the College Gathering event will continue to record while a clip stream associated with the welcome speech subevent will begin to record. If the user should press the cut clip control 124 again the main stream associated with the College Gathering event will continue to record, the clip stream associated with the welcome speech sub event will terminate, and a clip stream associated with the student meetups sub event will begin to record. This can continue with the lunch sub event and the performances sub event.

Figure 15:
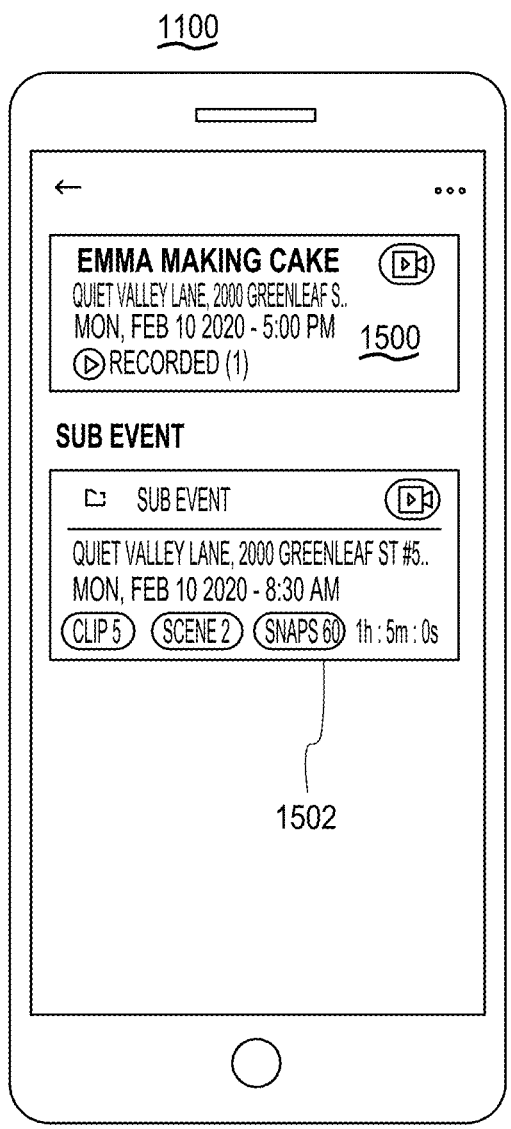
FIG. 15 is a screenshot of a mobile communication device with a fully entered subevent.
Figure 16:
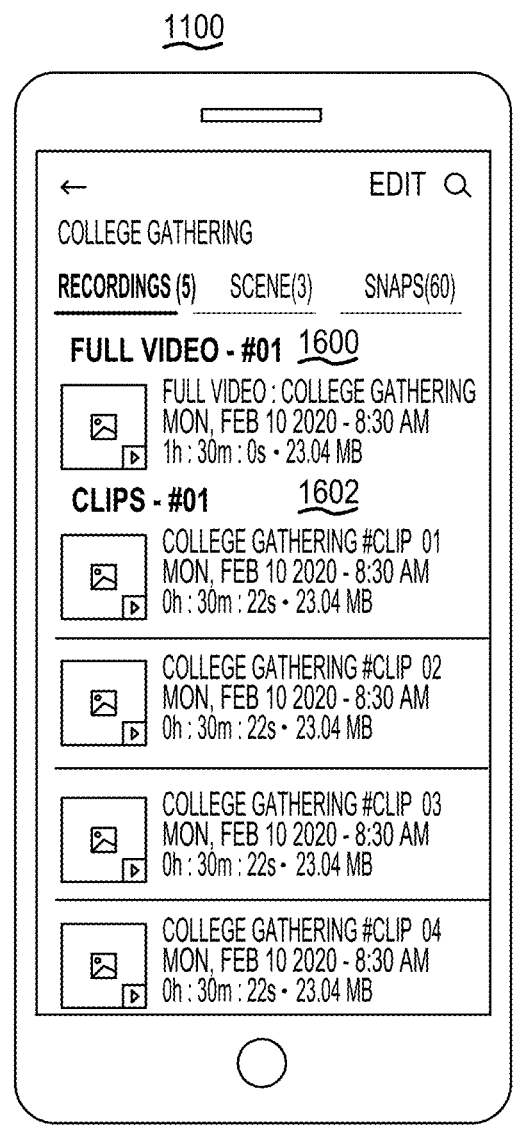
FIG. 16 is a screenshot of a mobile communication device displaying video recordings of the College Gathering event, including the main video, and clips of the video.

FIG. 15 is a screenshot of a mobile communication device 1100 with a fully entered subevent. The event 1500 is Emma Making Cake and includes a subevent 1502 (video clip) with an address, date, and time for the video clip. In some embodiments, a thumbnail image of the full recordings is displayed. For example, FIG. 16 is a screenshot of a mobile communication device 1100 displaying video recordings of the College Gathering event, showing the entire video 1600, and clips of the video 1602.

Continuing with the event and subevent displays, FIG. 17 is a screenshot of a mobile communication device 1100 displaying scenes 1700 of the recording for the College Gathering event 1300. And finally, FIG. 18 is a screenshot of a mobile communication device 1100 displaying snapshot images 1800 of the scenes of the recording for the College Gathering event 1300. The thumbnails allow for quick identification of a desired recording or video clip.

FIG. 19 is a screenshot of a mobile communication device 1100 displaying a Record button 2300 for recording the event, and also displaying a Cut Clip button 2302 that functions to terminate an old clip; i.e., finalize the end pointer of the old clip to the point in time that the cut clip button 1902 is activated, and start a new clip recording; i.e., set the start pointer of a new clip to the instant that the cut clip button 1902 is activated. A stop clip button 1904 allows the recording of the video clip to cease. It is significant to note that while Stop Clip button 1904 does stop the video clip, the main video stream continues to be recorded. Thus, in this configuration, the recording of the College Gathering event 1300 continues unimpeded. FIG. 20 is a screenshot of a mobile communication device 1100 displaying a Record button 2000 for recording the event without displaying the Stop Clip button.

Illustrative Interface for Entering or Selecting an Event Name

Figure 21:
FIG. 21 is a screenshot of a mobile communication device displaying a pop-up box requesting the operator to indicate whether the present recording is for an existing event.

Finally, FIG. 21 references a screenshot of a mobile communication device 1100. As illustrated a pop-up event selection box 2100 appears during the recording, requesting the operator to indicate whether the present recording is for a prior created event. Specifically, the pop-up event selection box 2100 inquires whether the recording is for an existing event, or a new event. If for an existing event, the video recording may be spliced to the event for further processing, labeling, etc. Thus, this feature works to help the operator edit and label the recordings. These events can be gathered from the user's calendar, social media, or can have been setup manually in advance by the user. For example, a user's social media may have "College Gathering" with a date, time, and location corresponding to the date and time that the user is beginning the recording along with the user's location. Accordingly, "College Gathering" is offered as a possible event. Similarly, the user may have a calendar entry for attending "My Summer Camp" during the time period that the recording is being made, and accordingly, "My Summer Camp" is offered as a possible event. Similarly, the user may have created in advance the events "Emma Making Cake" and "James Wedding Anniversary."

As illustrated, the disclosed recording instrument and software applications provide a user-friendly tool to record and edit videos that are labeled as events and subevents of the larger events. The disclosed mobile communication device also allows the produced videos and video clips to easily be shared on a network. As depicted, a smartphone like device is shown; however, in other embodiments of the system, other types of cameras and video recording tools and apps may also be used, consistent with the described components and functions.

Append New Video to a Paused or Stopped Recording

Figure 22:
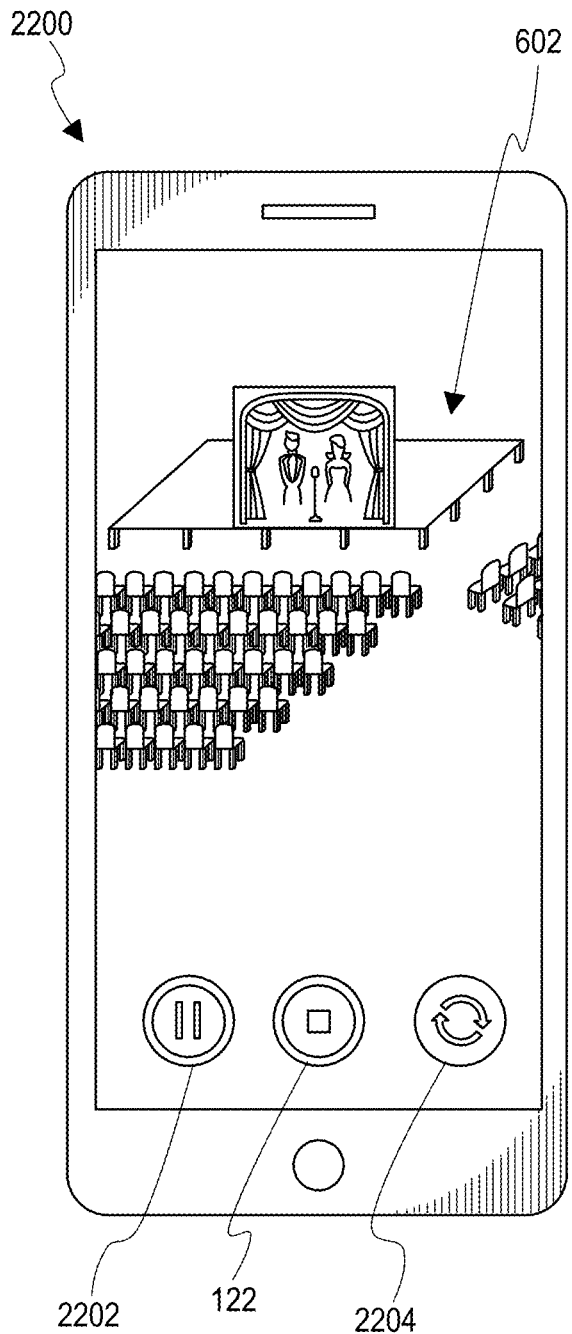
FIG. 22 is screenshot of a pause control allowing new video segments to be generated during intervals between successive activations of the pause control and a lens selection control that can be activated during a recording in progress or when the recording is paused by the pause control.

According to another aspect of the disclosure, with reference to FIGS. 22-28, still other embodiments of video recording systems provide controls to resume recording video to a paused or stopped main video recording stream at a later time or different location. These controls automatically append a discontinuous new video clip to the end (i.e., the last frame recorded) of the paused or stopped main video recording stream. For the case of resuming recording video to a paused main video recording stream, a video recording system 2200 providing a unique pause control 2202 is illustrated in FIG. 22 and described below. For the case of resuming recording video to a stopped main video recording stream (stored as a video file), a video recording system providing an "instant append" function to continue recording video to a selected video file is illustrated in FIGS. 23-28B.

Un-Pause Video: Toggling Pause Control to Resume Video Recording in Progress

In accordance with a paused-recording resumption embodiment, the video recording system 2200 provides a unique pause control 2202 that is used to pause the main video stream and/or the video clip, such as a video recording of the school play event 602 in progress. A user activating the pause control 2202 for a first time while a main video stream is active (i.e., between initiation and termination of the main video stream) causes the main video stream and/or the video clip to pause, i.e., temporarily cease recording. The main video stream then resumes recording, upon a next activation of the pause control. Between initiation of the main video stream and the first pause, and between each resumption and next pause, the system 2200 automatically records durations of video clips. Thus, a new video clip is generated between the start of the main video stream and the first activation of the pause control 2202, between second and third activations of the pause control 2202, similarly between fourth and fifth activations, and thus during alternating intervals between successive activations of the pause control 2202. The newly generated video clips may then be labeled, stored, and viewed, as described above.

In operation, the user activates the pause control 2202 directly on the display screen (See FIG. 22). This serves to pause the main stream, and if a video clip is active, the video clip stream. However, the pause control 2202 also creates a new physical file of a first video clip that spans from the time index that recording of the main video stream or video clip started or was last resumed (a resume point) to the time recording of the main video stream or video clip was paused (a present time index). It is significant to note that the pause-generated file(s) can be labeled with a name, as described above. In addition, while the recording is paused, a user can activate a lens selector control 2204 to record from a different lens, and when the user activates the pause control 2202 a second time, the camera system 2200 will un-pause and resume recording any paused recording stream (s) from the currently selected lens. For example, FIG. 19 shows the mobile communication device recording from the front facing camera. FIGS. 20-21 show the recording from the rear camera, as the College Gathering event 1300 is being recorded. A user can alternatively activate the lens selector control 2204 without activating the pause control 2202; however, pausing first gives the user the ability to aim, zoom, and focus the new lens while not recording, so that the active stream or streams will resume only when the scene in the viewfinder appears as the user desires, without the user having to pass through a completed file of the main recording to find and cut out segments showing the adjustments being made when transitioning to a different lens.

Accordingly, the first time the pause control 2202 is activated, the main video stream is paused and a first physical file is created that spans from time zero, when the record control 122 was activated to start recording the main video stream, to the time index when the pause control 2202 is subsequently activated. Pressing the pause control 2202 a second time un-pauses (resumes recording) the main video stream and begins recording a new clip, and when the pause control 2202 is then pressed a third time, a second new physical file spans from the time index of the second time the pause control 2202 was activated, which is the resume point referred to above, to the time index of the third time the pause control 2202 was pressed. Put another way, the second activation of the pause control 2202, and similarly thereafter, each even-numbered activation of the pause control 2202, begins the recording of a new clip of the main video stream, which continues until the next (odd-numbered) activation of the pause control 2202, resulting in the creation of a physical file spanning from the time index of the previous (even-numbered) activation to the latest (odd-numbered) activation. In algebraic terms, each odd-numbered activation P of the pause control 2202 pauses the main video stream and commits an Nth physical video clip file to storage, where $N=(P_{odd}+1)/2$. Thus, a first pause control activation (P=1) stores a first video clip file (N=1), the third pause control activation (P=3) stores a second video clip file (N=2), etc. Each even-numbered activation P of the pause control 2202 un-pauses (resumes) recording of the main video stream and begins recording an Nth video clip, where $N=P_{even}/2+1$; thus, the second activation (P=2) begins recording the second clip (N=2), the fourth activation (P=4) begins recording the third clip (N=3), etc.

In addition, activating the stop control 122 when recording of the main video stream is paused, i.e., after an odd number P of activations of the pause control 2202, commits to storage the main video stream, comprised of all of the clips 1 to N (where $N=(P_{odd}+1)/2$) concatenated to form a single file, separate from the individual clip files. Similarly, activating the stop control 122 when the main video stream is recording, that is, after zero or an even number P of activations of the pause control 2202, commits to storage the Nth video clip file then in progress ($N=P_{even}/2+1$), as well as the main video stream as a separate file comprising the concatenated clips 1 to N.

Figure 23:
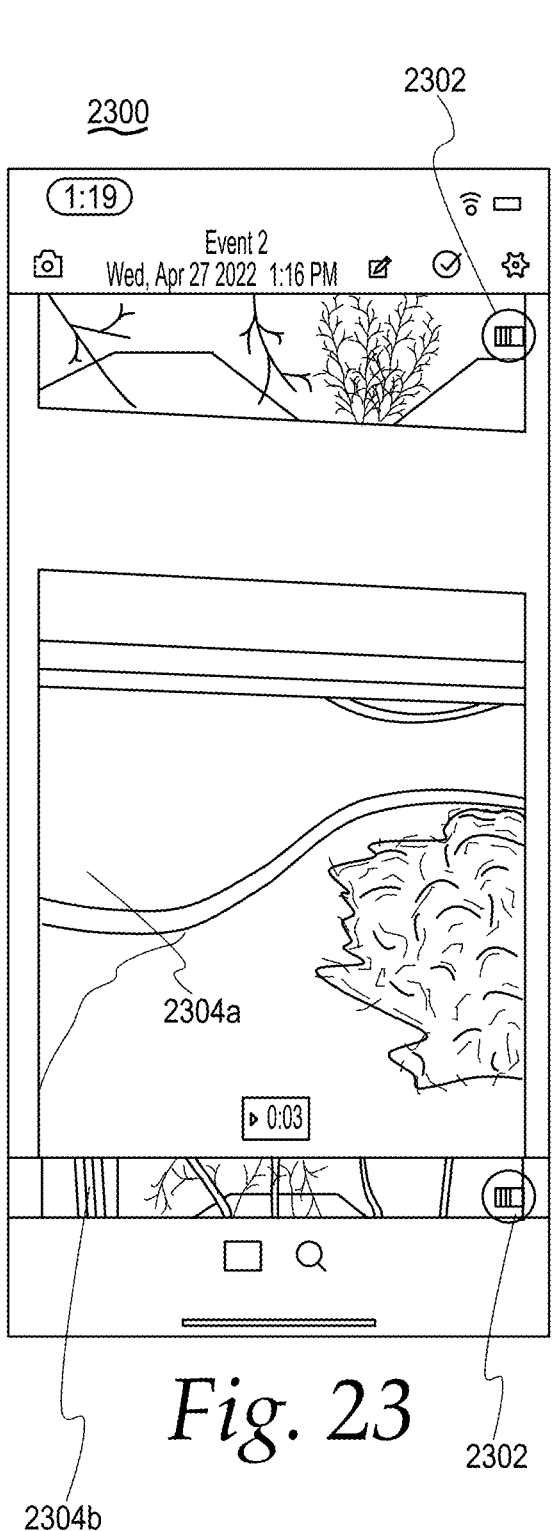
FIG. 23 is a screenshot of a video file selection view with append footage controls associated with each video file.

Continue Video: Appending Currently Recording Video Footage to a Previously Stored Video Recording Turning to FIGS. 23-27, in accordance with a "continue video" embodiment, a video recording system 2300 includes a continue video control 2302 for each existing stored video file, which allows a user to append new video to a selected existing video file created from a previously stopped recording; i.e., a previously terminated main video stream. A video file selection screen is shown in FIG. 23, showing existing video files 2304a, 2304b, each represented by a selected still frame, such as the first, last, or last-viewed still frame of the respective video file. At a later time or date after creating the video files, the user may select to continue recording video to a selected one of the video files, which may or may not be the most recently created video file. In the illustrated example, the user presses the continue video control corresponding to the video file 2304a. Thus, the feature associated with the continue video control 2302 can be useful for the purpose of spontaneously returning to add content to a video that the user may or may not have expected to augment further at the time of its creation. In addition, the feature can be used to set up transitions between recording modes in the creation of dynamic videos, for example, by activating the stop control 122 in order to switch to a normal, slow-mo, or time lapse recording mode from another of those modes or some other recording mode, and then activating the continue video control 2302 associated with the file thus created by activating the stop control 122, followed by activating the record control 122 to append new video to the file, recorded using the newly activated mode.

Figure 25:
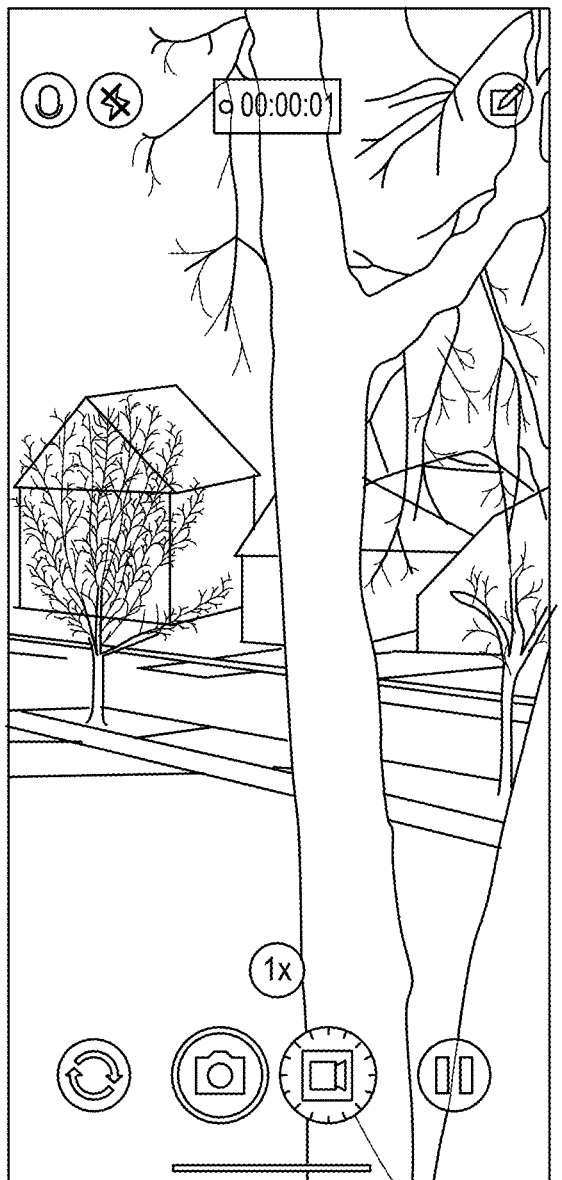
FIG. 25 is a screenshot of a recording in progress of footage to be appended to an existing video file.

In response to the activation of the continue video control 2302, the software application displays a digital viewfinder area 2306 (see FIG. 24) with the real time scene captured by the lens, the record control 122, and a thumbnail image 2308 of a representative frame (e.g., the first or last frame captured, or the most recently viewed frame) of the selected video file 2304a, as a confirmation to the user of the video file they selected. In addition, the words "continue video" or similar may be displayed above the record control, to remind the user that the newly recorded video will be appended to an existing video file. Optionally, the thumbnail image is also a touch input control that allows a user to open and view the video file to further confirm the user's selection of the desired video file, in a viewing mode (not shown) from which the user may navigate back to the view in a single step, such as by either touching a prompt to return to the digital viewfinder to continue video or activating a "back" navigation control or the like. A user may then press the record (/stop) control 122 once to start recording new video and then again, when it appears as the stop control 122 as shown in FIG. 25, to stop recording the new video.

Figure 26:
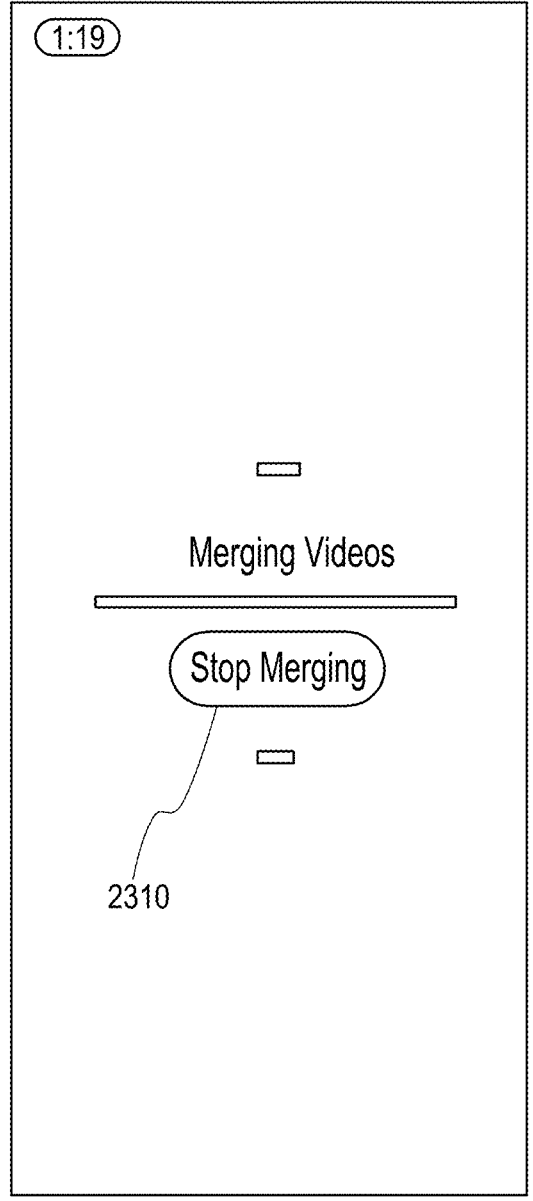
FIG. 26 is a screenshot of a video merge in progress initiated by the append footage function.

In response to the user activating the stop control 122 to stop recording the new video, the software application automatically begins appending (or "merging") the new video to the video file to generate a merged video file (see FIG. 26) containing the merged content, and displays a message such as "Merging Videos," as shown in FIG. 26, to indicate that the merging is in progress. In addition, the software application can display an abort control 2310 with a message such as "Stop Merging," which a user may touch to cancel the merging operation. Optionally, such automatic merging in response to the user stopping the recording of new video can be toggled on or off as an "auto-merge" option of the software application (such as in an options menu not shown), whereby a user may choose instead to configure the software application to prompt a user before beginning to merge the stopped new video recording to the existing video file 2304a.

Figure 27:
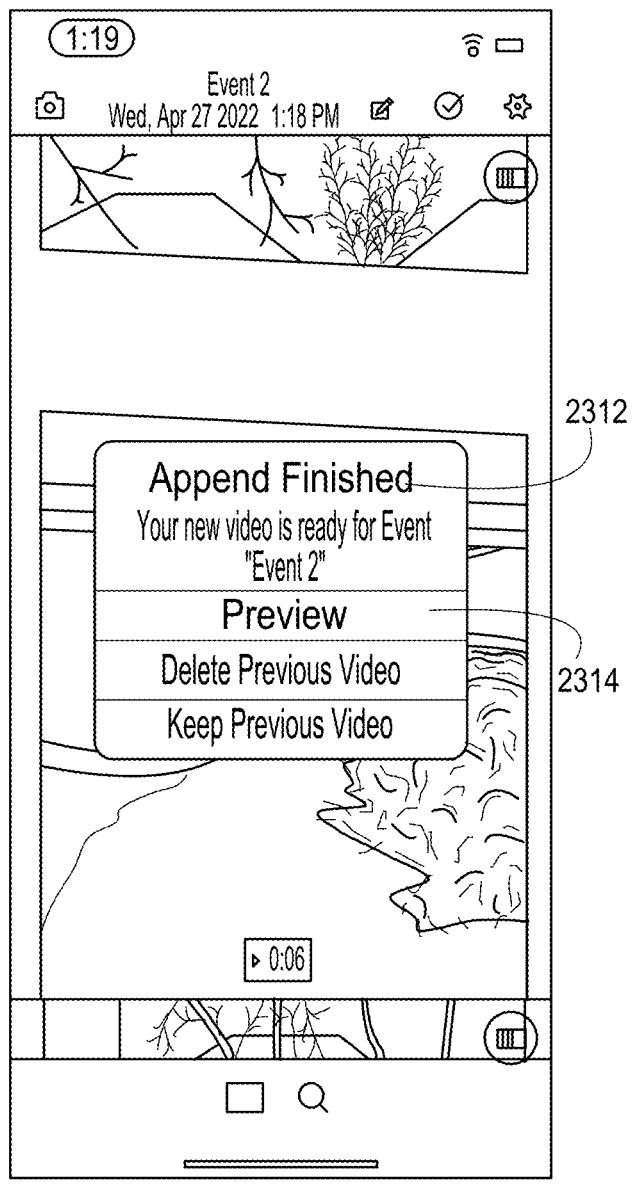
FIG. 27 is a screenshot of a menu of options after the video merge is finished.

As shown in FIG. 27, once the merge is complete, the software application displays a message 2312, such as "Append Finished: Your new video is ready for Event '<Event Name>'", together with an interactive menu 2314 from which a user may touch-select options to "Preview" the merged video file before deciding what to do with the existing video file, to "Delete Previous Video" (i.e., to delete the existing file and replace it with the merged video file), or to "Keep Previous Video" (i.e., to keep the existing file as a separate video file from the newly created merged video file). In the latter case, the existing file 2304a may be maintained as a separate video file without the need to physically duplicate its physical bitstream content to a new storage location. That is, storage space may be conserved by maintaining only one copy of the previously recorded video, each of the existing file 2304a and a newly created merged file being identified in part by the same logical start pointer to the storage location of the first frame of its existing physical main video stream, the existing file 2304a being further identified by a logical end pointer to the storage location of the last frame of its existing physical main video stream, and the merged video file being further identified by a logical end pointer to the storage location of the last frame of the newly recorded video clip, which will also constitute the last frame of the merged physical main video stream.

In view of the foregoing discussion, a video file constructed of multiple spliced-together video or image clips can be created in a variety of ways in a video recording system according to this disclosure, by using either the unique pause control 2202, the continue video control 2302, or both. For example, with reference to FIGS. 28A and 28B, a video file 2800 is shown to be composed of three concatenated video clips 2802a, 2802b, and 2802c, of respective durations $\Delta t_1$, $\Delta t_3$, $\Delta t_5$. One way of creating the video file 2800 would be a user activating the record/stop control 122 to begin recording the footage of the video clip 2802a at time 0, then activating the unique pause control 2202 at the end of each time interval $\Delta t_1$, $\Delta t_2$, $\Delta t_3$, $\Delta t_4$, followed by finally activating the record/stop control 122 again at the end of the time interval $\Delta t_5$ to terminate the physical main video stream and thereby commit the file 2800 to storage, as well as files of each clip 2802a, 2802b, 2802c.

By another method, after the first two pause activations described above, the user could use the record/stop control 122 to terminate the physical main video stream and the physical video stream of the second clip 2802b at the same time, thereby creating separate video files of each of the first two clips 2802a, 2802b and a combined video file 2804 comprising the two clips 2802a, 2802b concatenated. Then, from the file selection screen (such as shown in FIG. 23), a user could locate and activate the continue video control 2302 associated with the combined video file 2804, followed by activating the record control 122 at the end of time interval $\Delta t_4$, and then activating the stop control 122 at the end of time interval $\Delta t_5$ to create a new video clip 2802c and merge the same with the video file 2804 to create the video file 2800, which will be identical to that created by using only the record/stop control 122 and unique pause control 2202 as in the previous method.

Figure 28A:
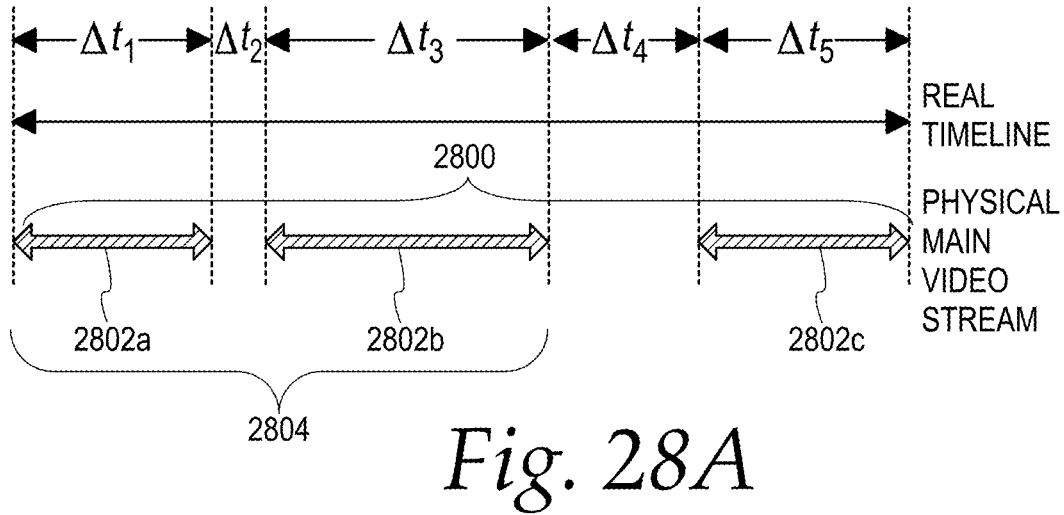
FIG. 28A is a structure diagram illustrating a video comprised of concatenated clips captured at discontinuous time intervals.
Figure 28B:
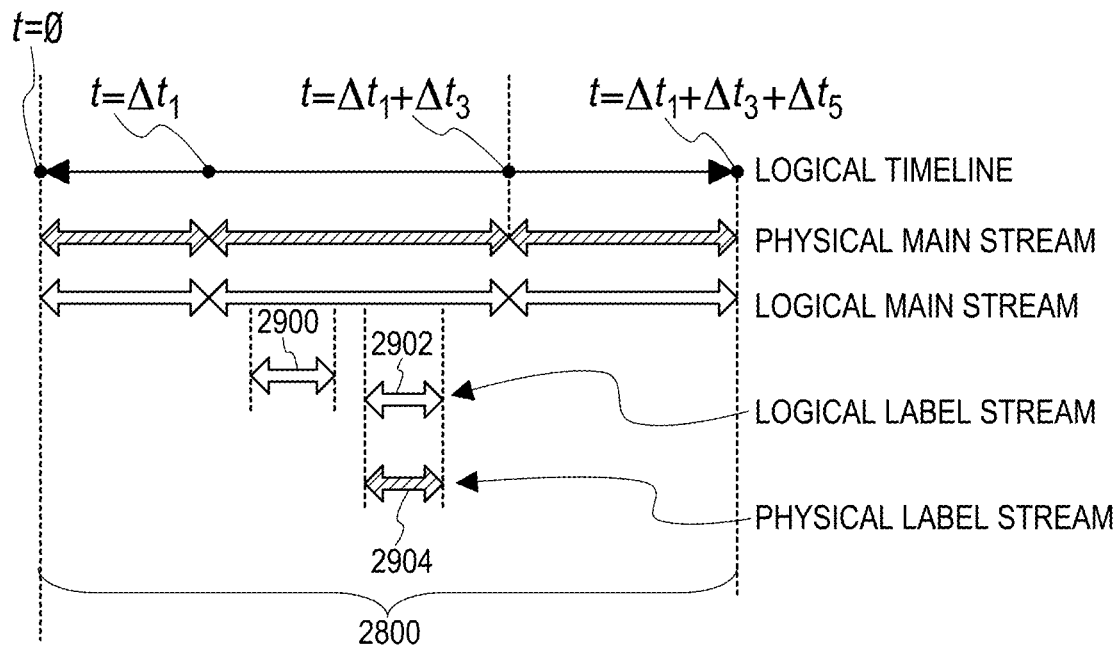
FIG. 28B is a structure diagram illustrating different streams associated with the video illustrated in FIG. 28A.

It will be further appreciated that logical clip streams can be created during the recording of any of the physical clip streams 2802a, 2802b, 2802c by using the cut clip control 124 and stop clip control 126 as previously described, without pausing or stopping the recording. An illustrated example is shown in FIG. 28B, illustrating the respective timespans of logical clip streams 2900, 2902 created during the time interval $\Delta t_3$ in which the second physical clip 2802b was recorded. In addition, a separate physical clip stream 2904 corresponding to the logical clip stream 2902 is also illustrated as having been created by writing a copy of the corresponding portion of the physical video stream content of the video clip 2802b to a new storage location. However, as explained previously, storage space can be conserved by creating files of the logical clip streams 2900, 2902 that use pointers to call up their respective video frame content already stored in the physical file of the clip 2802b, rather than duplicating that content in another storage location.

Pin Video

At times, a user may wish to continue a previous recording automatically each time the user records new video. Thus, according to another aspect of the disclosure, a video recording system includes a "pin video" feature as described here. Thus, as illustrated in FIG. 29, a video recording system 2950 includes an auto-append-footage toggle setting 2952, which when toggled on causes all newly recorded video footage to be appended to an existing file containing the last recorded footage. In effect, the record control is "pinned" to continue recording from the last frame of that video file until the auto-append-footage toggle setting 2952 is toggled off. In the illustrated embodiment, the video recording system 2950 as shown in FIG. 29 further includes an auto-append-footage timer 2954, which is operative to cause newly recorded video to be automatically appended to one file only for the set time period (or until the user manually cancels the timer). Thus, a user can, for example set the timer for three days during a three-day vacation, so that all vacation footage is concatenated into a single video file. The video recording system 2950 further includes an "Until toggled off" option 2956, which, when selected, will cause all new footage to be appended to an existing file indefinitely, until the user toggles off the auto-append-footage toggle setting 2952.

Pin Event

Similarly, in connection with the previously described event features (including the event control 606), a user may at times wish to tag all newly recorded video automatically with an existing event name. Thus, the video recording system 3050 as shown in FIG. 30, includes an auto-media-tagging toggle setting 3052, which when toggled on causes all newly recorded video footage to be tagged automatically with the name of an event, such as the name of the most recently created event, or the name of an event that the user will be prompted to provide when the user toggles the auto-media-tagging toggle setting 3052 on. More broadly, in embodiments, the auto-media-tagging toggle setting 3052 can be used to automatically tag newly created media generally, not limited to newly recorded video, but also including newly recorded audio and newly captured photos. More broadly still, in embodiments, the auto-media-tagging toggle setting 3052 can be used to automatically tag not only newly created media, but also imported media files, with an event name, where the event name could similarly be determined by a rule or by explicit user input. Like the previously described auto-append footage toggle setting 2952, the auto-media-tagging toggle setting 3052 provides a timer option 3054 and an until-toggled-off option 3056.

For example, using the continue event feature, a user could create a "vacation" event using a calendar application that covers a particular time-period, such as May 1, 2024 until May 5, 2024. The calendar event could, for example, include airport codes, flight numbers, flight times, the destination city, the hotel(s) or other lodging location that the user was staying at, etc. The continue event feature could be triggered on the start of the event in the calendar and run until the event ended in the calendar; i.e., it could be strictly time based. However, the continue event feature could also be triggered during the proper time as well as when at least one other condition was present, such as the GPS integrated into the user's camera (phone or otherwise) registering that the user had gone to his home airport and was preparing to go onto a flight. Similarly, the event could be triggered by the proper time as well as arriving at the destination city, the hotel or other lodging address, or some other condition. Similarly, the event could be ended when a combination of the proper time had elapsed and the user was either at (as measured by a GPS coupled to the camera) the user's home airport or the user's home. Similarly, other types of events can be used and validated in similar ways.

Auto-Pause

According to another aspect of the disclosure, with reference to FIG. 31 yet another embodiment, a video recording system may be configured so that recording to a main video stream, and to any active video clip, is paused and/or resumed automatically when a pause-triggering or resume-triggering condition occurs, with the same results as when a recording is paused and/or resumed manually by pressing the unique pause control 2202 of the video recording system 2200, as described above. This function allows a user to continue recording to the same video file that the user was originally recording to before the pause-triggering condition, rather than recording to two separate files and combining them using a video editing program. For example, the system may be configured so that a recording is paused automatically when a software application associated with the system is closed (for example, manually by a user, or by a device operating system in response to an error caused by the software application), when the software application merely "goes background" (meaning that the user has brought a different software application to the foreground) and/or when a smartphone or other telecommunications device running the system/software application receives a call, or when a user answers/picks up/connects/accepts the call. A recording that was thus paused automatically may then resume automatically upon the occurrence of a resume-triggering condition, which may correspond to the pause-triggering condition that caused the recording to pause. For example, the recording may resume automatically when the software application is re-opened or restored, or when the call terminates, as applicable. Alternatively, the recording may be manually resumed by a user, such as by pressing a pause control analogous to pause control 160 or pause control 2202. Such manual resumption functionality can have the advantage of avoiding the recording automatically continuing when the camera of user's smartphone, tablet, watch, or other mobile device is in an undesired position. In embodiments, the recording may resume automatically after an interruption, but only in the case of interruptions shorter than a predefined time limit, such as thirty seconds, one minute, two minutes, or five minutes, thus reducing the risk of automatically resuming a video recording that the user forgot had been in progress before the interruption. More particularly, such an auto-resumption time limit may be a separate user-customizable setting 3106, as illustrated in FIG. 31.

In embodiments, the user may choose to enable or disable the automatic pause and/or resume functions of the system/software application. For example, shown in FIG. 31 is a screenshot of a video recording system application interface 3100, illustrating a camera settings menu 3102 that includes an auto-pause toggle switch 3104.

Auto-Minimize

Figure 32:
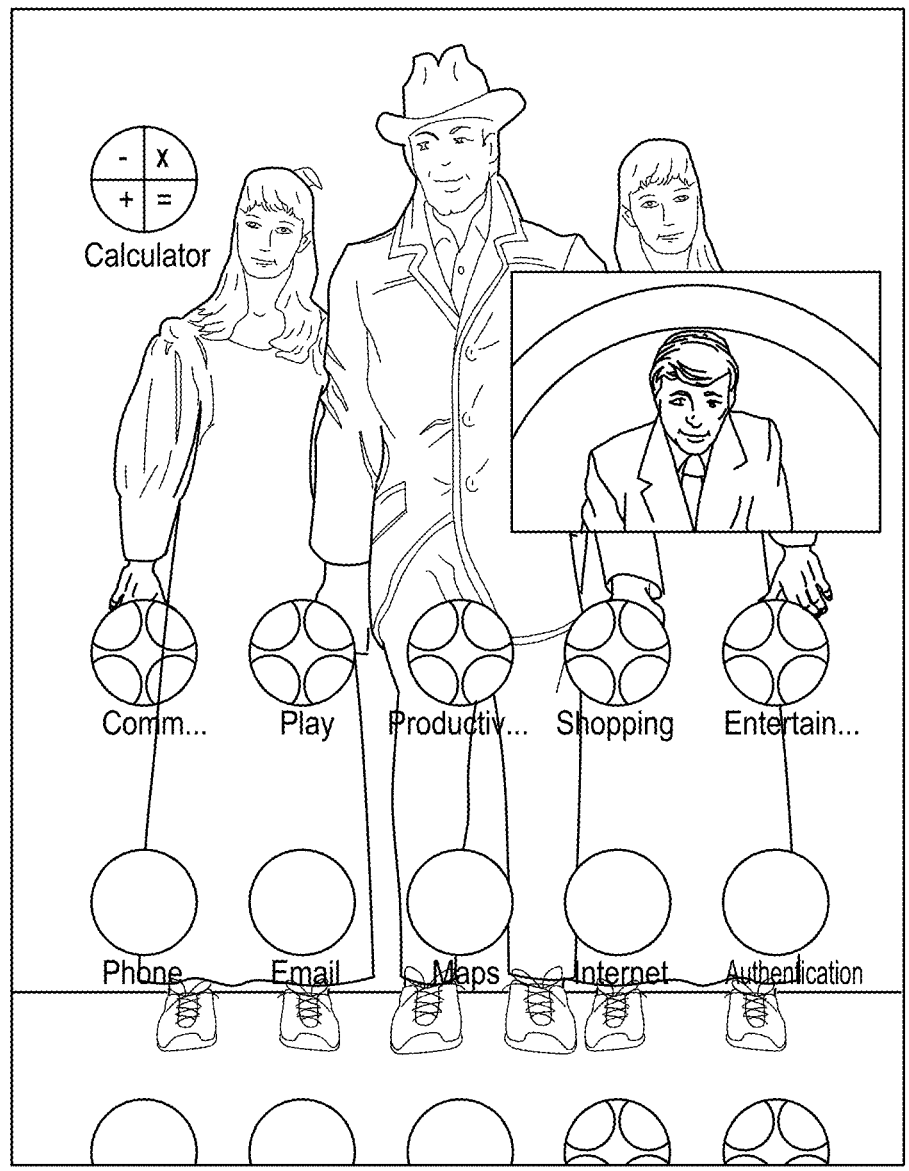
FIG. 32 is a screenshot of a video recording system application interface that presents on a smart device in a small foreground window while other functionality is being used in the background.

An alternate embodiment is shown in FIG. 32. In particular, in the embodiment of FIG. 32, a video recording system may be configured so that recording to a main video stream, and to any active video clip, continues, but the video screen is minimized; i.e., presented in a less than full screen size, as depicted. For example, the system may be configured so that recording can continue (with the minimized software application being displayed) when a smartphone or other telecommunications device running the system/software application receives a call, or when a user answers/picks up/connects/accepts the call. This allows recording to continue while the user is fully aware of what is being recorded, while still allowing the user to continue to use the smartphone or other device for purposes other than recording video and/or audio. Similarly, this allows a user to record an important video without resorting to the use of "do-not-disturb" mode or "airplane" mode, and thereby continuing to enjoy the full functionality of the user's device.

As discussed above, the video streams and clips thereof are described as audio-video streams and clips. However, it should be understood that the principles described herein can be applied to streams and clips of purely audio or purely video. The system 100 provides the capacity to replay solely audio in the form of selected audio clips. The audio clips can be spliced, stored, replayed, and modified, similarly to the video clips. The audio clips may also be labeled, as discussed above. Further, the network members can access the audio streams and clips from a central storage site. Any of the network members can create and label a video clip for future viewing, or to transmit to network members.

Real-Time Annotation

According to yet another aspect of the disclosure, a real-time annotation feature of the system mobile app allows users to enhance their videos with immediate annotations, including both typed text and hand-drawn elements, created during or before the recording process. This functionality allows for dynamic and interactive content creation, enabling users to highlight, explain, and emphasize important aspects as they happen.

The real-time annotation feature provides versatile tools for adding live annotations to video recordings. For example, a user recording instructional content on a smartphone or other camera with a touchscreen can draw annotations by touch to indicate an area or object shown in an image frame of a recording in progress, and the annotations will be integrated into the recorded footage in real-time, superimposed over the scene displayed in the viewfinder. (In another embodiment, annotations can similarly be added using a mouse or other user input device having a pointer that a user can move freely over an area of the display.) More particularly, each annotation mark or character will be recorded in the frame in which it first appears and in subsequent frames until removed by a user.

Figure 34:
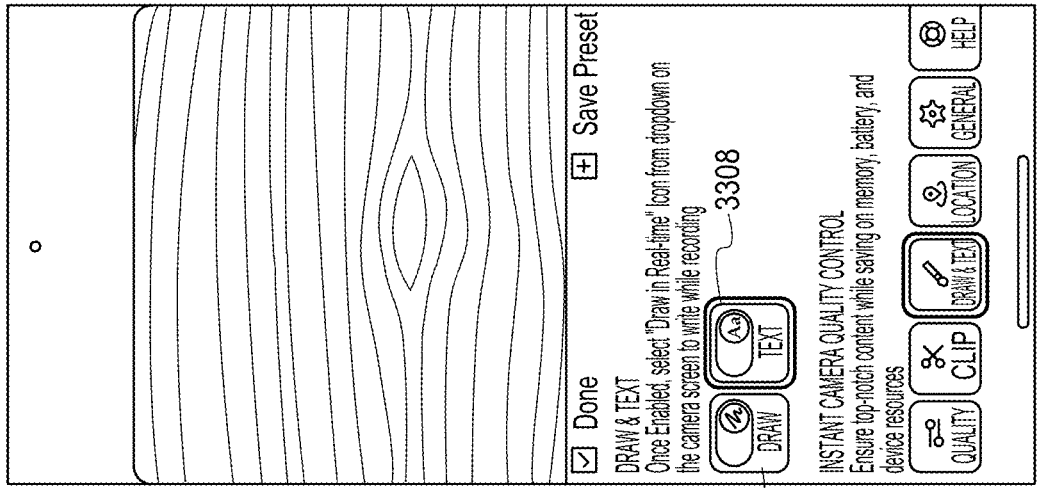
FIG. 34 is a screenshot of a video recording system application interface showing real-time text and drawing annotations enabled by the toggle setting shown in FIG. 33.
Figure 33:
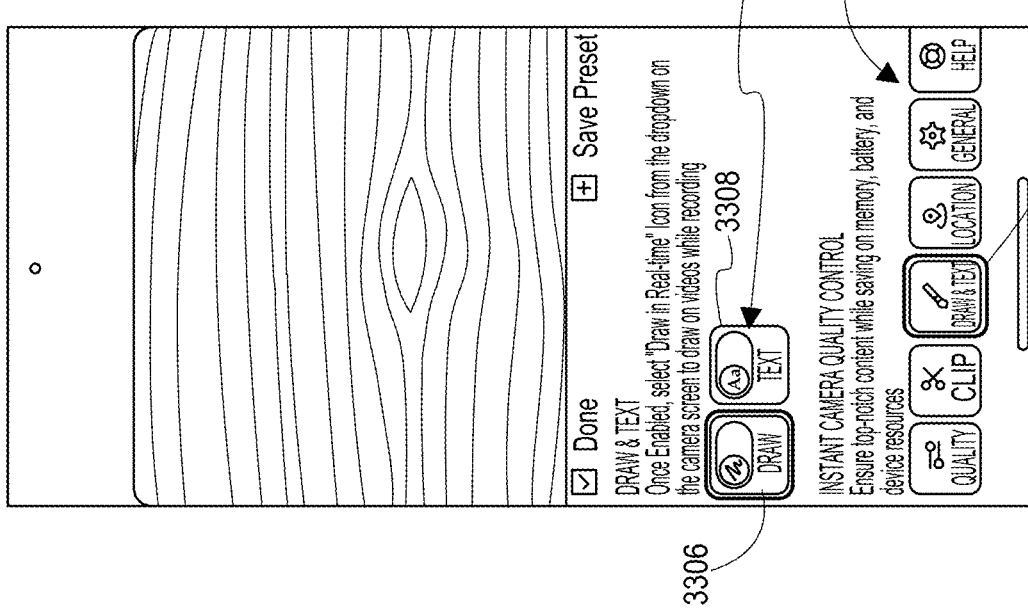
FIG. 33 is a screenshot of a video recording system application interface showing real-time text and drawing annotations disabled by a toggle setting.
Figure 35A:
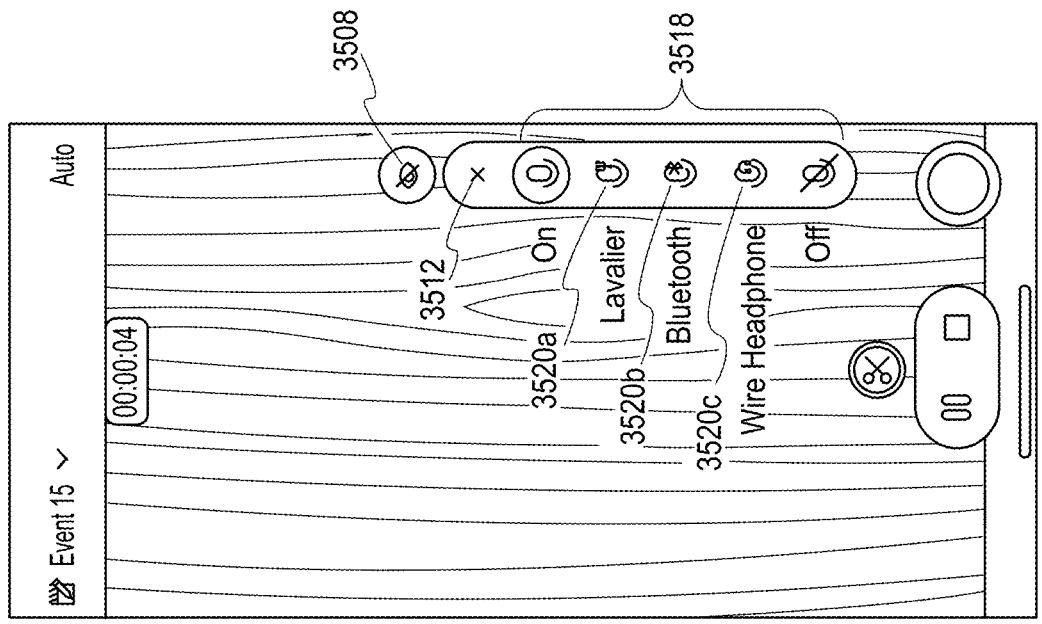
FIG. 35A is a screenshot of a video recording system application interface that includes an real-time audio source selection toolbar.
Figure 35:
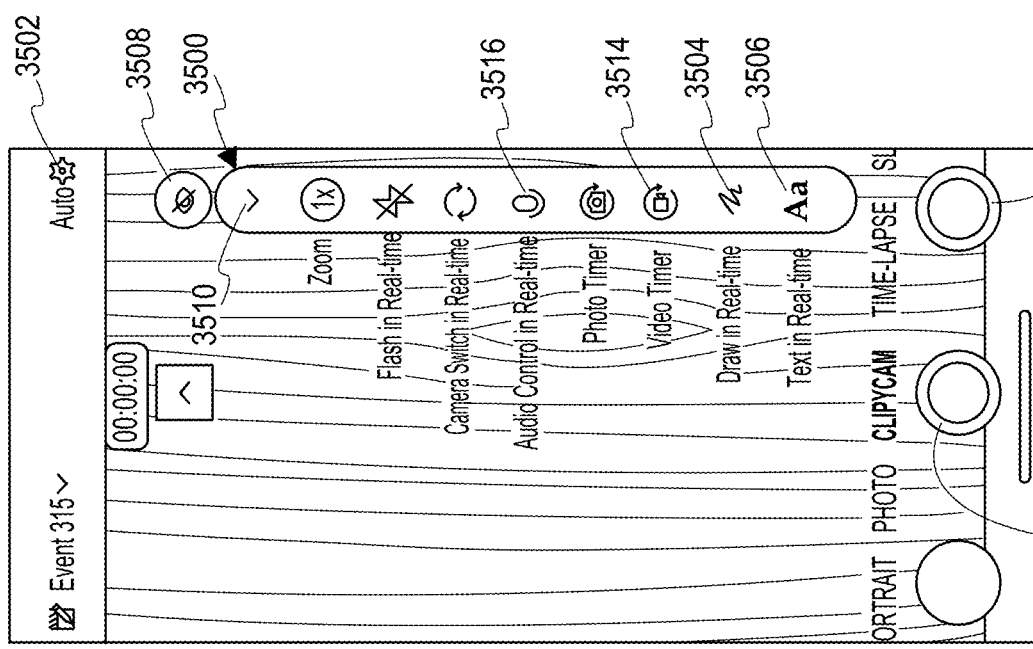
FIG. 35 is screenshot of a video recording system application interface that includes a drop-down tools menu.

With reference to FIGS. 33 and 34, functions of the real-time annotation feature can be enabled and disabled by opening a settings menu 3300 (such as by tapping a gear icon 3502 as shown in FIG. 35) and selecting an annotation settings control 3302 to open an annotation settings submenu 3304. The annotation settings submenu 3304 has a real-time draw toggle switch 3306 and a real-time text toggle switch 3308. Both toggle switches 3306, 3308 are illustrated as toggled off in FIG. 33 and toggled on in FIG. 34. The toggle switches 3306, 3308 are configured to enable respective real-time draw and real-time text when toggled on, and to disable the same when toggled off. Turning to FIG. 35, when real-time draw and real-time text are enabled, a respective drawing tool control 3504 and text tool control 3506 are displayed in an expanded drop-down tool menu 3500, which in turn is shown and hidden by a show/hide control 3508 and expanded and collapsed by a drop-down control 3510.

Functions and Tools:

Individual real-time draw and real-time text functions and tools of the real-time annotation feature can be as follows, with reference to FIGS. 36-41.

Drawing Annotations: The drawing tool control 3504 (also referred to as the drawing tool 3504) can be selected from the displayed drop-down tool menu 3500 and used to create drawing marks in the viewfinder window 121, for example to add a sketch associated with the scene being captured in the viewfinder window 121, or to highlight, underline, or circumscribe portions of the scene in real-time. Thus, as illustrated in FIG. 39, the drawing tool 3504 was used to create drawing marks 3902 to point out the locations of scratches and gouges on a captured image of a finished wood surface appearing in a video recording.

Figure 36:
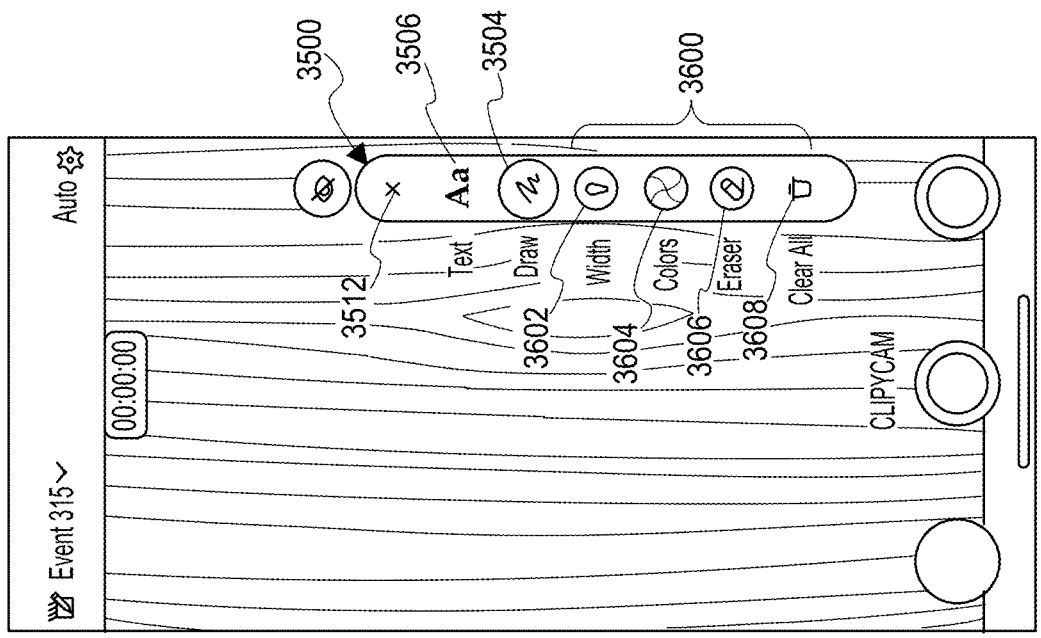
FIG. 36 is a screenshot of a video recording system application interface that includes a real-time drawing annotation toolbar.

A user can select from various stroke widths and colors as desired. More particularly, as shown in FIG. 36, a drawing toolbar 3600 is displayed when the drawing tool control 3504 is selected. The drawing toolbar 3600 includes a stroke width tool 3602, a stroke color tool 3604, an eraser tool 3606, and a clear all control 3608. A user activating the stroke width tool 3602 can open a suitable adjustment input interface (not shown), such as a text prompt for a user to enter a numeric line weight and/or a visual adjustment tool, such as a button panel for selecting from discrete width options or by adjusting the position of a visual "slider" control (not shown). Analogously, a user activating the stroke color tool 3604 can open a prompt or tool (not shown) a user to enter standard numeric 8-bit red, green, and blue color values (0 to 255 decimal) from user touch input to a color selection spectrum or grid, and/or to select a color from a spectrum or grid by touch input, as well as to select an opacity level, similarly by typing or selecting a numeric percentage or a making a touch input on a visual opacity scale image, as is well known for drawing tools in existing drawing and photo-editing software applications. A default color and opacity combination can, for example, be yellow/100%. In other embodiments (not shown), a user can choose from a variety of stroke shapes and types (e.g., paintbrush, spray, pencil, marker, with round, flat, or other tip shapes) using a similar selection tool.

Figure 39:
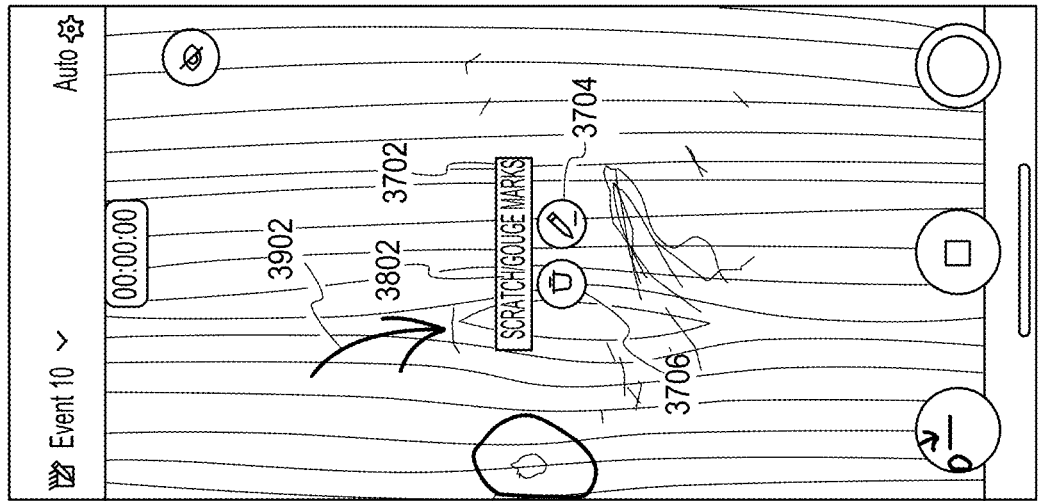
FIG. 39 is a screenshot of a video recording system application interface showing drawing and text annotations displayed over camera footage in a digital viewfinder area.
Figure 40:
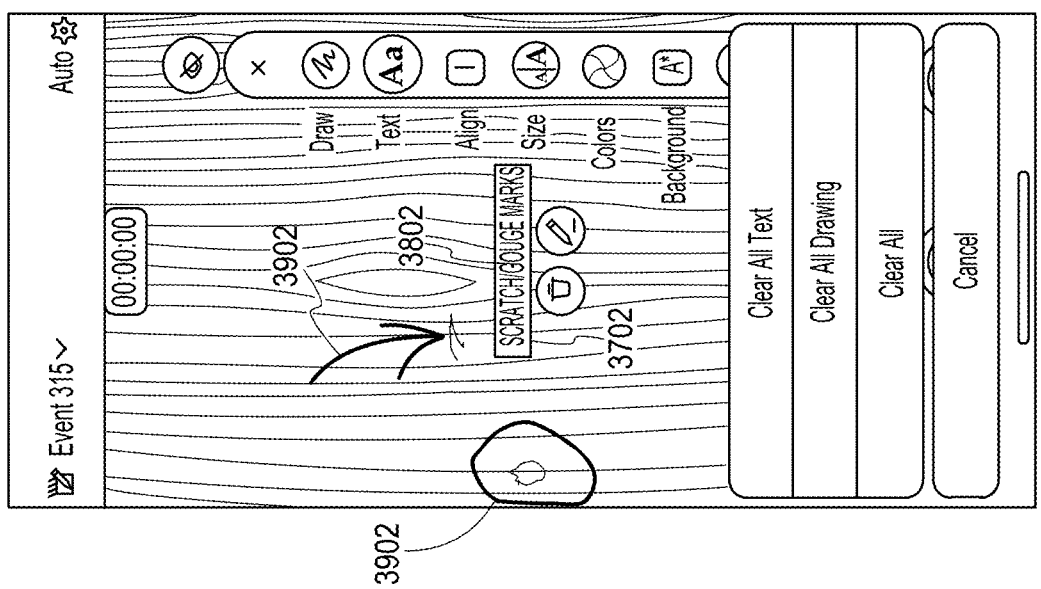
FIG. 40 is a screenshot of a video recording system application interface that includes a tool for clearing all text and/or drawing annotations from a digital viewfinder area.

A user can then draw marks by a moving touch input tracing the desired path of the marks on a touchscreen where the viewfinder window 121 is displayed, so as to produce drawing marks such as the drawing marks 3902 shown in FIG. 39. (It will be noted, however, that as shown in the screenshot of FIG. 39, the text tool 3506 is selected, not the drawing tool 3504, as an edit textbox control 3704 and a delete textbox control 3706 are only displayed below a textbox 3702 when the text tool 3506 is selected, as introduced and described below; thus it will be understood that the drawing marks 3902 were created while the drawing tool 3504 was previously active.) A drawing mark is displayed immediately wherever the screen is touched. In one embodiment, marks also begin to be recorded to an annotated video file immediately as they are displayed, thus appearing during playback relative to camera footage in the viewfinder window 121 when and as they did during recording. In another embodiment, drawing marks begin to be recorded only when accepted by activating an "accept" or "done" control (not shown), analogous to that described below for typed text annotations. The eraser tool 3606 is operative to simulate a physical pencil eraser, removing only portions of annotation marks in areas swept by a user's touch (not shown), similarly to analogous tools of well-known drawing software applications. The clear-all control 3608, when activated by user input, prompts the user to select whether to clear all text, all drawing, or both, or to cancel the activation, as shown in FIG. 40.

Figure 37:
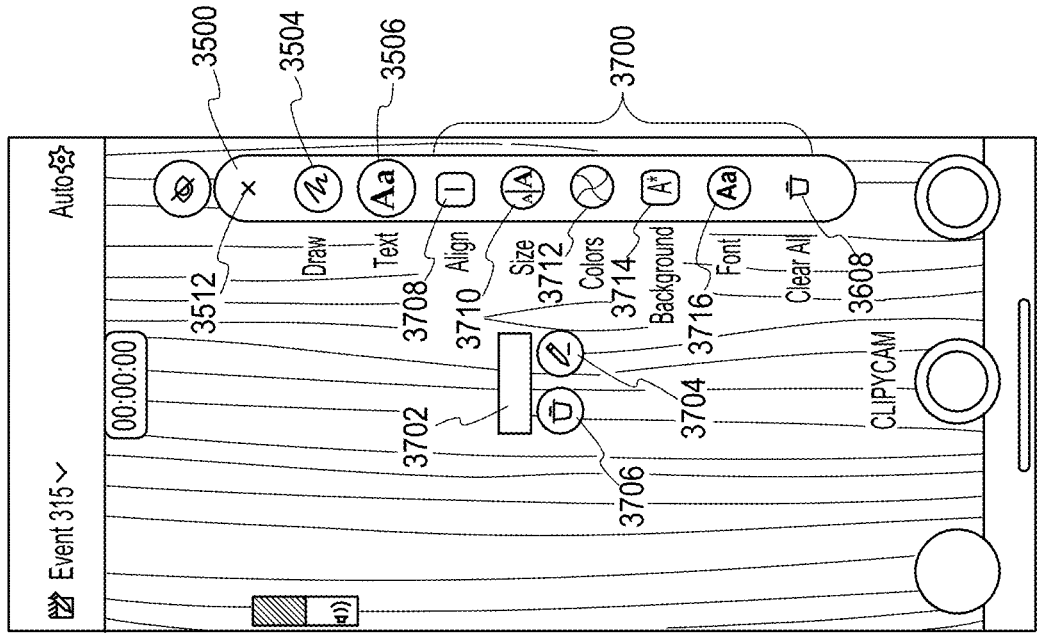
FIG. 37 is a screenshot of a video recording system application interface that includes a real-time text annotation toolbar.

Typed Text Annotations: Analogously, as shown in FIG. 37, text notes can be typed directly onto the video as it is being recorded by activating the text tool control 3506 from the drop-down tool menu 3500. This causes the textbox 3702 and a text toolbar 3700 to be displayed. In addition, the drawing tool control 3504 remains displayed when the text tool control 3506 is selected as illustrated in FIG. 37, to facilitate rapid switching from text to drawing annotations without the extra navigation step of activating a close control 3512 to close the text toolbar 3700, as with switching from drawing to text as explained above.

A user can move the textbox 3702 by touching and dragging it to another position in the viewfinder window 121. The text toolbar 3700 includes an alignment tool 3708, a text size tool 3710, a text color tool 3712, a text background tool 3714, a font tool 3716, and the previously described clear-all control 3608, which functions the same whether the drawing tool 3504 or the text tool 3506 is selected. The alignment tool 3708 can be activated to toggle between left margin alignment, centered alignment, and right margin alignment settings for text typed into the text box 3702. The visual icon representing the alignment tool 3708 is a cursor symbol inside a square. The currently active alignment setting is visually indicated by a left, centered, or right position of the cursor symbol in the square. Angular text alignment is automatically adjusted to be horizontal when the camera device (e.g., smartphone) changes between portrait and landscape orientation, and the cursor symbol of the alignment tool 3708 is updated accordingly to be vertical in the current camera orientation. Activating the text size tool 3710 can prompt for a numeric "point" value to be entered or selected or for the user to adjust font size using a visual "slider" control (neither shown). Activating the text color tool 3712 can prompt a user to select a color, and in embodiments, an opacity, of typed annotation text itself, such as in one of the ways described above for the stroke color tool 3604. The background tool 3714 can similarly be used to set the color and opacity of a fill applied to the textbox 3702, in addition to whether or not a fill, and/or a border, of the textbox 3702 is displayed at all. The font tool 3716 when activated displays a scrollable list of alphabetically ordered fonts, similarly to an analogous tool of a typical word processor software application. As previously noted, the clear all tool 3608 functions the same whether the drawing tool 3504 or the text tool 3506 is selected.

Figure 38:
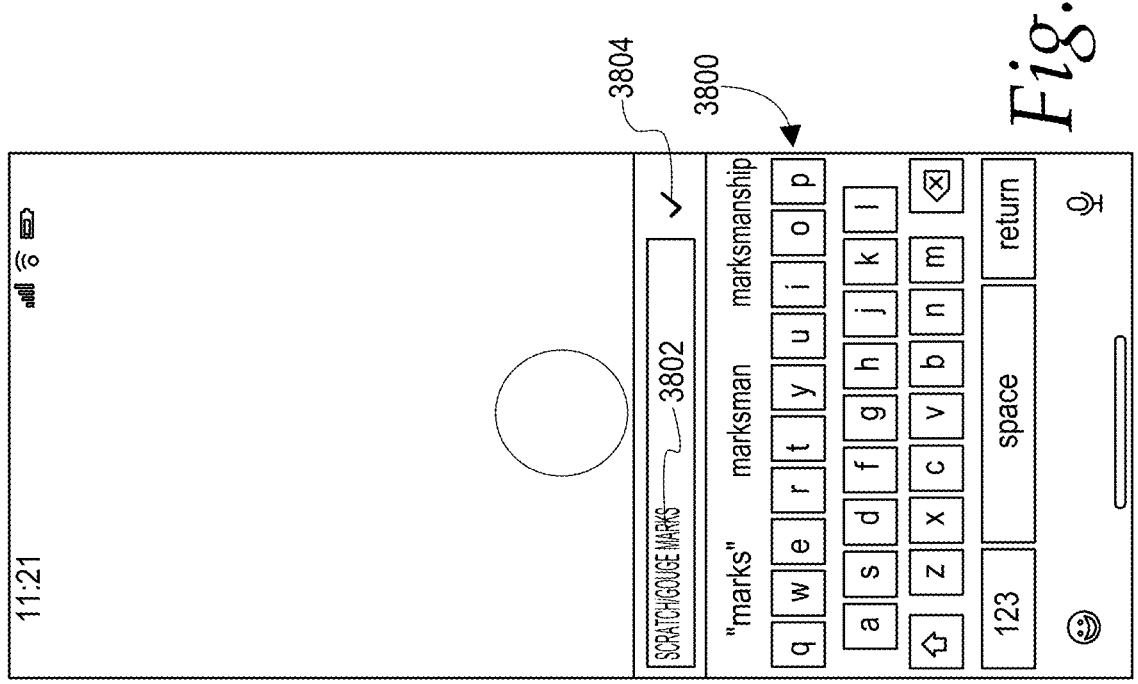
FIG. 38 is a screenshot of a video recording system application interface that includes a touch keyboard interface for a real-time text annotation tool.

An edit textbox control 3704 and a delete textbox control 3706 are displayed below the text box 3702. Activating the edit textbox control 3704 causes a touch keyboard 3800 to be displayed as shown in FIG. 38. A user enter text to be displayed by first typing on the keyboard 3800 and then activating an accept control 3804 to cause the typed text 3802 to appear in the textbox 3702. In other embodiments, the typed text 3802 appears in the textbox 3702, and begins to be recorded with annotated footage, as it is typed. Typed text annotations can be used, for example, to add commentary, labels, or explanations to enhance a viewer's understanding. For example, as illustrated in FIG. 39, a text note 3802 reading "Scratch/gouge marks" accompanies the aforementioned drawing marks 3902, which point to and encircle the respective positions of a scratch and a gouge appearing on a finished wood surface.

Flexible Annotation Tools: The real-time annotation feature provides a user with one-touch controls to switch between creating drawing and text annotation. In particular, when the drawing tool control 3504 is selected to display the drawing toolbar 3600 as shown in FIG. 36, the text tool control 3506 can remain displayed, and vice-versa as shown in FIG. 37. This enables a user to switch on-the-fly between drawing and text annotation toolsets without requiring an extra step of closing the respective toolbar (e.g., by tapping the X at the top). This enables the user to annotate segments of video in the most effective way with minimal interruptions or delays.

Benefits:

It will be appreciated that the real-time annotation feature provides numerous benefits, including the following:

Instant Feedback. A user's annotations are immediately displayed to the user as they will appear in recorded footage over the image frames being recorded. This allows the user to make desired adjustments or refinements to the annotations while the recording is in progress, such as repositioning or editing annotation marks.

Enhanced Communication: Real-time annotation enables a user to convey a clear message by highlighting key points or adding detailed explanations to video footage as the action being recorded unfolds.

Interactive Content Creation: Dynamic annotations that appear in real-time can engage a viewing audience by making videos more informative and compelling.

Streamlined Workflow. The real-time annotation feature saves time by integrating annotations directly during recording, reducing the labor required for post-production editing, if not eliminating it entirely. In particular, a user does not have to log, memorize, or later play back or scan through video files to find segments the user wanted to annotate when the those segments were already annotated during recording. Even if the user wants to edit the annotations later, the original annotations created during recording provide a visual cue of the location(s) of the annotated segment (s), making those segments easier to locate. The original annotations can be edited or replaced in post-production according to various different embodiments, such as the following.

In embodiments, when a user applies annotations to footage of a recording in progress using tools of the disclosed real-time annotation feature, the unannotated footage continues to be recorded to a clean video file in parallel with a separate annotated video file that contains the annotated image frames as they appeared in the viewfinder during recording, in a single layer. That is, pixel data is not retained in the annotated video file for areas of the footage recorded by the camera that are covered by the annotations. In these embodiments, revised annotations can still be applied in post-production by advancing the clean video file to the location corresponding to a live-annotated segment of the annotated video file and then using the tools as described above to redo the annotations with desired changes, to create a new annotated video file, which may, for example, be an annotated video clip file consisting only of the redone annotated footage. The annotated video clip file can then be spliced back into the originally created annotated video file, replacing footage of the corresponding timespan.

In other embodiments, the visual annotation content (such as the text notes 3802, drawing marks 3902 and/or other indicia or markings) can be stored as a separate clip file, including a logical pointer to the index of a frame of the video stream to which it corresponds, for purposes of displaying the two streams in combination as the user perceived them in real time when making the annotations.

In other embodiments, the annotations and the camera footage are packaged as separate layers of a single, multi-layer annotated video file, in which the annotations appears in a front/foreground layer and the camera footage appears in a rear/background layer, obscured or entirely hidden by the annotations, to the extent of the opacity of their visual elements. The multi-layer annotated video file can be played back in an environment that provides tools for the user to create new annotations during playback in exactly the same manner as during a live recording, and to edit existing annotations during playback in analogous ways. For example, the clear all control 2608 can be used during playback to clear all discrete drawing marks, text notes, or both, from the current image frame and from any and all subsequent frames in which those same marks or notes persist, but not to delete any drawing marks or text notes that first appear in a subsequent frame of the multi-layer annotated video file.

For purposes of such playback editing, a discrete drawing mark may be defined as a stroke made by continuous touch-input contact, between successive interruptions in touch-input contact on the touchscreen. For example, suppose a circle was drawn using the drawing tool 3504 during a recording, in a single stroke without breaking touch-input contact (e.g., fingertip skin contact or stylus contact) with the touchscreen. During playback editing, the circle is selected in a frame in which the entire completed stroke appears, and the user edits, moves, or deletes the circle. If desired, the change made by the user can be applied to the circle only as it appears in the frame in which the change is made and in subsequent frames in which any part of the circle still appears, but not in previous frames. Alternatively, the change can also be applied to all previous frames in which any portion of the circle appears, thus including frames showing the circle being drawn, beginning with the frame showing the first incremental mark to appear upon initial touch-input contact. In embodiments, a user can be prompted to specify whether to apply the change (such as deleting the circle, or changing the stroke color) in all subsequent frames, in all previous frames, or both.

Versatile Application: The real-time annotation feature is beneficial in a wide range of use settings, such as educational content and tutorials, live event coverage, presentations, and site inspections, to name a few.

Example Usage:

Educators and Trainers: The real-time annotation feature enables a user to enhance live lectures or training sessions with key points, diagrams, and notes to reinforce learning.

Content Creators: Content creators can use the real-time annotation feature to add real-time commentary and visual aids to tutorials, product reviews, or how-to videos, such as those frequently appearing on streaming platforms on the Internet.

Event Coverage: Important moments or details can be highlighted during live event recordings, such as in newscasting, sportscasting, or reporting on conferences, conventions, or other live organized events.

Corporate Presentations: Annotations created using the real-time annotation feature can be used to emphasize critical data points or highlight trends when recording footage to be presented in business meetings or presentations, or when recording the meetings or the presentations themselves.

Technical Demonstrations: The real-time annotation feature can also be used to provide step-by-step guidance and explanations during software demos, technical walkthroughs, or technical support sessions. In embodiments of this usage, the feature can be used to annotate footage captured by a screen recorder rather than by a camera. In such embodiments, a user selecting the drawing tool 3504 or the text tool 3506 can disable any user interaction with the display other than to create, revise and/or apply annotations, until the user is done annotating and exits or closes the tool. This enables the user to highlight or draw over interactive areas (such as buttons, form fields, menus, navigation tools, or other controls) of an underlying software application for reference or emphasis, without actually activating or interacting with those areas.

Reporting Damage or Safety Issues: The real-time annotation feature can be used on a video call to report an issue such as a broken railing at an apartment, a burned out headlight on a rental vehicle. Another use can be as a time saving measure when recording a livestream, a hashtag can be embedded in the stream for viewers to post with.

Figure 41:
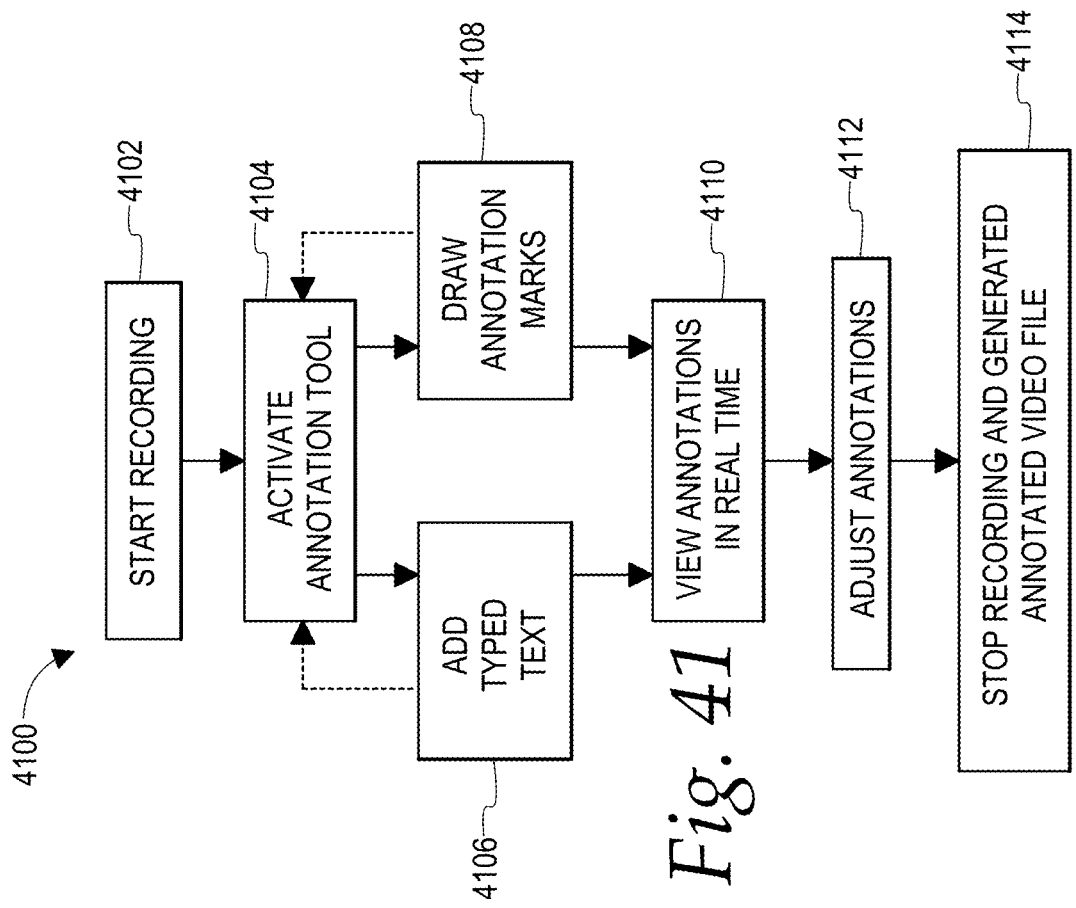
FIG. 41 is a simplified flowchart illustrating a method of using a real-time annotation feature of a video recording system.

Method of Use:

A method 4100 of using the real-time annotation feature according to an embodiment is illustrated in a simplified flowchart shown in FIG. 41.

Start Recording: In a step 4102, a user begins recording using a device running the system mobile application as described for any of the foregoing embodiments. Although the step 4102 is depicted as the first step of the illustrated method, in other methods the real-time annotation feature also permits the user to create drawing or text annotations before starting a recording, which will be incorporated into a recording as they appear in relation to the scene in the viewfinder window 121 as soon as the recording begins. Likewise, a user can create annotations to be incorporated into a photo, position the annotations as desired in relation to the scene in the viewfinder window 121, and then capture a photo by activating the snap control 134, and the annotations will be merged into a photo image file just as they appear over the scene.

Activate Annotation Tools: In a step 4104, the user accesses the drop-down tool menu 3500 by activating the show/hide control 3508 and then selects the text tool 3506 or the drawing tool 3504.

Add Typed Text. In a step 4106, the user taps the viewfinder window 121 to add textboxes 3702 where needed, activates the edit textbox control 3704 to type text in a selected textbox 3702, and adjusts font, size, color, and background as desired using the tools of the text toolbar 3700.

Draw on the Video: Optionally, the user then returns to the step 4104 to select the drawing tool 3504 from the drop-down tool menu 3500. (It will be understood that a user can draw and type on the video footage in any order, returning to the step 4104 to switch from one tool to the other as many times as desired.) The user then draws annotation marks in a step 4108, sketching or highlighting directly on the video footage, choosing from a range of drawing stroke colors, sizes, and opacities using the tools of the drawing toolbar 3600.

View Annotations in Real-Time: The user's annotations appear instantly as part of the recording, allowing the user to view the annotations in a real time in a step 4110 and make real-time adjustments to the annotations in a step 4112.

Save and Share: Once the recording is complete, the user stops the recording, and the system software application generates an annotated video file in a step 4114, in which the annotations are embedded into the video footage, ready for immediate sharing or further editing.

In view of the foregoing, it will be appreciated that real-time annotation feature according to this disclosure brings a powerful set of tools to the recording process, allowing a user to create interactive and engaging videos that convey the user's message effectively and efficiently in a number of practical settings.

Resume-Record Timer

According to another aspect of the disclosure, the system mobile app includes a resume-record timer feature, as described here with reference to FIGS. 42-45. The resume-record timer feature offers users the ability to smoothly transition back into recording after a pause, with a customizable countdown timer. This feature is particularly beneficial for scenarios where precise timing and preparation are crucial before resuming video capture. It includes an audible countdown for added convenience, especially when using remote controls or other connected devices.

Functions and Controls:

The resume-record timer provides a seamless way to manage the transition from a paused state back to recording, with enhanced control and precision, such as when a user is pausing during a live recording session or taking a break in a scripted video.

Timer Setup: A user can set a customizable timer that counts down to the resumption of recording after a pause. The user can choose a countdown time that will allow the recorded subject to get back into position or prepare for the next scene during the pause.

Audible Countdown: The feature includes an audible countdown that can be heard through a user device speaker or connected audio equipment, so that a user who cannot see the visible countdown timer on the app interface can still be alerted to the moment that recording will resume.

Remote Activation: The feature can be activated using a variety of remote control options, including a standalone Bluetooth remote control device, a smartwatch, a device with voice recognition capabilities receiving a voice command from a user, or even a second smartphone running the system mobile app and communicating with a first smartphone that has the camera being used for a paused recording in progress, to trigger the resume timer from a distance. In an embodiment of the latter case, the second smartphone may communicate only passively with the first smartphone during the use of the resume-record timer feature. That is, the second smartphone merely continues to receive streaming footage captured by the camera of the first smartphone and transmitted to the second smartphone, while the recording of that footage is performed locally by the processor of the second smartphone writing frame data of the received footage to physical storage, such as a local storage device of the second smartphone. In another embodiment, the second smartphone is used to "drive" the execution of the system mobile app on the first smartphone, using the remote-interface feature (according to another aspect of this disclosure described further below) to direct the processor of the first smartphone to perform the actual recording of footage by writing frame data streamed by its own camera to storage, such as its own local physical storage device. In yet another embodiment, the remote-interface feature may provide a mode in which the system mobile app interface displayed the second smartphone can be used to direct the processors of the first smartphone and the second smartphone to record simultaneously in parallel the same streaming footage from the first smartphone camera, each to a different storage location, such as a location in the physical local storage device of the respective smartphone.

Visual and Audible Cues: The feature can produce visual and audio signals to help a user anticipate the resumption of recording, which is especially useful for solo videographers or in dynamic shooting environments.

Benefits:

Smooth Transition: The resume-record timer feature allows a user to achieve flawless continuity in videos by providing adequate preparation time before recording resumes.

Increased Control: A user can tailor the timer settings to fit the user's specific needs, allowing for better control over the recording process.

Enhanced Convenience: The audible countdown, provides clear timing cues without a user needing to watch the app screen.

Flexible Remote Use: A user enjoys the flexibility to control the resume-record timer from various remote devices, enhancing ease of use and accessibility.

Professional Quality. The feature enables a user to maintain a professional level of timing and coordination in the user's videos, crucial for high-quality content production.

Example Usage:

Solo Content Creators: The resume-record timer feature can be used to resume recording without rushing, using the countdown to get back into position or prepare for the next shot.

Live Event Recording: The feature facilitates a smooth transition from a paused state during live events, ensuring no important moment is missed when resuming.

Instructional Videos: A user can prepare for the next segment of a tutorial or educational video during a controlled countdown, improving overall presentation flow.

Remote Filming: The feature can be used with remote devices like a smartwatch or another smartphone to manage recording while away from the camera, ideal for action shots or dynamic filming setups.

Group Activities: The feature provides clear cues to participants in group activities or presentations to get ready when recording is about to resume.

Method of Use:

A method 4600 of using the resume-record timer feature according to an embodiment is illustrated in a simplified flowchart shown in FIG. 46.

Pause Recording: In a step 4602, a user pauses a recording in progress at any time as needed by activating the pause control 4202 shown in FIG. 42 (the appearance of which is then transformed to that of a standard triangular "play" button symbol, as a visual cue that the next activation of the pause control 4202 will resume recording).

Figure 43:
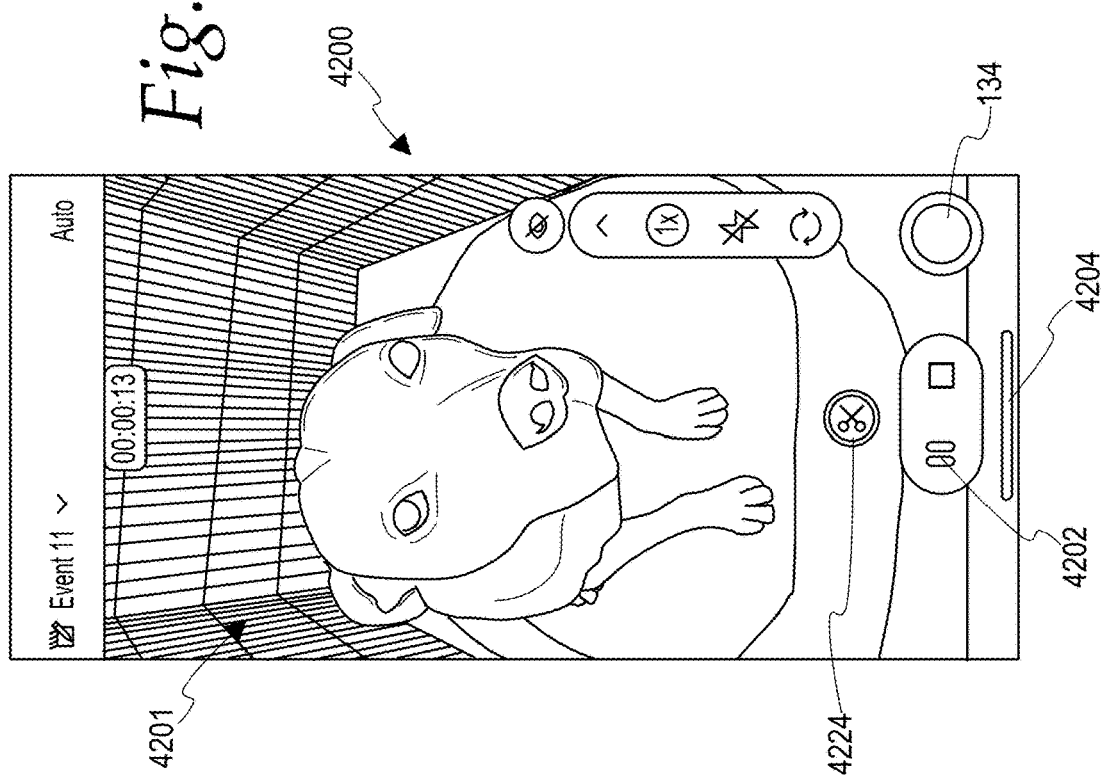
FIG. 43 is a screenshot of a video recording system application interface that includes a resume-record timer tool for a paused video recording in progress.
Figure 44:
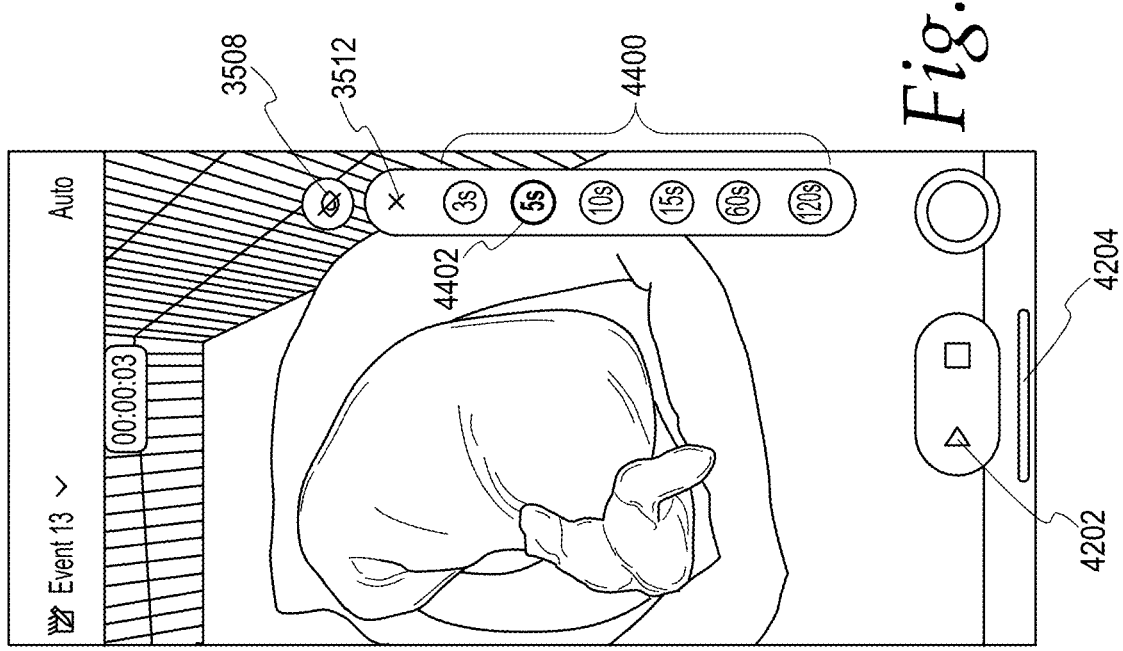
FIG. 44 is a screenshot of a video recording system application interface that includes a time-control selection panel for selecting a countdown time to resume a paused recording in progress.

Activate Resume-Record Timer Tool: In a step 4604, the user selects a resume-record timer tool 3514 from the dropdown tools menu 3500 as shown in FIG. 43 (it will be noted that a video timer tool 3514' can also be provided as shown in FIG. 35, which functions analogously to the resume-record timer tool 3514 and is used to set a countdown timer to the start of a new video recording rather than the resumption of one in progress), and a resume-time selection toolbar 4400 depicting a plurality of time controls 4402 is displayed, as shown in FIG. 44.

Figure 45:
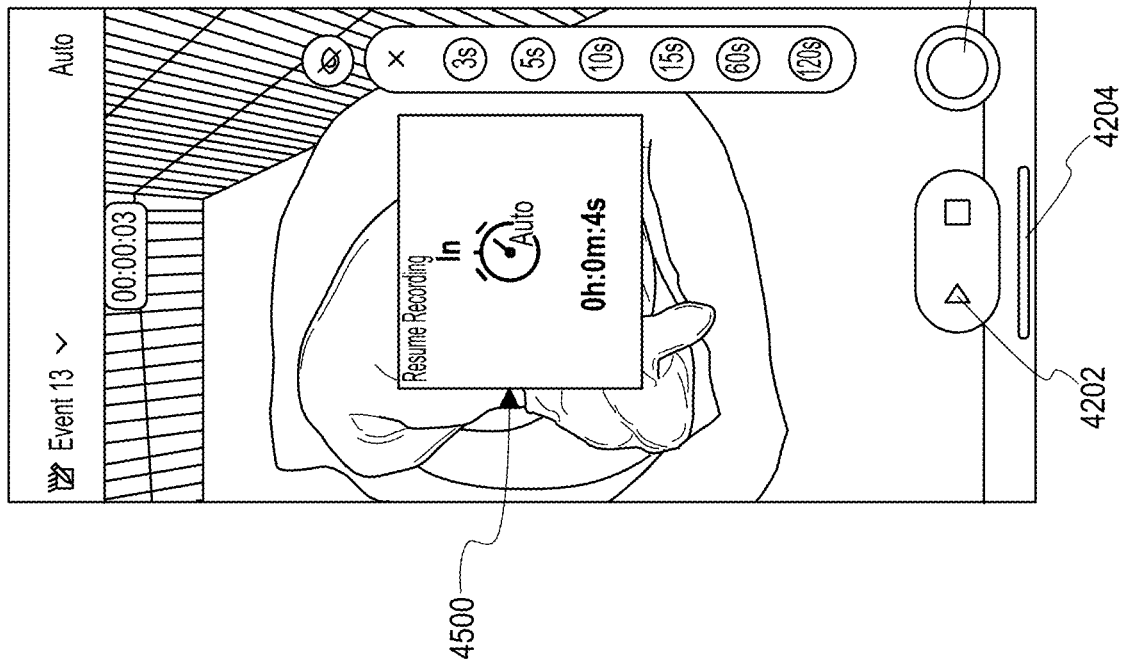
FIG. 45 is a screenshot of a video recording system application interface that illustrates the display of an active resume-record countdown timer.

Activate Timer: In a step 4606, the user selects a time control 4402 from the resume-time selection toolbar 4400, such as a five-second time control 4402, as illustrated in FIG. 44, based on a preparation time anticipated by the user. In an embodiment, a step 4608 of the system app displaying and initiating a countdown timer 4500, as shown in FIG. 45, is automatically triggered by the user selecting the time control 4402. Alternatively, countdown initiation 4608 is triggered in a separate step 4607, such as by a user activating a start-countdown control (not shown) that is displayed in response to the time control selection step 4606. In either case, a device 4200 that comprises the touchscreen 4201 shown in FIGS. 42-45 may be a remote control device distant from the system camera (not shown). For example, the system camera may be that of a first smartphone held on a stable support such as a tripod (not shown), and the device 4200 may be a second smartphone carried by a user. In that case, at least the second smartphone 4200, and optionally both smartphones, are running the system mobile app, which is operative to communicate with the first smartphone to receive a video stream that is captured by the first smartphone camera and transmitted by the first smartphone via a suitable wireless protocol such as Wi-Fi or Bluetooth, and to display the corresponding footage in the viewfinder window 121, user inputs to the second smartphone in turn being transmitted by the app to the first smartphone to control its camera, while the processor of either smartphone or both smartphones can generate, store, and manage logical and/or physical video data streams from the footage captured by the camera in response to user inputs, utilizing the full functionality of the system mobile app according to any of the aspects and embodiments described in this disclosure. In another embodiment, in which countdown initiation 4608 is not automatically triggered by time control selection 4606, the countdown triggering step 4607 can be another type of remote trigger, for example, a trigger signal received from another type of remote control device such as a suitable Bluetooth remote control or a smartwatch. A benefit of including the countdown triggering step 4607 separately from the time control selection step 4606 is that the remote control device used in the step 4607 need not have the capability of displaying the resume-time selection toolbar 4400 and can, for example, instead be a simple device with a single mechanical button. Alternatively, the triggering step 4607 can be a voice command spoken by a user and received by a microphone 4204 of the device 4200 shown in FIGS. 42-45, in response to which the system mobile app running on the device 4200 triggers the countdown initiation step 4608.

Countdown: In a countdown step 4610, the countdown timer 4500 counts down the selected amount of time to resumption of recording. When an audible countdown is activated, such as for the last three or five seconds of the countdown, a user can listen for the start of the audible countdown and/or watch for visual cues on the mobile app interface displayed on the screen 4201 of the device 4200, which, as noted above, can be the device that includes the system camera or a connected device that remotely controls the system camera.

Resume Recording: In a resume recording step 4612, the countdown reaches zero and the system mobile app directs the device 4200 to resume recording from the system camera, which may be that of the device 4200 or a connected device, and video continues to be captured seamlessly from the paused point.

The resume-record timer feature of the system mobile app provides unparalleled control and precision for managing recording sessions, making it an essential tool for users who need smooth and efficient transitions when resuming video capture.

Remote Interface

According to another aspect of the disclosure, the system mobile app has a remote interface feature. The remote interface feature allows users to control and manage their recording device from another device, offering the convenience and flexibility of a remote desktop-like experience. Whether a user needs to operate a camera set on a tripod from a distance or provide live technical support, this feature transforms how the user can interact with a recording setup, enabling seamless and efficient control from virtually anywhere.

Functions and Capabilities:

The remote interface feature empowers users to "drive" the system mobile app on one device using another device, providing a versatile solution for remote control and operation. This functionality is perfect for scenarios where direct access to the recording device is impractical or impossible:

Cross-Device Control: A user can use a secondary device running a remote interface application (which may be a module of the system mobile app or a separate standalone application), such as a smartphone, tablet, or computer, to remotely control the system mobile app running on another device. This is ideal for managing a camera on a tripod or other fixed position without physically handling the device.

Live Preview and Interaction: A live stream of the entire system mobile app interface display can be transmitted from a recording device running the system mobile app to a remote device and presented on the remote device with touch controls enabled on the remote device touchscreen interface over the same areas of the streaming interface display image as on the recording device. When a user activates one of the touch controls on the remote device, the remote interface application running on the remote device directs the remote device to transmits an instruction to the recording device, for the same operation to be performed by the same physical components of the recording device as described elsewhere in this disclosure for the corresponding control, which may be a control according to any aspect or embodiment. This allows a user to adjust settings, start/stop recording, and manage any other functions in real-time.

Full Access to Features: All of the system mobile app functions can be controlled remotely, including starting and pausing recordings, adjusting camera settings, and using annotation tools.

Seamless Integration: A user can connect to the remote interface via Wi-Fi, Bluetooth, or cloud services, ensuring smooth and reliable control across different environments.

Technical Support Use: The remote-interface feature can facilitate live technical support, where a support agent can take control of a user's device to troubleshoot issues or to guide the user through the application's functionalities.

Benefits:

Enhanced Flexibility: A recording device can be controlled from a distance, beneficial for scenarios where direct interaction with the recording device is challenging or inconvenient.

Improved Workflow. In an embodiment, the remote-interface application can be used to drive the system mobile app on multiple devices alternately from one remote device. Complex recording setups, such as multi-camera shoots or tripod-mounted cameras, can thus be simplified by managing every camera from a single, convenient location.

Increased Efficiency: A user can save time and effort by making real-time adjustments and activating controls without having to go to the location of the recording device.

Remote Assistance: A user benefits from the ability to provide and/or receive live technical support remotely, streamlining the process of troubleshooting or learning new features.

Versatile Application: The remote interface feature is beneficial for a range of uses of a video recording and file management system, from solo videography and remote learning to professional broadcasting and event coverage.

Example Usage:

Solo Videographers: A solo videographer user can use the remote-interface feature to control a camera on a tripod from the user's smartphone, allowing for easy adjustments and recording management from wherever the user is positioned.

Technical Support. A support agent can provide live, remote technical assistance by taking control of a user's device, helping the user navigate or troubleshoot the system mobile app in real-time.

Group Events: A user can manage recording of events by multiple cameras at distributed locations from one central location, ensuring smooth and coordinated video capture without needing to move between devices.

Educational Settings: Teachers can use the remote interface application running on their tablets to control classroom cameras, enabling seamless switching between camera angles and recording perspectives.

Professional Broadcasting: A user can operate multiple cameras in a studio or on-location remotely, ensuring precise control over each recording setup.

Method of Use:

A method 4700 of using the remote-interface feature according to an embodiment is illustrated in a simplified flowchart shown in FIG. 47.

Set Up Connection: In a step 4702, a user connects a primary recording device running the system mobile app and a driven-side remote-interface application to a remote control device running a driving-side remote-interface application, via Wi-Fi, Bluetooth, or a cloud service. In an embodiment, both the driving-side and driven-side remote-interface applications are modules of the same system mobile app, which runs on both devices.

Launch Remote Interface: In a step 4704, a user launches the appropriate software on both devices and activates the remote interface feature. As indicated by arrows in both directions connecting the steps 4702 and 4704, these steps may occur in a different order in different embodiments of the remote-interface feature or methods of using it. For example, the driving-side or driven-side remote interface application may incorporate a connection tool that scans for nearby devices in direct pairing modes and/or allows a user to specify the address of a device on the Internet or a local-area network (LAN) to request to connect to that device, which may be configured to accept the request automatically, for example when both devices are logged in to a common user account on a system server, or in response to prompted user input on the device that receives the connection request.

Control from Remote Device: In a step 4706, a user accesses the driving-side remote-interface application on the remote device to view a live feed of, and interact with, the system mobile app interface on the recording device.

Operate Recording Functions: In the step 4706, the user can operate any of the functions of the system mobile app running in the recording device from the driving-side remote-interface application running on the remote device, including, for example, starting and stopping a recording, creating clips, saving and organizing files by events, creating real-time annotations, adjusting settings, and managing other features.

Seamless Switching: A user can easily switch between different remote devices and/or different recording devices if needed, by returning to the steps 4702 and 4704 or connecting the devices and launching the appropriate software on each device, thus maintaining uninterrupted control over a recording setup.

In view of the foregoing description, it will be appreciated that the remote-interface feature of the system mobile app provides users with a convenient way of managing one or more recording devices from a distance by viewing and interacting with a remote interface that mirrors the system mobile app interface on the recording devices themselves and thus will already be familiar to those who have used the system mobile app to record video on a single handheld camera device. This functionality is invaluable for various applications, from enhancing solo recording efforts to facilitating professional technical support and live event management.

Toggle Audio Source

Returning to FIG. 35, according to another aspect of the disclosure, the system mobile app includes a toggle-audio-source feature. In particular, a user can select a real-time audio controls tool 3516 of the drop-down tool menu 3500. In response, the system mobile app displays a microphone panel, from which a user can toggle audio recording on and off, as well as selecting and toggling between a plurality of connected microphone devices 3520a-3520c. In response to a user's selection of a microphone device 3520a-c during a recording in progress will immediately begin to record and synchronize audio from the selected microphone to the video footage being recorded. For instance, in a recorded conference or seminar, it may be useful to toggle from a presenter's microphone to a remote microphone passed to an audience member with a question, so that the question will be heard clearly in a combined audio-video file of the presenter's presentation, without the delay of the same microphone needing to be carried back and forth between the presenter and the audience. The toggle-audio-source feature can be integrated into and combined with other features of the system mobile app according to any aspect of this disclosure.

Smart Tagging

According to yet another aspect of the disclosure, the system mobile app incorporates a smart tagging feature that allows a user to track and highlight moving objects in videos. With just a simple tap, a user can tag a subject (like a person) in a single frame, and the system mobile app will continuously track and highlight that subject with a visual tag, such as a mark, symbol, or text, throughout the video. This smart tagging capability can help the user to keep the tagged subject in the viewfinder area and/or in focus, no matter how the subject moves within the frame, making it ideal for dynamic scenes and events. In addition, the visual tag can be incorporated into the video recording, analogously to the drawing marks or text applied using the real-time annotation feature described above. As with real-time annotation, in various embodiments, the visual tag image can be recorded in a separate editable layer or editable file from the corresponding video footage, and/or a clean video file and a tagged video file can be generated in parallel, either for the entire video in which the tag appears, or by the system mobile app automatically starting a tagged clip when the tag is applied and setting an end pointer of the clip at the first frame in which the tag no longer appears, such as because the tagged subject moves out of the viewfinder area, or because the user manually clears the tag.

Functions and Capabilities

The smart-tagging feature offers an intuitive and powerful way to automatically track and annotate moving objects in a user's video.

One-Tap Tagging: As illustrated in FIG. 48, in embodiments, a user can apply a visual tag 4804 by simply tapping a subject (such as a person, vehicle, or any point of interest) appearing anywhere in the viewfinder window 121.

Alternatively, the system mobile app interface can display a smart-tagging tool 4802, for example, as an item of a drop-down tool menu (not shown), or as a persistent floating icon as shown.

Continuous Tracking: The tagged object is continuously tracked across subsequent frames, even as it moves, and remains highlighted throughout the recording.

Dynamic Object Identification: Using advanced object tracking algorithms, the system mobile app dynamically identifies and follows the object, adjusting to changes in movement and positioning within the frame.

Persistent Annotations: The tag can be combined with annotations, such as labels or markers, that move with the object, providing consistent focus and commentary. In the illustrated example, the visual tag 4804 incorporates a text label "Jimmy," which can be entered by a user via the same touch keyboard interface 3800 (not shown in FIG. 48) as described and illustrated above for the real-time annotation feature. The touch keyboard interface 3800 can be displayed automatically when a tag is placed or only when a user taps an edit tag control (not shown) that appears near the visual tag 4804, analogously to the edit textbox control 3704 of the real-time annotation feature. When viewing the video stream in a video file that is subsequently created by the user activating the stop control 122, a video timeline (not shown) can be bookmarked at the time index of the frame where the visual tag 4804 was applied. In an embodiment, the text label of the tag 4804 will be displayed with the bookmark.

User-Friendly Interface: Easily manage and adjust tagged objects through an intuitive interface, allowing for seamless interaction and control.

In embodiments, visual tags can similarly be applied to subjects in a pre-recorded video file being replayed in the system mobile app environment. The smart tagging feature can extrapolate the tags forward and/or backward to all subsequent and/or previous frames of the pre-recorded file in which the subject continuously remains in view. Instead of occurring in real time as with smart tagging of a subject appearing in live footage of a recording in progress, such extrapolation can be nearly instantaneous, or as fast as can be performed by the processor running the algorithms of the smart-tagging feature, for example, that of a camera/recording device 4800 on which the system mobile app interface is displayed as shown in FIG. 48, or that of a cloud server connected thereto. A new tagged video file is thus created by merging the tags with the pre-recorded footage, and the tagged video file can either overwrite the existing pre-recorded file or be stored as a new file in a separate physical storage location.

Benefits:

Enhanced Focus: The smart-tagging feature helps users to keep important subjects in view and highlighted, no matter how they move, thus directing a viewer's attention to key elements.

Improved Clarity: The smart-tagging feature automatically tracks and tags moving objects, which is especially useful to promote clarity and understanding of instructional or action-packed videos.

Time-Saving Automation: The smart-tagging feature reduces the need for manual tracking and adjustments, saving time and effort in post-production.

Professional-Grade Results: The automatic tracking and tagging of the smart-tagging feature produce professional-quality video effects that can enhance the overall production value of a user's content.

Versatile Application: The smart-tagging feature can be beneficially applied to a wide range of uses, from recording live sports and events to creating educational videos and live demonstrations.

Example Usage:

Sports and Action Filming: The smart-tagging feature can be used to facilitate tracking and highlighting athletes or players in fast-paced sports, ensuring they remain in focus even during rapid movements.

Educational and Instructional Videos: The smart-tagging feature can be used to tag and follow specific points of interest or subjects during a hands-on video lesson or tutorial, maintaining visual focus on key elements.

Event Coverage: The smart-tagging feature can be used to keep track of important individuals or objects during events.

Personal Videos: The smart-tagging feature can be used to tag and follow family members or friends in personal recordings, capturing their actions and interactions without losing focus.

Surveillance and Monitoring: The smart-tagging feature can be used to automatically track moving objects in security or monitoring footage, enhancing the ability to review and analyze activity. In addition, in embodiments of the smart-tagging feature for tagging security footage, the object tracking algorithms can be used to detect a moving object in the frame and automatically tag that object without a user tapping the object on the screen, so that moving objects can be detected without intervention by human security personnel.

Method of Use:

A method 4900 of using the smart-tagging feature according to an embodiment is illustrated in the simplified flowchart shown in FIG. 49

Start Recording: In a step 4902, a user begins a video recording with the system mobile app as usual.

Tap to Tag: In a step 4904, the user taps on an object in the current frame (such as a person or item) using the smart tagging tool to apply a visual tag to the object.

Continuous Tracking: In a step 4906, the object tracking algorithms of the system mobile app are applied to recognize and follow the tagged object as it moves within the frame, maintaining and moving the visual tag with the movement of the object in subsequent frames.

Persistent Annotations: In a step 4908, a label or marker is applied to the tagged object, which will move with it, providing continuous annotation and focus.

Review and Adjust: In a step 4910, a user uses the system mobile app interface to manage tagged objects, adjust tracking as needed, or remove tags at any point during the recording.

The smart-tagging feature in the system mobile app makes it easy to keep dynamic and moving objects in focus, providing automated tracking and highlighting for a variety of video production needs. This functionality is ideal for capturing detailed, professional-quality content in diverse and active environments.

Intelligent Anomaly Detection

According to another aspect of the disclosure, an intelligent anomaly detection feature is provided, in which an anomaly detection module utilizes advanced machine learning algorithms to analyze real-time data and automatically identify anomalous events or behaviors within footage recorded using the disclosed systems and software. In embodiments, a user/administrator environment includes an anomaly detection setting that can be activated and deactivated by a user and/or set by a user to be activated and deactivated at scheduled times.

Advanced Machine Learning Algorithms:

The anomaly detection module employs state-of-the-art machine learning techniques, including anomaly detection models, to continuously analyze video and sensor data in real-time.

The anomaly detection module incorporates and uses algorithms trained on a diverse dataset that includes examples of normal activities as well as various types of anomalies.

Real-Time Anomaly Identification:

When the anomaly detection setting is activated, the anomaly detection module directs a system processor to process incoming data streams to detect deviations from expected patterns or behaviors.

The anomaly detection module identifies anomalies such as unexpected movements, unusual sounds, or changes in environmental conditions that may indicate potential issues or events of interest.

In embodiments, the anomaly detection module instructs the processor, in response to an anomaly being detected in real time, to start an anomaly clip stream (i.e., set a clip stream start pointer as previously described), continue the anomaly clip stream while the anomaly continues to be detected, stop the anomaly clip stream (i.e., set a clip stream end pointer) when the anomaly is no longer detected, generate an anomaly clip file containing an anomaly clip (e.g., a chronological sequence of frames) running from the start pointer to the end pointer. The anomaly detection module can further instruct the processor to assign a default filename string to the anomaly clip file, such as "Anomaly1," "Anomaly2," etc., indicating a sequential order in which the anomaly was detected.

In embodiments, the anomaly detection module instructs the processor to causes a visible and/or an audible anomaly alert to be presented with the clip stream, such as by displaying text (e.g., "Anomaly 1 Detected") or a visual marker adjacent to or superimposed over a viewing frame on a security monitor screen showing a live anomaly clip stream from an associated security camera. The anomaly alert can be recorded and stored to a main video file and/or to the associated anomaly clip file. A main video file can, for example, be any of a plurality of static files automatically generated at regular intervals, such as fifteen-minute, half-hour, or hour intervals, and/or a static file generated on demand from a continuously updated file containing all the frames of the main video stream captured from a start time to the present.

In still other embodiments, the anomaly alert can indicate an area of each image frame in which the anomaly appears, such as by an arrow pointing to the area and/or a closed shape drawn around a perimeter of the area in a color contrasting with adjacent pixels or portions of the image.

In still other embodiments, the anomaly detection module can instruct the processor to send an anomaly notification in real time to a remotely located individual or entity, such as via email, phone, SMS, a direct-messaging platform incorporated into a mobile app of the systems according to this disclosure, and/or other personal communication channel(s) directed to that individual or entity.

In still other embodiments, the anomaly detection module can instruct the processor to take different actions for different anomalies. For example, the anomaly detection module may distinguish anomalies by category/type and/or by degree/severity, and initiate an audible anomaly alert and/or send an anomaly notification only for anomalies of certain type(s), severity, or combination thereof.

Adaptive Learning and Improvement:

Over time, the anomaly detection models adapt and improve based on feedback and new data inputs.

This adaptive learning capability enhances the accuracy and reliability of anomaly detection, minimizing false alarms and ensuring timely alerts for genuine anomalies.

Benefits:

Enhanced Security. Detects and alerts users to suspicious or abnormal activities, enhancing security monitoring capabilities.

Early Warning System: Provides early detection of potential issues or incidents, allowing for proactive intervention or response.

Efficiency: Reduces the need for manual monitoring by automating the detection of anomalies in real-time.

Improved Safety: Enhances safety measures by identifying hazardous situations or emergencies promptly.

Example Usage:

Security Monitoring: Automatically detects unauthorized access or suspicious behavior in restricted areas, triggering alerts for security personnel.

Environmental Monitoring: Monitors environmental conditions in construction sites or industrial facilities, alerting workers to anomalies such as sudden temperature changes or equipment malfunctions.

Quality Control: Identifies defects or irregularities in manufacturing processes by analyzing video feeds, ensuring product quality standards are met.

Method of Use:

Data Collection: Software of the disclosed system collects and streams video and sensor data from cameras and connected devices.

Real-Time Analysis: Utilizing machine learning models, the anomaly detection module analyzes incoming data streams to detect patterns and deviations from normal behavior.

Anomaly Detection: Upon detecting anomalies, the anomaly detection module triggers alerts or notifications to notify users of potential issues.

Continuous Learning: The anomaly detection module continuously learns from new data to improve its anomaly detection capabilities over time.

Independent Claim Revisited:

The intelligent anomaly detection feature of the system mobile app employs advanced machine learning algorithms to analyze real-time data streams and automatically identify anomalous events or behaviors within recorded footage. By leveraging adaptive learning techniques, the system enhances detection accuracy and responsiveness, providing users with a proactive approach to monitoring and addressing potential issues.

It will be appreciated from the foregoing description how intelligent anomaly detection enhances the functionality of video recording and file management systems according to this disclosure, offering users robust capabilities for security monitoring, environmental management, and quality control through automated anomaly detection.

Application Programming Interface ("API")

In yet another embodiment, software that implements the above-disclosed aspects is stored in a cloud server and exposed as an Application Programming Interface ("API"). The API can be exposed as a browser plugin, a mobile device object, a computer interface, or via some other means. Using the API a programmer can, for example, build a custom video conferencing application that automatically creates clips in response to certain input(s) from a conferencing host. This can be especially useful for a training webinar that comprises "chapters" or "episodes." As the webinar progresses, the host can make a simple input at the end of each chapter, and the a web conferencing application using the API can automatically create all of the clips.

The API clip creation feature empowers developers and users to integrate clip recording and management capabilities seamlessly into other platforms, such as Zoom®, Microsoft Teams®, or web browsers. With this feature, external applications can leverage the robust functionality of software according to this disclosure to create, manage, and store video clips without users having to leave their native environment.

API Capabilities and Functions

The API provides a powerful and flexible way to extend the software's capabilities through third-party applications and platforms. By integrating with the API, developers can enable their users to:

Initiate Recording: Start recording video clips directly from within their application, whether during a video conference or while browsing the web.

Control Clip Settings: Customize recording parameters such as resolution, frame rate, and audio settings to suit specific needs or standards.

Manage Clips: Access the software's organizational tools to name, categorize, and store clips in a structured and easily retrievable manner.

Automate Workflows: Use API calls to automate the creation, processing, and storage of clips, reducing manual effort and streamlining content management.

Real-Time Editing. Apply the software's editing tools on-the-fly, such as trimming, adding annotations, or adjusting audio levels, directly from the integrated platform.

Benefits:

It will be appreciated that the API clip creation feature provides a number of benefits, including the following:

Seamless Integration: Enhances existing workflows by embedding the software's recording and editing features within familiar platforms.

Improved Productivity: Allows users to capture and manage video content without interrupting their current tasks or switching applications.

Customization and Flexibility: Tailors the recording and clip management processes to fit the specific needs of an application and its users.

Enhanced User Experience: Provides a unified and streamlined experience for users who need to record and organize clips while working in other software environments.

Scalable Solution: Accommodates various use cases, from corporate training and virtual meetings to browser-based content creation, with the software's scalable API.

Example Use Cases:

Virtual Meetings: The software is integrated into a video conferencing platform such as Zoom® or Teams® to record meeting highlights or key discussions, automatically categorizing and storing clips for easy review.

Online Learning: The software is embedded into educational platforms to allow instructors to record lesson snippets, annotate them, and organize them by topics.

Web Research: The software's API is used with web browsers to capture and save important video content from web pages, annotated with notes and organized for later reference.

Customer Support: The software is integrated with customer support tools to record and manage clips of troubleshooting sessions or product demos, streamlining the support process. In embodiments, a main stream video file and clip files created therefrom are delivered to the customer at the end of a session or demo for the customer's later reference.

In view of the foregoing, the disclosed API transforms how the disclosed software can be utilized across various platforms, providing a versatile and powerful tool for capturing, managing, and enhancing video content wherever users need it.

General Notes on the Disclosure

Although the process-flow diagrams of this disclosure show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Throughout this disclosure, streams and clips are generally described as audiovisual streams and clips. However, it should be understood that the principles described herein can be applied to streams and clips of purely audio or purely video.

In the preceding description of various examples of embodiments of the disclosed systems and methods, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

The preceding description of the disclosure has been presented for purposes of illustration and description and is not intended to be exhaustive or to limit the disclosure to the precise form disclosed. The description was selected to best explain the principles of the present teachings and the practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claim(s) set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A video recording system comprising:
 a storage, the storage comprising a plurality of physical memory locations, the physical memory locations being adapted and configured to store digital image data frames, the digital image data frames representing digital image frames;

an electronic display, the electronic display being adapted and configured to display the digital image frames;
a user input device;
a processor, the processor being coupled to the storage, the display, and the user input device, the processor being adapted and configured to cause the digital image data frames to be read from the physical memory locations and the corresponding digital image frames to be displayed on the display;
software, the software being stored on the storage and executable by the processor, the software comprising instructions for the processor to cause a live digital video data stream comprising a series of digital image data frames to be read from the physical memory locations, the series of digital image data frames representing a corresponding series of digital image frames of a live digital video stream, to display the live digital video stream in an image frame area of the display, and, while displaying a digital image frame of the live digital video stream in the image frame area of the display:
  to display a record control on the display, the record control being adapted and configured to be activated by user input to the user input device, the record control being operative when activated to cause the processor to begin recording a recording stream, the recording stream comprising a series of recording stream digital image data frames representing a corresponding series of recording stream digital image frames, the recording stream digital image frames being image frames that are displayed in the image frame area after the record control is activated, wherein said recording comprises causing the recording stream to be written to the physical memory locations of the storage;
  to receive user annotation input via the user input device, the user annotation input representing visual annotation content extending over an annotation area within the image frame area;
  to read the user annotation input to determine the visual annotation content and the annotation area;
  after reading the user annotation input, to display annotated digital image frames in the image frame area while continuing to cause the live digital video data stream to be read, the annotated digital image frames being formed by combining subsequent digital image frames of the live digital video stream with the visual annotation content such that the visual annotation content is superimposed over the subsequent digital image frames in the annotation area;
  whereby, when an annotated digital image frame is displayed in the image frame area after the record control is activated, an annotated digital image data frame representing the annotated digital image frame is included in said recording stream written by the processor to the physical memory locations of the storage.

2. The video recording system of claim 1, further comprising
  a camera, the camera being operative to generate the digital image data frames of the live digital video data stream from corresponding live images being focused by a lens onto an image sensor of the camera;
  the processor being coupled to the camera and being operative to read the live digital image data frames of the live digital video data stream from the camera.

3. The video recording system of claim 1, further comprising a snap control configured to be activated by user input to the user-input device, wherein said instructions to write said at least one annotated digital image data frame to the physical memory location of the storage further comprise instructions, in response to a user activating the snap control, to write to said physical memory location a single annotated digital image data frame representing a single annotated digital image frame that is displayed in the image frame area when the user activates the snap control.

4. The video recording system of claim 1 wherein the display is a touchscreen display and the user input device is comprised in the touchscreen display, the user annotation input comprising the user touching the touchscreen display over the annotation area.

5. The video recording system of claim 4 further comprising a text annotation tool configured to be selected by user input to the user-input device, wherein when the text annotation tool is selected and the user touches the touchscreen display over an annotation area, the processor is instructed to display a text box over the annotated area, to display a touch keyboard, to receive user input text typed on the touch keyboard, and to display the user input text in the text box.

6. The video recording system of claim 5 wherein text is displayed in the text box as it is typed on the touch keyboard and, when the record control is activated, the text displayed in the text box is incorporated into subsequent annotated digital image data frames written to the storage.

7. The video recording system of claim 5 wherein the touch keyboard comprises an accept control, and text typed on the touch keyboard is only displayed in the text box and incorporated into subsequent annotated digital image data frames written to the storage when the accept control is activated after the text is typed.

8. The video recording system of claim 4 further comprising a drawing annotation tool configured to be selected by user input to the user input device, wherein when the drawing annotation tool is selected, the user annotation input is an input touch movement within the image frame area, the annotation area is an area contacted by the input touch movement, and the visual annotation content comprises a drawing mark.

9. The video recording system of claim 8 wherein the drawing mark is immediately displayed in the annotation area as the input touch movement is made and, when the record control is activated, the displayed drawing mark is immediately incorporated into subsequent annotated digital image data frames written to the storage.

10. The video recording system of claim 1 wherein the software further comprises instructions for the processor to display a stop control on the display, the stop control being adapted and configured to be activated by user input to the user input device, the stop control being operative, when activated following a most recent activation of the record control and while the corresponding recording stream is being recorded by the processor, to cause the processor to stop recording the corresponding recording stream and to write a video file to the storage, the video file comprising the digital image data frames of the corresponding recording stream that are written to the storage before the processor stops recording, sequenced in an order in which the corresponding digital image frames are displayed in the image frame area during said recording.

11. The video recording system of claim 1, further comprising a graphics card, the graphics card being coupled to the processor and the display, the physical memory locations comprising at least one display frame location on the graphics card, the graphics card being operative to store a digital image data frame in the display frame location and to cause the corresponding digital frame to be displayed in the image frame area of the display;

the processor being operative to cause the series of digital image data frames of the recording stream to be recorded from the at least one display frame location on the graphics card.

* * * * *